United States Patent [19]
Tachita et al.

[11] Patent Number: 5,563,608
[45] Date of Patent: Oct. 8, 1996

[54] POSITION MEASURING SYSTEM AND METHOD THEREFOR

[75] Inventors: Ryobun Tachita, Kawasaki; Ken Ikeda, Tokyo; Akihisa Kawasaki, Sagamihara; Izumi Sato, Matsumoto, all of Japan

[73] Assignee: Matsushita Electric Industrial Co., Ltd., Japan

[21] Appl. No.: 281,215

[22] Filed: Jul. 27, 1994

[30] Foreign Application Priority Data

Jul. 27, 1993 [JP] Japan .................................. 5-184979
Jun. 6, 1994 [JP] Japan .................................. 6-123658
Jul. 7, 1994 [JP] Japan .................................. 6-156100

[51] Int. Cl.$^6$ .............................. H04B 7/185; G01S 5/02
[52] U.S. Cl. ................................... 342/357; 364/449
[58] Field of Search ............................ 342/357; 364/449

[56] References Cited

U.S. PATENT DOCUMENTS 5,311,195  5/1994  Mathis et al. ........................ 342/357

FOREIGN PATENT DOCUMENTS 4265879  9/1992  Japan .

Primary Examiner—Theodore M. Blum
Attorney, Agent, or Firm—Rossi & Associates

[57] ABSTRACT

In a position measuring system, a position of a moving body is derived when data is sufficient for such derivation. On the other hand, when data is insufficient for such derivation, an area which may include the position of the moving body is derived. Accordingly, a user correctly evaluates reliability of information which is displayed. In a position measuring method, a measurement error of the derived position is evaluated. Further, a moving error evaluation is performed to evaluate an increase of the error. By changing the measurement error of the derived position, the area which includes the position of the moving body with high reliability can be displayed to the user.

21 Claims, 41 Drawing Sheets

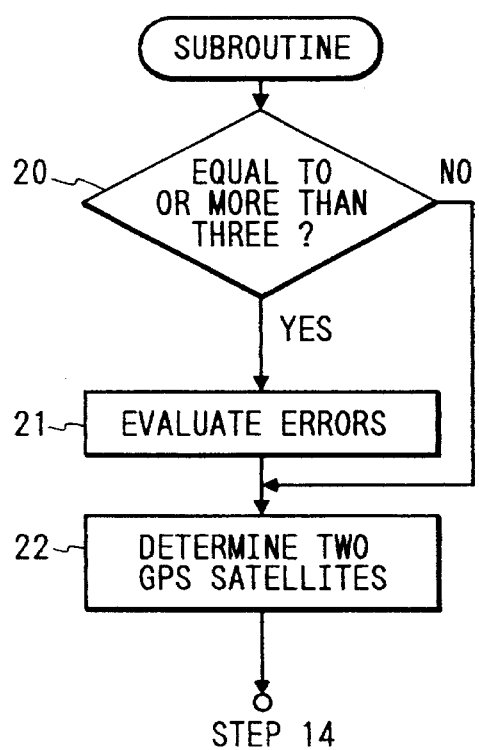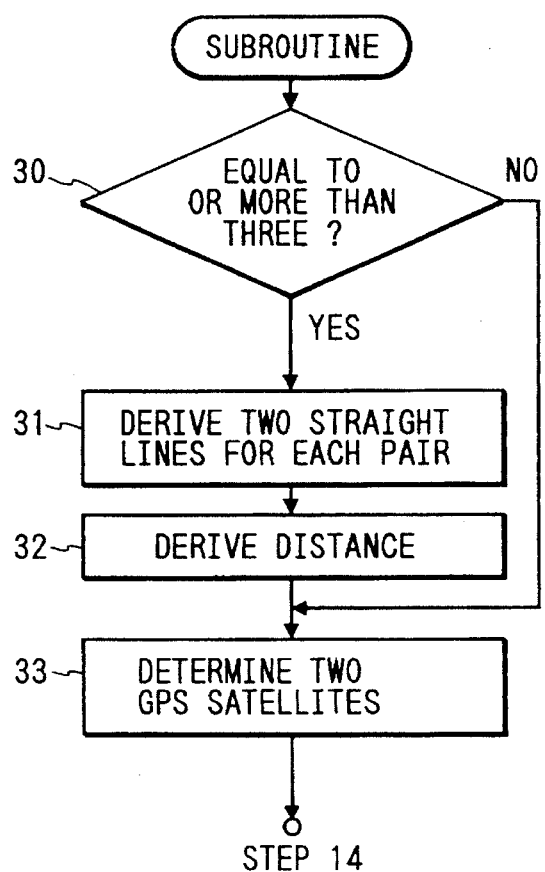

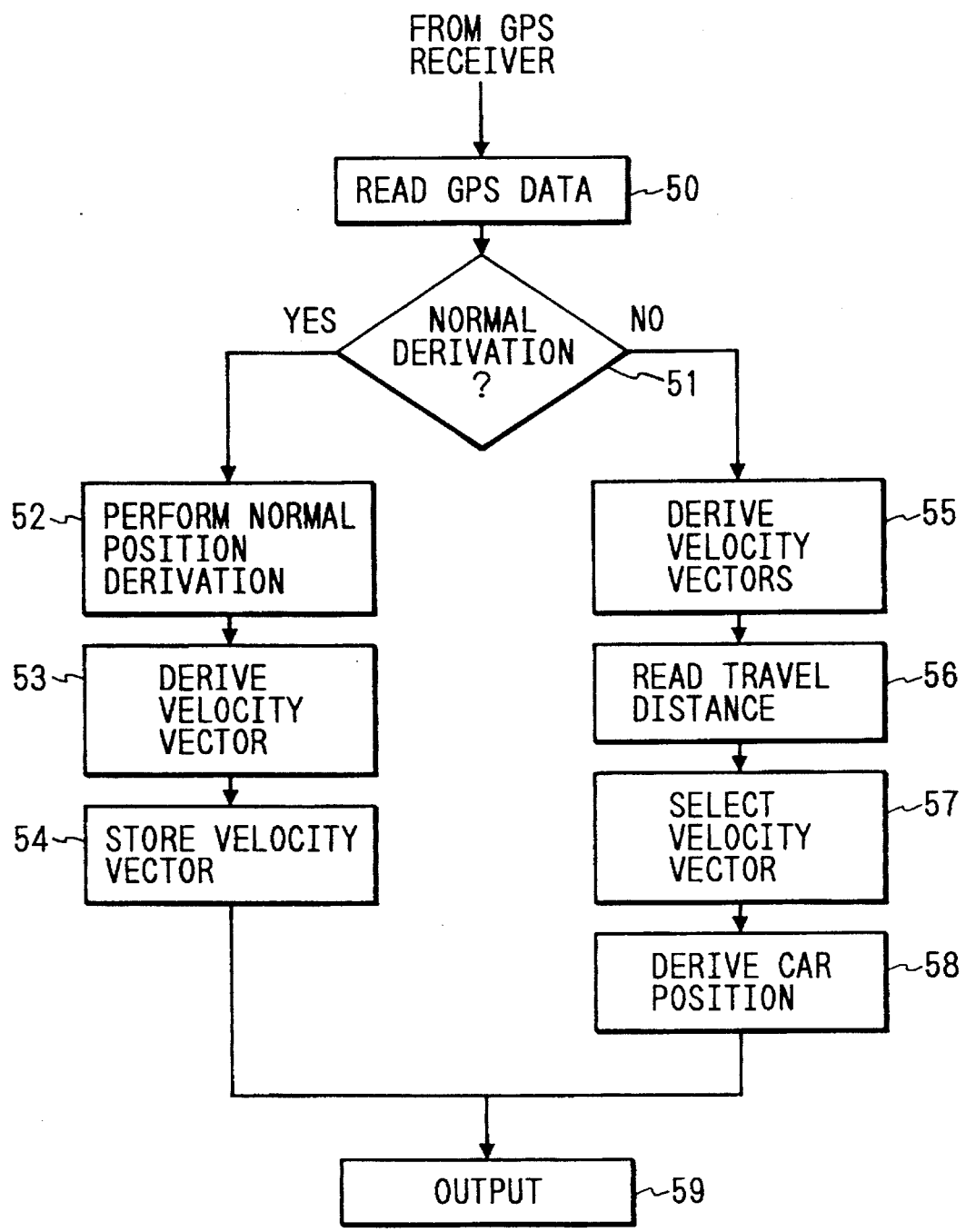

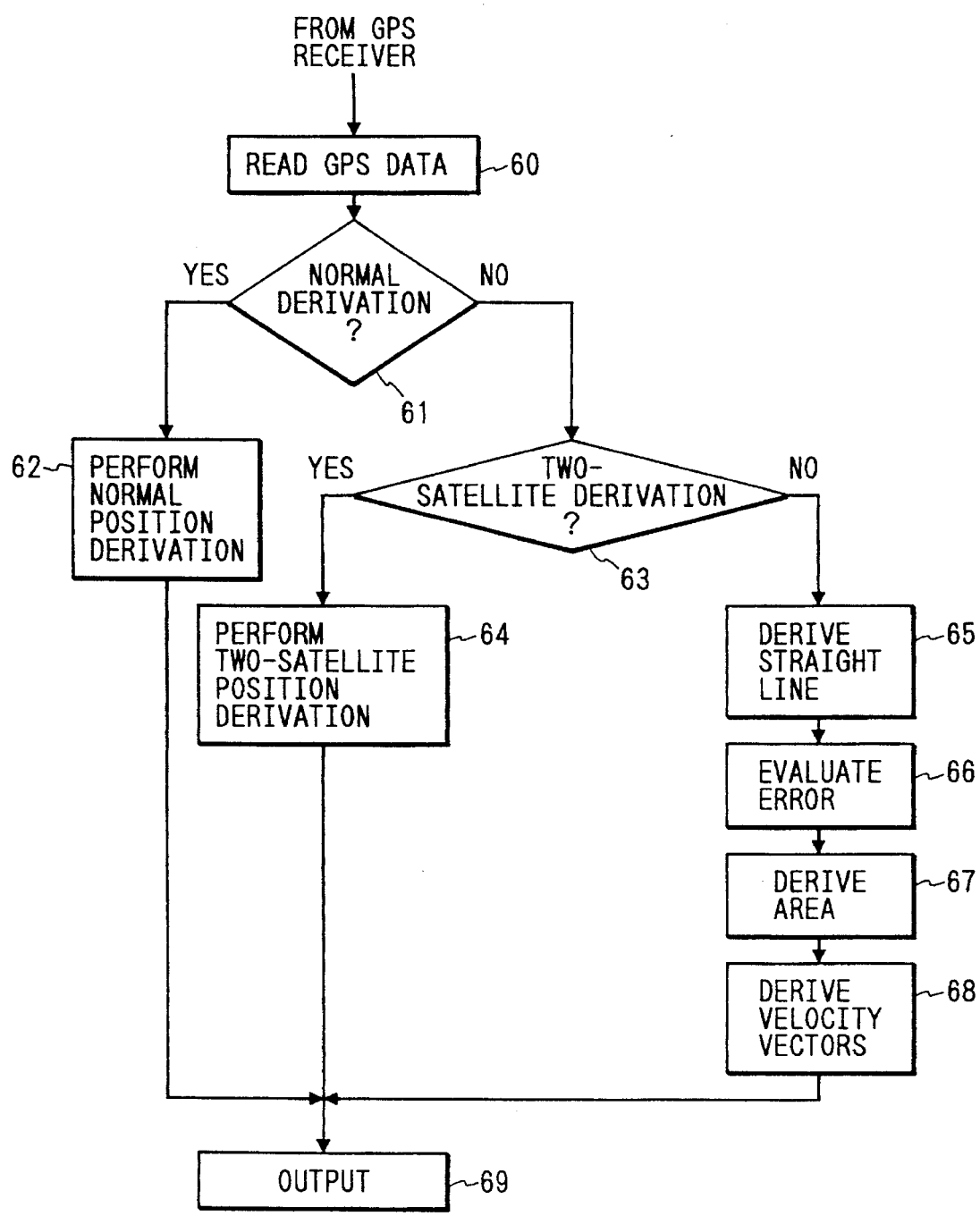

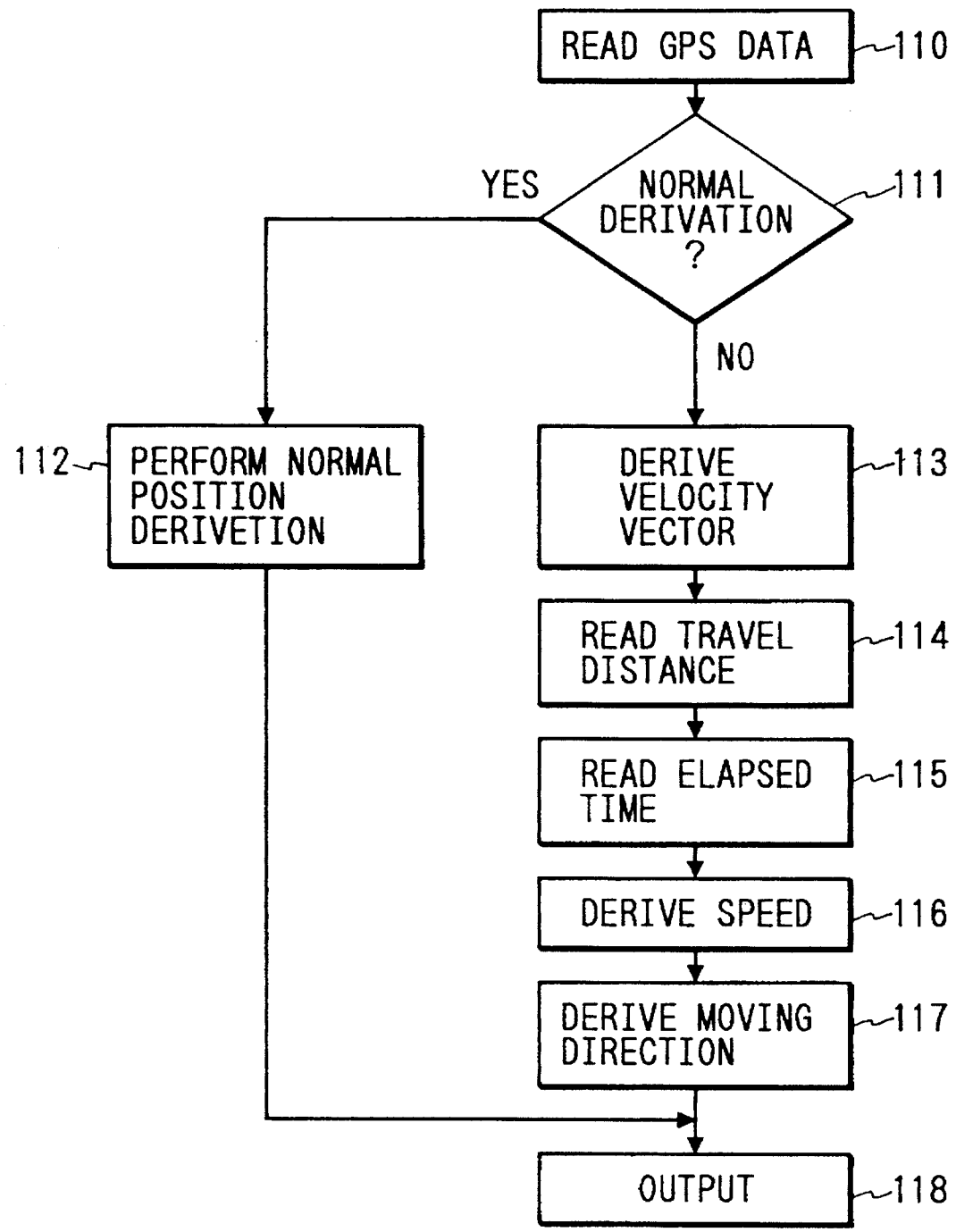

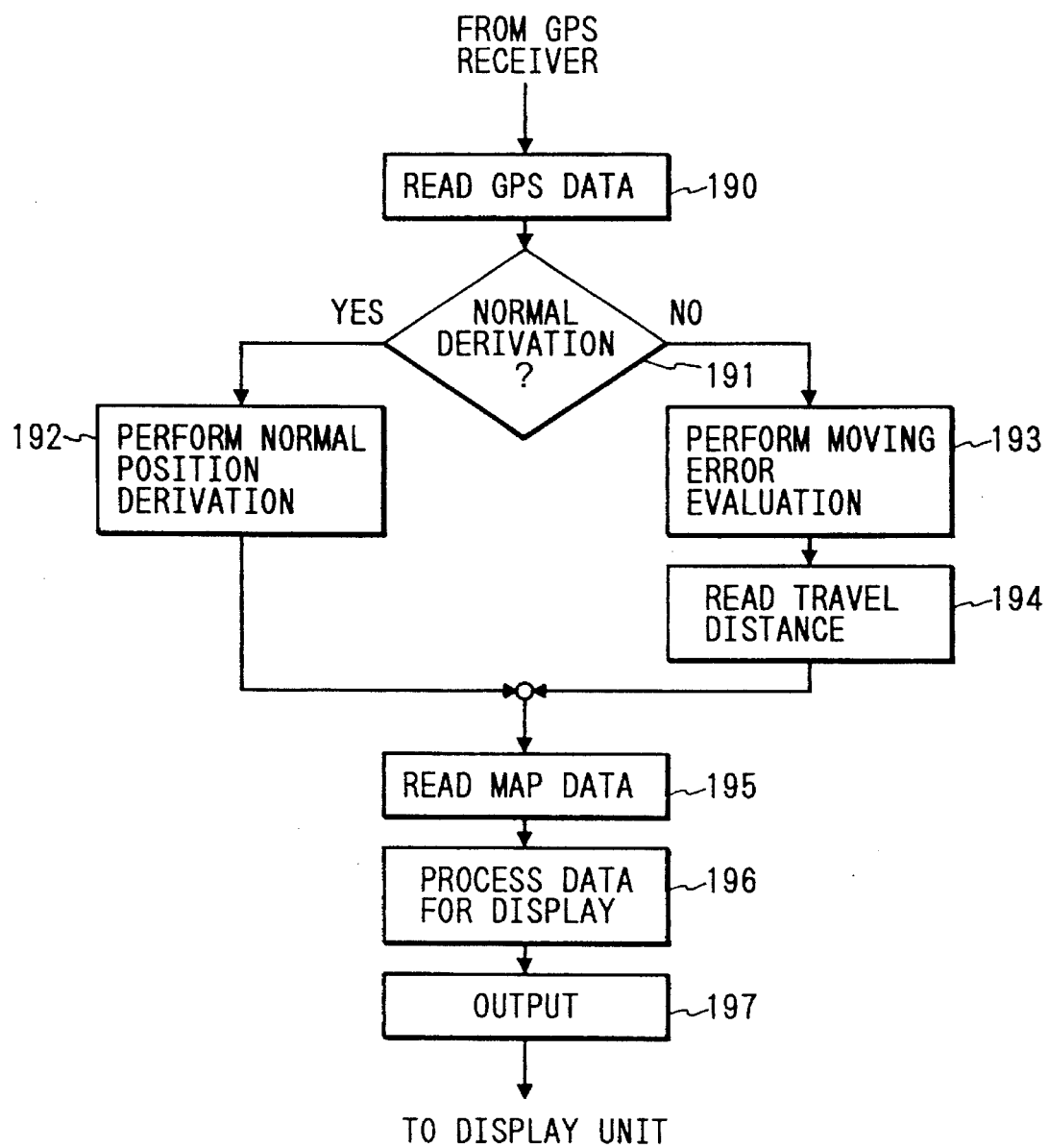

POSITION MEASURING SYSTEM AND METHOD THEREFOR

BACKGROUND OF THE INVENTION

1. Field of the Invention

The present invention relates to a system for and a method of measuring a position of a moving body for use in a car navigation system, a car locator or the like.

2. Description of the Prior Art

Recently, the car navigation system using a position receiver in the form of a receiver in a satellite navigation system, such as, the Global Positioning System (hereinafter referred to as "GPS") has been attracting attention in the field of car electronics.

Hereinbelow, a car navigation system using a conventional GPS receiver as disclosed in, such as. Japanese First (unexamined) Patent Publication No. 4-265879 will be described with reference to FIGS. 54 and 55.

In FIG. 54, the car navigation system includes a GPS receiver 100 which receives and demodulates GPS signals indicative of time data sent from a plurality of GPS satellites on radio waves, a CD-ROM 101 which stores map data, a display unit 102 and a CPU 103 which derives a car position based on the demodulated GPS signals and reads out the corresponding map data from the CD-ROM 101 for displaying it with the derived car position on the display unit 102.

An operation of the car navigation system as structured above will be described using a flowchart of FIG. 55 which is executed by the CPU 103.

At step 300, the CPU 103 reads the received GPS data demodulated at the GPS receiver 100. Subsequently, step 301 determines whether the GPS data from at least three GPS satellites are available for determining a car position. When answer at step 301 is positive, then the routine proceeds to step 303 where a current car position is derived based on the GPS data read out at step 300. On the other hand, when answer at step 301 is negative, the routine proceeds to step 302 where the GPS data read out at step 300 are corrected based on the stored GPS data for the corresponding satellites. The stored GPS data are the newest data used at step 303 in a previous execution cycle of this routine when step 301 yielded the positive answer. Subsequently, the routine proceeds to step 303 where a current car position is derived based on the GPS data corrected at step 302. Thereafter, step 304 reads out the corresponding map data from the CD-ROM 101, and step 305 processes the map data and the derived car position so as to be outputted at step 306 to the display unit 102 where the derived car position is displayed on the map data.

The foregoing conventional car navigation System, however, has the following disadvantage:

When the GPS data are not sufficient for determining the car position as determined at step 301, the GPS data are corrected using the stored previous data so as to derive the car position. Although the corrected GPS data are estimated or assumed data derived based on the stored previous data, the car position derived based on those estimated data is directly displayed for a user. Accordingly, the user can not know whether the displayed car position is reliable or not. 1his makes the navigation system unreliable to the user.

SUMMARY OF THE INVENTION

Therefore, it is an object of the present invention to provide an improved position measuring system.

It is another object of the present invention to provide an improved position measuring method.

According to one aspect of the present invention, a position measuring system comprises a receiver for receiving and demodulating signals from satellites; position deriving means for deriving a current position of a moving body based on the demodulated signals: first straight line deriving means, responsive to the demodulated signals being insufficient to disable the position deriving means from deriving the current position, for deriving a first straight line based on the demodulated signals from two of the satellites, the first straight line deriving means deriving the first straight line as a horizontal line by assuming that an altitude of the moving body is constant; error evaluating means for evaluating an error which causes a positional deviation of the first straight line; second straight line deriving means for deriving a pair of second straight lines based on the first straight line the second straight lines spacing from each other to define therebetween an area which corresponds to the evaluated error; and output means for outputting at least one of the current position derived by the position deriving means and the area defined between the second straight lines.

According to another aspect of the present invention, a position measuring system comprises a receiver for receiving and demodulating signals from satellites; position deriving means for deriving a current position of a moving body based on the demodulated signals; area deriving means responsive to the demodulated signals being insufficient to disable the position deriving means from deriving the current position, for limiting the current position to within an area defined between two straight lines; timer means for measuring an elapsed time from a time point of receipt of the signals from the .satellites for a newest position derivation by the position deriving means to a time point of receipt of the signals from the satellites for a current area derivation by the area deriving means; maximum movable area deriving means for deriving a maximum movable area from a position derived by the newest position derivation, based on the elapsed time, a predetermined maximum speed of the moving body and a predetermined maximum acceleration of the moving body; area limiting means for deriving an area common to both of the area derived by the area deriving means and the maximum movable area derived by the maximum movable area deriving means; and output means for outputting one of the current position derived by the position deriving means and the common area derived by the area limiting means.

According to another aspect of the present invention a position measuring system comprises a receiver for receiving and demodulating signals from satellites; position deriving means for deriving a current position and a velocity vector of a moving body based on the demodulated signals; velocity vector deriving means, responsive to the demodulated signals being insufficient to disable the position deriving means from deriving the current position, for deriving a velocity vector of the moving body corresponding to a component perpendicular to a straight line which defines a possible area for the current position, the velocity vector deriving means deriving the velocity vector based on the demodulated signals; timer means for measuring an elapsed time from a time point of receipt of the signals from the satellites for a newest position derivation by the position deriving means to a time point of receipt of the signals from the satellites for a velocity vector derivation by the velocity vector deriving means; and position estimating means for comparing the velocity vector derived by the position deriving means with the velocity vector derived by the velocity vector deriving means, for determining, when the compared velocity vectors are substantially equal to each other and the measured elapsed time is small, a motion of the moving body to be a uniform linear motion with the velocity vector derived by one of the position deriving means and the velocity vector deriving means, and for estimating the current position based on the current position derived by the position deriving means and the velocity vector; and output means for outputting one of the current positions derived by the position deriving means and the position estimating means.

According to another aspect of the present invention, a position measuring system comprises a receiver for receiving and demodulating signals from satellites; position deriving means for deriving a current position of a moving body based on the demodulated signals; area deriving means, responsive to the demodulated signals being insufficient to disable the position deriving means from deriving the current position, for limiting the current position to within an area defined between two straight lines; timer means for measuring an elapsed time from a time point of receipt of the signals from the satellites for a last area derivation by the area deriving means to a time point of receipt of the signals from the satellites for a current area derivation by the area deriving means; area estimating means for deriving a maximum movable area of the moving body based on the elapsed time, a predetermined maximum speed of the moving body and a predetermined maximum acceleration of the moving body when a pair of the satellites used in the last area derivation differs from a pair of the satellites used in the current area derivation; area limiting means for deriving an area common to both of the area derived by the area deriving means and the maximum movable area derived by the area estimating means; and output means for outputting one of the current position derived by the position deriving means and the common area derived by the area limiting means.

According to another aspect of the present invention, a position measuring system comprises a receiver for receiving and demodulating signals from satellites; a distance sensor for measuring a distance traveled by moving body; position deriving means for deriving a current position of the moving body based on the demodulated signals; area deriving means responsive to the demodulated signals being insufficient to disable the position deriving means from deriving the current position, for limiting the current position to within an area defined between two straight lines; maximum movable area deriving means for deriving, based on the travel distance measured by the distance sensor a maximum movable area from the current position derived by the position deriving means; area limiting means for deriving an area common to both of the area derived by the area deriving means and the maximum movable area derived by the maximum movable area deriving means; and output means for outputting one of the current position derived by the position deriving means and the common area derived by the area limiting means.

According to another aspect of the present invention, a position measuring system comprises a receiver for receiving and demodulating signals from satellites; a distance sensor for measuring a distance traveled by a moving body; a timer for measuring a time; position deriving means for deriving a current position of the moving body based on the demodulated signals; velocity vector deriving means, responsive to the demodulated signals being insufficient to disable the position deriving means from deriving the current position, for deriving a velocity vector of the moving body corresponding to a component perpendicular to straight lines being parallel with each other and defining therebetween a possible area for the current position the velocity vector deriving means deriving the velocity vector based on the demodulated signals: moving speed deriving means for deriving a moving speed of the moving body based on the measured distance and the measured time; moving direction deriving means for deriving a moving direction of the moving body based on an inverse cosine of a triangle having a hypotenuse formed by the moving speed and one of the other sides formed by the velocity vector; and output means for outputting one of the current position derived by the position deriving means and the moving direction derived by the moving direction deriving means.

According to another aspect of the present invention, a position measuring system comprises a receiver for receiving and demodulating signals from satellites; position deriving means for deriving a current position of a moving body based on the demodulated signals; area deriving means, responsive to the demodulated signals being insufficient to disable the position deriving means from deriving the current position, for limiting the current position to within an area defined between two straight lines; timer means for measuring an elapsed time from a time point of receipt of the signals from the satellites for a newest position derivation by the position deriving means to a time point of receipt of the signals from the satellites for a current area derivation by the area deriving means; maximum movable area deriving means for deriving a maximum movable area from a position derived by the newest position derivation, based on the elapsed time and a predetermined maximum speed of the moving body; area limiting means for deriving an area common to both of the area derived by the area deriving means and the maximum movable area derived by the maximum movable area deriving means: storing means for storing road map data; output means for outputting at least one of the current position derived by the position deriving means and the common area derived by the area limiting means the output means further outputting corresponding road map data from the storing means; and display means, responsive to the output means, for displaying the at least one of the current position and the common area along with the corresponding road map data.

According to another aspect of the present invention, a position measuring system comprises a receiver for receiving and demodulating signals from satellites; position deriving means for deriving a current position and a velocity vector of a moving body based on the demodulated signals: a distance sensor for measuring a distance traveled by the moving body; area deriving means, responsive to no receipt of the signals from any of the satellites, for limiting the current position to within an area derived based on the current position, the velocity vector and the measured distance; and output means for outputting at least one of the current position derived by the position deriving means and the area derived by the area deriving means.

According to another aspect of the present invention, a position measuring method is disclosed, wherein a current position of a moving body and measurement error evaluation values therefor are derived when data is sufficient for deriving the current position, and wherein when data is insufficient for deriving the current position, a maximum movable distance is derived based on an elapsed time from the last measurement and a predetermined maximum speed of the moving body, and the maximum movable distance is added to the measurement error evaluation values in given directions so as to change the measurement error evaluation values representing an error range of the current position.

BRIEF DESCRIPTION OF THE DRAWINGS

The present invention will be understood more fully from the detailed description given hereinbelow and from the accompanying drawings of the preferred embodiments of the invention, which are given by way of example only, and are not intended to limit the present invention.

In the drawings:

FIG. 5 is a subroutine of the flowchart in FIG. 4 according to the second preferred embodiment;

FIG. 6 is a subroutine of the flowchart in FIG. 4 according to a third preferred embodiment of the present invention;

FIG. 11 is a flowchart showing a position deriving routine to be executed by the CPU according to the fifth preferred embodiment;

FIG. 13 is a flowchart showing a position deriving routine to be executed by the CPU according to a sixth preferred embodiment of the present invention;

FIG. 17 is a flowchart showing a position deriving routine to be executed by the CPU according to an eighth preferred embodiment of the present invent/on:

FIG. 19 is a block diagram showing a structure of a position measuring system according to a tenth preferred embodiment of the present Invent/on:

FIG. 22 is a flowchart showing a position deriving routine to be executed by the CPU according to the eleventh preferred embodiment;

FIG. 44 is a flowchart showing a position deriving routine to be executed by the CPU according to a twentieth preferred embodiment of the present invention;

DESCRIPTION OF THE PREFERRED EMBODIMENT

Now, preferred embodiments of the present invention will be described hereinbelow with reference to the accompanying drawings.

Figure 1:
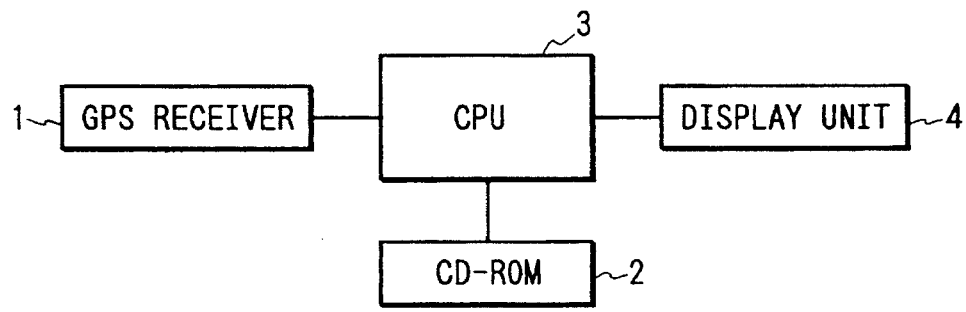
FIG. 1 is a block diagram showing a structure of a position measuring system according to a first preferred embodiment of the present invention.

FIG. 1 is a block diagram showing a structure of a position measuring system according to a first preferred embodiment of the present invention.

In FIG. 1, numeral 1 denotes a GPS receiver which receives and demodulates GPS signals indicative of time data (hereinafter referred to as "GPS data") sent from a plurality of GPS satellites on radio waves, numeral 2 denotes a CD-ROM which stores map data including altitude data, numeral 3 denotes a CPU which executes a position calculation routine as represented by a flowchart of FIG. 2 and reads out corresponding map data from the CD-ROM 2, and numeral 4 denotes a display unit for displaying a position calculation result along with the corresponding map data.

Hereinbelow, an operation of the CPU 3 will be described in detail with reference to FIGS. 2 and 3.

Figure 2:
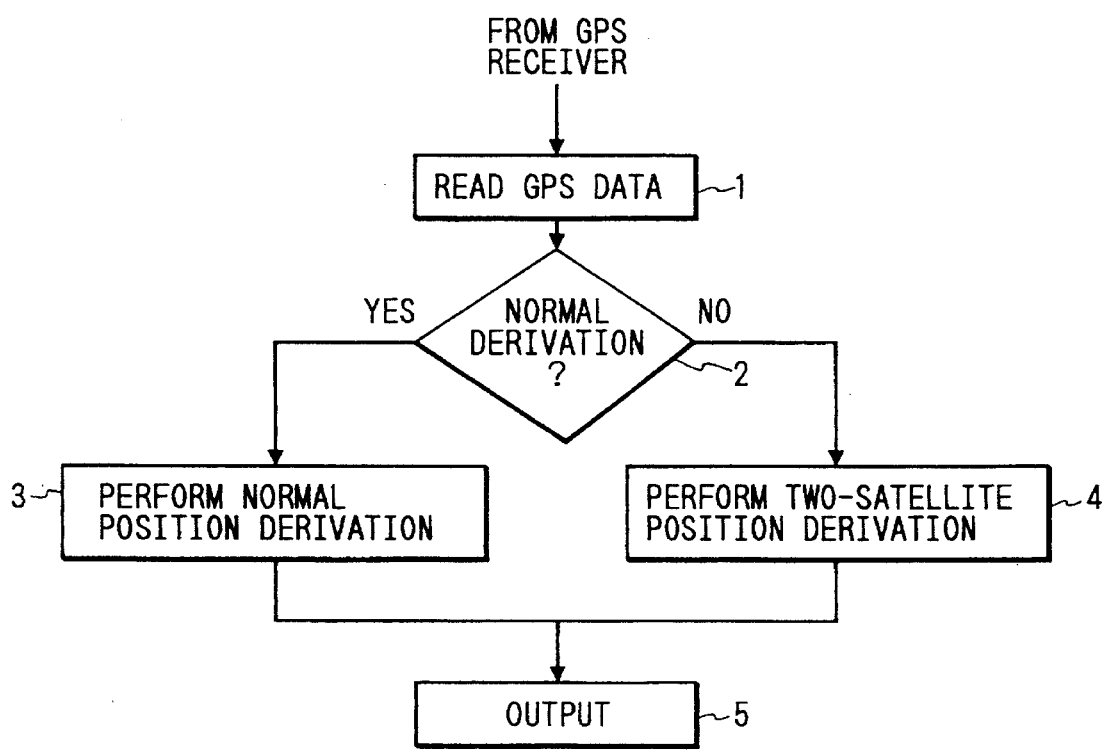
FIG. 2 is a flowchart showing a position deriving routine to be executed by a CPU according to the first preferred embodiment.

In FIG. 2, step 1 reads out the GPS data received from the satellites and demodulated at the GPS receiver 1. Subsequently, step 2 determines whether to perform a normal position derivation which is known in the art. Specifically, when step 2 determines that a current position of a moving body, such as, a car can be determined with a required accuracy based on the known normal position derivation, that is, that the GPS data from at least three GPS satellites are available for deriving the car position with the required accuracy, then the routine proceeds to step 3 where the normal position derivation is executed to derive a current position and a velocity vector of the car in a known manner based on the GPS data read out at step I. On the other hand, when step 2 determines that the car position can not be derived with the required accuracy based on the normal position derivation while the GPS data from two GPS satellites are available, the routine proceeds to step 4. Step 4 performs a two-satellite position derivation which confines or limits the current car position to within an area defined between two straight lines.

After executing step 3 or 4, the routine proceeds to step 5 where a result of the position derivation at step 3 or 4 along with the corresponding map data are outputted to the display unit 4.

Now, the foregoing two-satellite position derivation will be described in detail with reference to FIG. 3.

Figure 3:
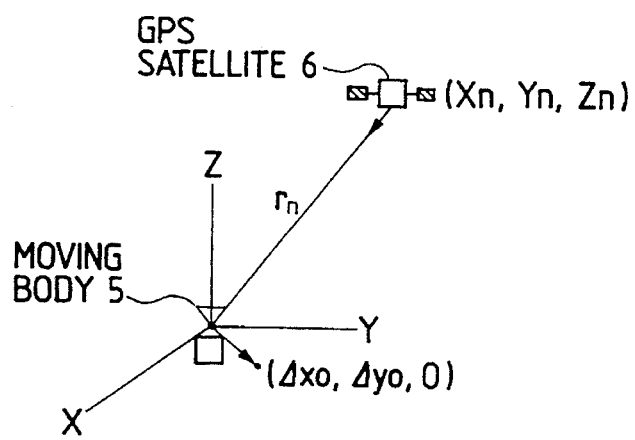
FIG. 3 is a diagram for explaining a two-satellite position derivation according to the first preferred embodiment.

In FIG. 3, numeral 5 represents a moving body, such as, a car installed with the GPS receiver and numeral 6 represents an n-th GPS satellite. The orthogonal coordinate system is given such that an estimated position of the moving body 5 is set to the origin, an x-axis is set to the east, a y-axis is set to the north and a z-axis is set to the zenith. When orthogonal coordinates of the GPS satellite 6 are given by (Xn, Yn, Zn) and a distance from the moving body 5 to the GPS satellite 6 is given by $r_n$, an equation (1) Is established as follows:

$$Xn^2 + Yn^2 + Zn^2 = r_n^2 \qquad (1)$$

Further, assuming that an altitude of the moving body 5 is constant, an error between the estimated position of the moving body 5 and its true value is given by $(\Delta x_o, \Delta y_o, 0)$. When a difference between an assumed GPS time tg at the GPS receiver and a true time is given by $\Delta t$, a time indicated by the GPS data is given by $t_n$ and a speed of light is given by c, an equation (2) is established as follows:

$$(Xn - \Delta x_o)^2 + (Yn - \Delta y_o)^2 + Zn^2 = c^2\{(tg + \Delta t) - t_n\}^2 \qquad (2)$$

$$n = 1, 2$$

Since $\Delta x_o$, $\Delta y_o$ and $\Delta t$ are sufficiently small as compared with $r_n$, respectively, an equation (3) is approximately obtained from the equations (1) and (2) as follows:

$$\frac{Xn}{r_n} \Delta x_o + \frac{Yn}{r_n} \Delta y_o - c \cdot \Delta t = c \cdot dt_n \qquad (3)$$

$$dt_n = tg - \left(t_n + \frac{r_n}{c}\right) \qquad n = 1, 2$$

wherein, $dt_n$ is known since $dt_n$ can be derived based on the GPS data from the n-th GPS satellites, respectively, while $\Delta x_o$, $\Delta y_o$ are unknown.

As appreciated, the equation (3) is established for each of the two GPS satellites (n=1, 2). Accordingly, an equation (4) is obtained by eliminating $\Delta t$ from a pair of the equations (3) for the two GPS satellites (n=1, 2), which Is as follows:

$$\left(\frac{X_1}{r_1} - \frac{X_2}{r_2}\right)\Delta x_o + \left(\frac{Y_1}{r_1} - \frac{Y_2}{r_2}\right)\Delta y_o = c \cdot (dt_2 - dt_1) \qquad (4)$$

As appreciated from the equation (4), the current position of the moving body 5 can be limited on a straight line represented by the equation (4). As further appreciated from the equation (4), the straight line represented by the equation (4) is a horizontal line. However, in practice, errors in propagation path and altitude cause an error in position of the straight line represented by the equation (4).

Hereinbelow, a positional variation of the straight line caused by those errors will be evaluated.

When an error in pseudo distance from the moving body 5 to the GPS satellite 6 is given by $\Delta e_n$ and a corresponding error between an estimated position of the moving body 5 and its true value is given by $(\Delta x_{en}, \Delta y_{en}, 0)$, an equation (5) is established based on the equation (1), which is as follows:

$$(Xn - \Delta x_{en})^2 + (Yn - \Delta y_{en})^2 + Zn^2 = (r_n - \Delta e_n)^2 \quad (5)$$

$$n = 1, 2$$

Since $\Delta x_{en}$, $\Delta y_{en}$ and $\Delta_{en}$ are sufficiently small as compared with $r_n$, respectively, an equation (6) is approximately obtained as follows:

$$\frac{Xn}{r_n} \Delta x_{en} + \frac{Yn}{r_n} \Delta y_{en} = \Delta_{en} \quad n = 1, 2 \quad (6)$$

Further, when an error in pseudo distance from the moving body 5 to the GPS satellite 6 caused by an error $\Delta z_h$ between an assumed altitude and an actual altitude of the moving body 5 is given by $\Delta h$ and a corresponding deviation between the estimated position of the moving body 5 and its true value is given by $(\Delta x_h, \Delta y_h, \Delta z_h)$, an equation (7) is established based on the equation (1), which is as follows:

$$(Xn - \Delta x_h)^2 + (Yn - \Delta y_h)^2 + (Zn - \Delta z_h)^2 = (r_n - \Delta h)^2 \quad (7)$$

$$n = 1, 2$$

Since $\Delta x_h$, $\Delta y_h$, $\Delta z_h$ and $\Delta h$ are sufficiently small as compared with $r_n$, respectively, an equation (8) is approximately obtained as follows:

$$\frac{Xn}{r_n} \Delta x_h + \frac{Yn}{r_n} \Delta y_h + \frac{Zn}{r_n} \Delta z_h = \Delta h \quad (8)$$

$$n = 1, 2$$

As appreciated, the equation (8) is established for each of the two GPS satellites (n=1, 2). Further, the error $\Delta h$ in pseudo distance caused by the altitude error $\Delta z_h$ becomes equal for each of the GPS satellites (n=1, 2). Accordingly, an equation (9) is obtained by eliminating $\Delta h$ from a pair of the equations (8) for the two GPS satellites (n=1, 2), which is as follows:

$$\left( \frac{X_1}{r_1} - \frac{X_2}{r_2} \right) \Delta x_h + \left( \frac{Y_1}{r_1} - \frac{Y_2}{r_2} \right) \Delta y_h = \left( \frac{Z_2}{r_2} - \frac{Z_1}{r_1} \right) \Delta z_h \quad (9)$$

When the errors are evaluated in the foregoing manners, the straight line represented by the equation (4) is shifted to positions as represented by equations (10), (11) and (12), respectively, which are as follows:

$$\left( \frac{X_1}{r_1} - \frac{X_2}{r_2} \right) \Delta x_1 + \left( \frac{Y_1}{r_1} - \frac{Y_2}{r_2} \right) \Delta y_1 = c \cdot (dt_2 - dt_1) \pm \Delta e_1 \quad (10)$$

$$\Delta x_1 = \Delta x_o + \Delta x_e 1$$

$$\Delta y_1 = \Delta y_o + \Delta y_e 1$$

$$\left( \frac{X_1}{r_1} - \frac{X_2}{r_2} \right) \Delta x_2 + \left( \frac{Y_1}{r_1} - \frac{Y_2}{r_2} \right) \Delta y_2 = c \cdot (dt_2 - dt_1) \pm \Delta e_2 \quad (11)$$

$$\Delta x_2 = \Delta x_o + \Delta x_e 2$$

$$\Delta y_2 = \Delta y_o + \Delta y_e 2$$

$$\left( \frac{X_1}{r_1} - \frac{X_2}{r_2} \right) \Delta x_3 + \left( \frac{Y_1}{r_1} - \frac{Y_2}{r_2} \right) \Delta y_3 = \quad (12)$$

$$c \cdot (dt_2 - dt_1) \pm \left( \frac{Z_2}{r_2} - \frac{Z_1}{r_1} \right) \Delta z_h$$

-continued $$\Delta x_3 = \Delta x_o + \Delta x_h$$

$$\Delta y_3 = \Delta y_o + \Delta y_h$$

As appreciated, an equation (13) is obtained based on the equations (10), (11) and (12) so as to define the straight line with a value $\Delta E$ representing the maximum evaluated errors or the maximum positional deviation, which is as follows:

$$\left( \frac{X_1}{r_1} - \frac{X_2}{r_2} \right) \Delta x + \left( \frac{Y_1}{r_1} - \frac{Y_2}{r_2} \right) \Delta y = c \cdot (dt_2 - dt_1) \pm \Delta E \quad (13)$$

$$\Delta x = \Delta x_1 + \Delta x_2 + \Delta x_3$$

$$\Delta y = \Delta y_1 + \Delta y_2 + \Delta y_3$$

The value $\Delta E$ is derived by an equation (14) as follows:

$$\Delta E = |\Delta_{e1} \pm \Delta_{e2}|\max + \left( \frac{Z_2}{r_2} - \frac{Z_1}{r_1} \right) \Delta z_h \quad (14)$$

As appreciated, the current position of the moving body 5 can be limited to within an area defined between the two straight lines represented by the equation (13). As further appreciated, the two straight lines are horizontal parallel lines.

Accordingly, in the first preferred embodiment, even when the GPS data are not sufficient for determining the current position of the moving body with the required accuracy based on the normal calculation manner, the two-satellite position derivation is performed to define a possible current position area between the two straight lines based on the GPS data from the two GPS satellites.

As appreciated, when step 2 determines that the GPS data from only one of the GPS satellites is available, then the current cycle of this position deriving routine is terminated.

In the first preferred embodiment, it is arranged that the CPU 3 receives the altitude data from the CD-ROM 2. However, it may be arranged to use the result of the previous normal position derivation executed at step 3 in FIG. 2. Further, the straight line may be derived in a different manner, and the errors which cause the positional variation of the straight line are not limited to those as described.

Now, a second preferred embodiment of the present invention will be described heretobelow.

FIG. 1 is also applied to the second preferred embodiment. An operation of the second preferred embodiment will be described hereinbelow with reference to a flowchart shown in FIGS. 4 and 5.

Figure 4:
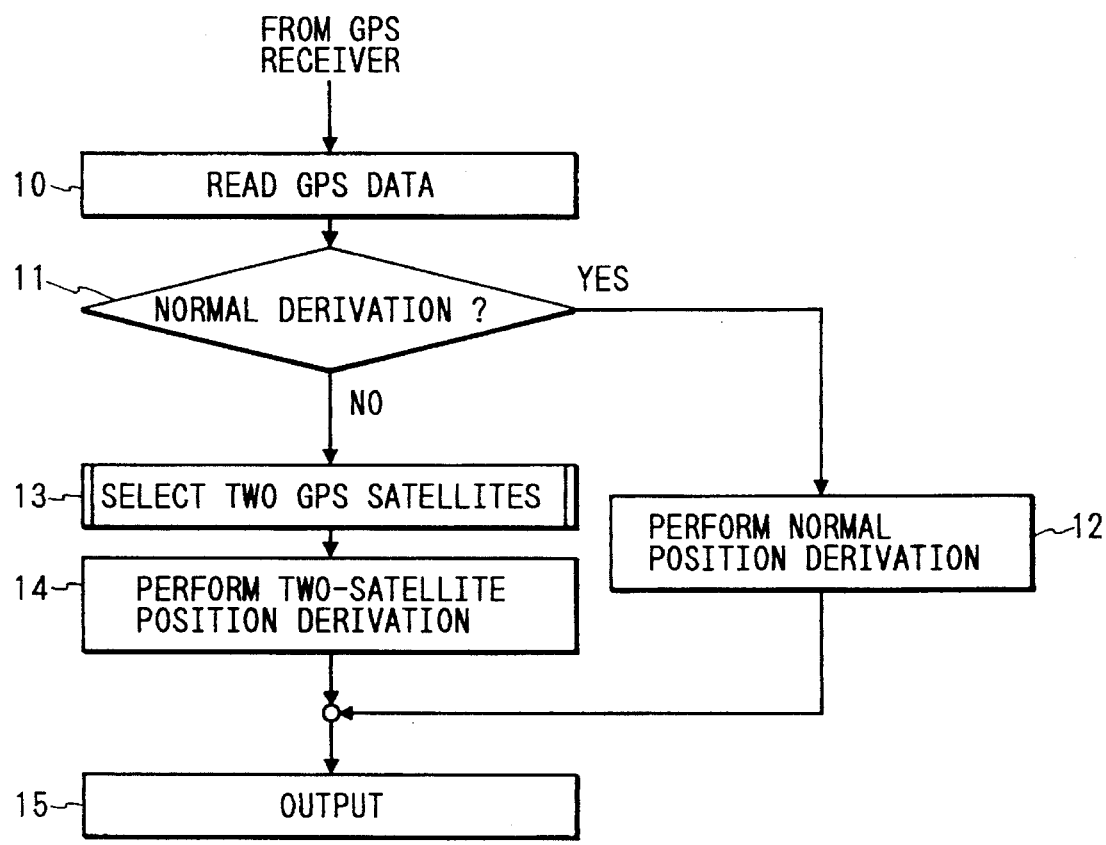
FIG. 4 is a flowchart showing a position deriving routine to be executed by the CPU according to a second preferred embodiment of the present invention.

In FIG. 4, step 10 reads out the GPS data received from the satellites and demodulated at the GPS receiver 1. Subsequently, step 11 determines whether to perform the normal position derivation, like step 2 in FIG. 2. When answer at step 11 is positive, the routine proceeds to step 12 where a current car position and a velocity vector of the car are derived in the known manner based on the GPS data read out at step 1 0, like step 3 In FIG. 2. On the other hand, when step 11 determines that the car position can not be derived with the required accuracy based on the normal position derivation while the GPS data from equal to or more than two GPS satellites are available, the routine proceeds to step 13 where two of the GPS satellites are selected for executing the two-satellite position derivation at step 14. Specifically, in FIG. 5 showing a subroutine corresponding to step 13 in FIG. 4, step 20 determines whether the GPS data from equal to or more than three GPS satellites are available or not. When answer at step 20 is positive, the routine proceeds to step 21 where errors are evaluated with regard to all possible pairs of-the GPS satellites. Specifically, the foregoing value $\Delta E$ which evaluates the maximum positional deviation of the straight line represented by the foregoing equation (4) is derived for each of the pairs using the foregoing equation (14). The error evaluation may be made using a value or values other than ΔE. Subsequently, the routine proceeds to step 22 where one of the pairs of the GPS satellites which makes the value ΔE minimum is selected.

On the other hand, when answer at step 20 is negative, that is, when the GPS data from only two GPS satellites are available, the routine directly proceeds to step 22 where those two GPS satellites are selected.

After step 22, the routine proceeds to step 14 where the two-satellite position derivation is performed based on the GPS data from the two GPS satellites selected at step 22, in the same manner as described in the first preferred embodiment.

After executing step 12 or 14, the routine proceeds to step 15 where a result of the position derivation at step 12 or 14 along with the corresponding map data are outputted to the display unit 4.

As in the first preferred embodiment, when step 11 in FIG. 4 determines that the GPS data from only one of the GPS satellites is available, then the current cycle of this position deriving routine is terminated.

As appreciated, in the second preferred embodiment, the particular pair of the GPS satellites which provides the smallest area between the two straight lines can be selected among equal to or more than three GPS satellites. Although the pair of the GPS satellites which can provide the smallest area for tile current car position is selected by evaluating the positional deviation of each of the corresponding straight lines other methods may be used to select such a pair of the GPS satellites.

Now, a third preferred embodiment of the present invention will be described hereinbelow.

The third preferred embodiment only differs from the second preferred embodiment In that the subroutine of FIG. 5 is replaced by a subroutine of FIG. 6. Accordingly, FIGS. 1 and 4 are also applied to the third preferred embodiment.

Hereinbelow, an operation of the third preferred embodiment will be described with reference to the subroutine of FIG. 6. The subroutine d FIG. 6 corresponds to step 13 in FIG. 4.

In FIG. 6, step 30 determines whether the GPS data from equal to or more than three GPS satellites are available or not. When answer at step 30 is positive, the routine proceeds to step 31 where two straight lines are derived for each of all possible pairs of the GPS satellites. The two straight lines are derived using the foregoing equations (13) and (14). Subsequently, the routine proceeds to step 32 where a distance between the two straight lines is derived for each pair of the GPS satellites. Thereafter, the routine proceeds to step 33 where one of the pairs of the GPS satellites which makes minimum the distance derived at step 32 is selected.

On the other hand, when answer at step 30 is negative, that is, when the GPS data from only two GPS satellites are available, the routine directly proceeds to step 33 where those two GPS satellites are selected.

As appreciated, in the third preferred embodiment, by comparing the distances between the two straight lines for all possible pairs of the GPS satellites, the particular pair of the GPS satellites which can make minimum the current position area is reliably selected.

Now, a fourth preferred embodiment of the present invention will be described hereinbelow.

FIG. 1 is also applied to the fourth preferred embodiment. An operation of the fourth preferred embodiment will be described hereinbelow with reference to a flowchart shown in FIG. 7.

Figure 7:
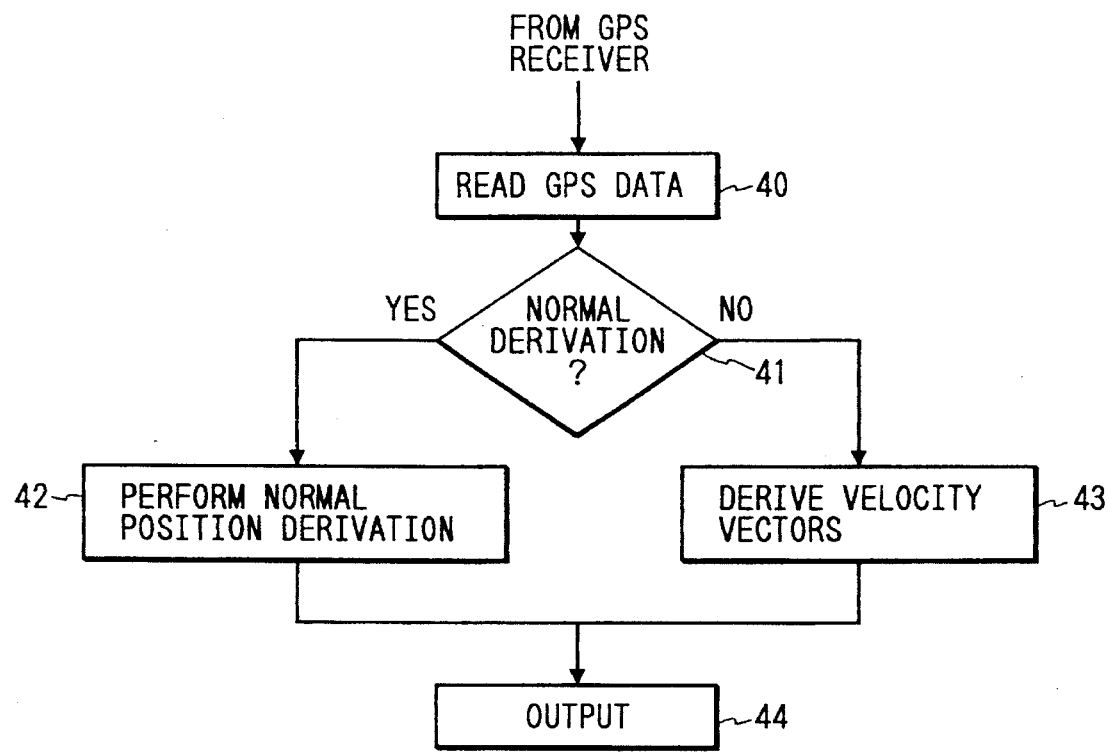
FIG. 7 is a flowchart showing a position deriving routine to be executed by the CPU according to a fourth preferred embodiment of the present invention.

In FIG. 7, step 40 reads out the GPS data received from the satellites and demodulated at the GPS receiver 1. Subsequently, step 41 determines whether to perform the normal position derivation, like step 2 in FIG. 2. When answer at step 41 is positive, the routine proceeds to step 42 where a current car position and a velocity vector of the car are derived in the known manner based on the GPS data read out at step 40, like step 3 in FIG. 2. On the other hand, when step 41 determines that the car position can not be derived with the required accuracy based on the normal position derivation while the GPS data from two GPS satellites are available, the routine proceeds to step 43 where velocity vectors are derived, which will be described hereinbelow. The routine may also proceed to step 43 when step 41 determines that the car position can not be derived with the required accuracy based on the normal position derivation while the GPS data from more than two GPS satellites are available. In this case, two of the GPS satellites may be selected, for example, by monitoring demodulated conditions of the GPS data received from the GPS satellites.

Figure 8:
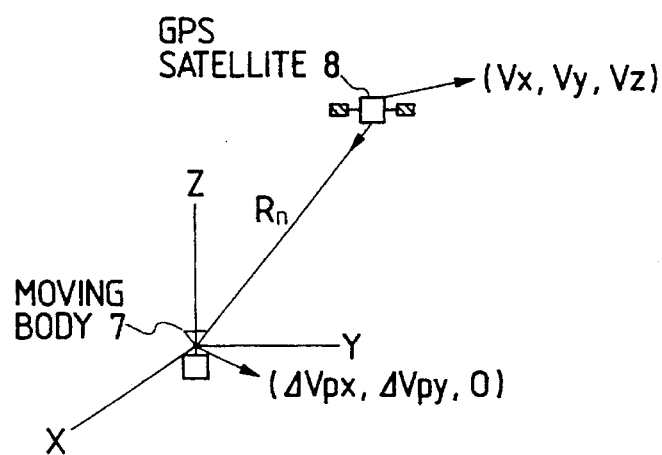
FIGS. 8 and 9 are diagrams, respectively, for explaining derivation of velocity vectors according to the fourth preferred embodiment.
Figure 9:
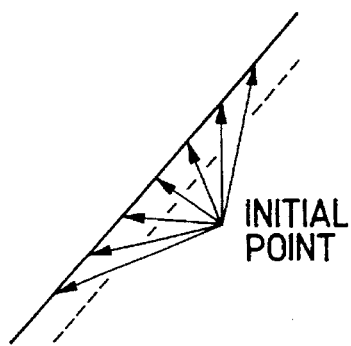

FIGS. 8 and 9 are diagrams, respectively, for explaining the derivation of the velocity vectors at step 43.

In FIG. 8, numeral 7 represents a moving body, such as, a car installed with the GPS receiver 1 and numeral 8 represents an n-th GPS satellite. The orthogonal coordinate system is given such that an estimated position of the moving body 7 is set to the origin, an x-axis is set to the east, a y-axis is set to the north and a z-axis is set to the zenith. When a velocity vector of the GPS satellite 8 is given by $(V_x, V_y, V_z)_n$ and a velocity vector of the moving body 7 is given by $(\Delta V_{px}, \Delta V_{py}, 0)$ assuming a velocity along the z-axis being 0 (zero), an equation (15) is obtained as follows:

$$V_n = (V_x, V_y, V_z)_n - [\Delta V_{px}, \Delta V_{py}, 0] \quad n = 1, 2 \quad (15)$$

wherein, $V_n$ represents a relative velocity vector of the GPS satellite 8 seen from the moving body 7.

Further, when orthogonal coordinates of the GPS satellite 8 are given by $(X_n, Y_n, Z_n)$, an equation (16) is obtained as follows:

$$r_n = \left( \frac{X_n}{R_n}, \frac{Y_n}{R_n}, \frac{Z_n}{R_n} \right) \quad n = 1, 2 \quad (16)$$

wherein, $r_n$ represents a unit position vector toward the n-th GPS satellite 8 seen from the moving body 7.

Accordingly, a component of the relative velocity vector $V_n$ toward the GPS satellite 8 is expressed by "$r_n \cdot V_n$" representing an inner product of $r_n$ and $V_n$.

A Doppler shift $D_n$ caused by the relative velocity vector $r_n \cdot V_n$ is derived by an equation (17) as follows:

$$D_n = (r_n \cdot V_n) \frac{f_n}{c} \quad n = 1, 2 \quad (17)$$

wherein, $f_n$ represents a carrier wave frequency of the n-th GPS satellite, and c represents a speed of light.

Further, when an error in frequency of an internal oscillator of the GPS receiver is given by $\Delta f$, an equation (18) Is obtained based on the equation (17), which is as follows:

$$D_n = (r_n \cdot V_n) \frac{f_n}{c} + \Delta f \quad n = 1, 2 \quad (18)$$

As appreciated, the equation (18) is established for each of the two GPS satellites (n=1, 2). Accordingly, an equation (19) is obtained by eliminating $\Delta f$ from a pair of the equations (18) for the two GPS satellites (n=1, 2), which is as follows:

$$\left(\frac{X_1}{R_1} - \frac{X_2}{R_2}\right) \Delta Vpx + \left(\frac{Y_1}{R_1} - \frac{Y_2}{R_2}\right) \Delta Vpy = Dd_1 - Dd_2 \quad (19)$$

$$Ddn = (Vx, Vy, Vz)n \cdot r_n - \frac{c}{fn} Dn \quad n = 1, 2$$

The equation (19) has a solution which is a terminal point of a velocity vector having an initial point at the origin. Specifically, the equation (19) is represented by a set of an infinite number of velocity vectors as shown In FIG. 9. As appreciated, since the velocity vectors represented by the equation (19) each have no vertical component. i.e. no component along the z-axis, each of these velocity vectors is horizontal.

Accordingly, in the fourth preferred embodiment, an infinite number of velocity vectors of the moving body can be derived based on the radio waves indicative of the GPS data sent from two GPS satellites even when the GPS data are insufficient for the normal known derivation of the current position of the moving body.

Now, a fifth preferred embodiment of the present invention will be described hereinbelow.

Figure 10:
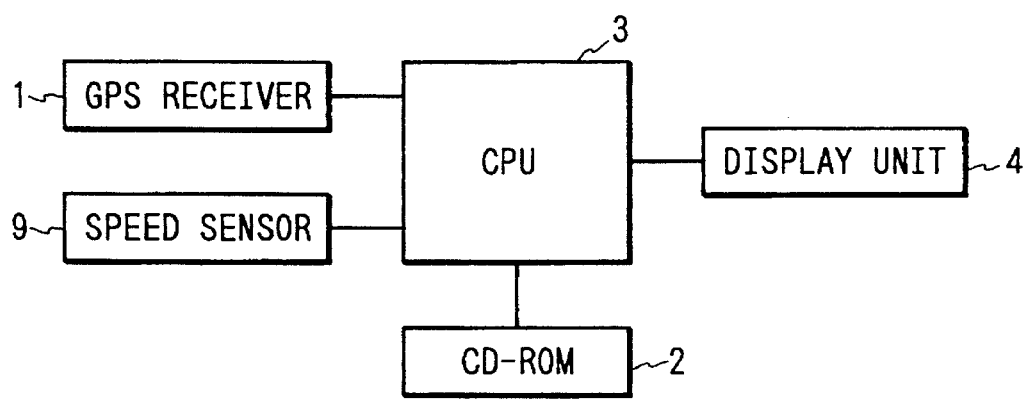
FIG. 10 is a block diagram showing a structure of a position measuring system according to a fifth preferred embodiment of the present invention.

FIG. 10 is a block diagram showing a structure of a position measuring system according to the fifth preferred embodiment. FIG. 10 differs from. FIG. 1 in that FIG. 10 additionally includes a speed sensor 9 for detecting a travel distance of the moving body, e.g. the car and for outputting a detection result to the CPU 3. The other structure is the same as that in FIG. 1.

An operation of the fifth preferred embodiment will be described hereinbelow with reference to a flowchart shown in FIG. 11.

In FIG. 11, step 50 reads out the GPS data received from the satellites and demodulated at the GPS receiver 1. Subsequently, step 51 determines whether to perform the normal position derivation, like step 2 in FIG. 2. When answer at step 51 is positive, the routine proceeds to steps 52 and 53 where a current car position and a velocity vector of the car are derived in the known manner based on the GPS data read out at step 50, respectively, like step 3 in FIG. 2. The routine further proceeds to step 54 where the derived velocity vector is stored for 30 seconds. Accordingly, the velocity vector stored over 30 seconds is updated by a new velocity vector in sequence. The accumulated velocity vectors make it possible to predict a next running direction of the car. On the other hand, when step 51 determines that the car position can not be derived with the required accuracy based on the normal position derivation while the GPS data from two GPS satellites are available, the routine proceeds to step 55 where the velocity vectors are derived in the same manner as in the foregoing fourth preferred embodiment. AS also in the fourth preferred embodiment, the routine may also proceed to step 55 when step 51 determines that the car position can not be derived with the required accuracy based on the normal position derivation while the GPS data from more than two GPS satellites are available. In this case, as in the fourth preferred embodiment, two of the GPS satellites may be selected, for example, by monitoring demodulated conditions of the GPS data received from the GPS satellites.

Figure 12:
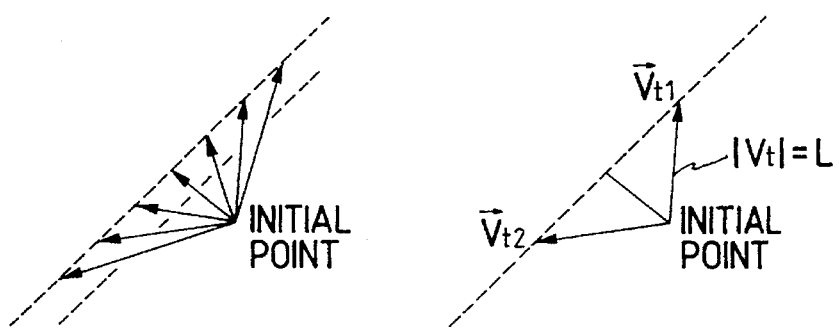
FIG. 12 is a diagram for explaining derivation of velocity vectors and determination of one of the velocity vectors according to the fifth preferred embodiment.

Subsequently, the routine proceeds to step 56 which reads a distance L traveled by the car as measured by the speed sensor 9 from receipt of the GPS data at the GPS receiver 1 for the last execution of this routine to receipt of the GPS data at the GPS receiver 1 for the current execution cycle of this routine. The routine then proceeds to step 57 where one of the velocity vectors derived at step 55 is selected in the following manner:

Specifically, step 57 first selects the velocity vectors each having a magnitude equal to the travel distance L. Since a vertical component of each of the velocity vectors derived at step 55 is 0 (zero), a pair of the velocity vectors Vt1 and Vt2 extending in two directions as shown in FIG. 12 are selected. Step 57 further derives an average of the velocity vectors stored at step 54. Based on prediction that the car is moving in a direction of the averaged velocity vector, one of the velocity vectors Vt1 and Vt2 having the direction closer to the direction of the averaged velocity vector is selected as the current velocity vector of the car.

Thereafter, the routine proceeds to step 58 where a terminal point of the velocity vector selected at step 57 is determined as a current position of the car. The result of the position derivation is outputted to the display unit 4 at step 59.

As appreciated, in the fifth preferred embodiment, even when the GPS data are insufficient for the normal known derivation of the current car position, the current car position can be determined based on the radio waves indicative of the GPS data sent from two GPS satellites and the distance traveled by the car.

In the fifth preferred embodiment, the velocity vectors are stored for 30 seconds. However, a time period other than 30 seconds may be used. Further, although the speed sensor is used for deriving the distance L traveled by the car, other sensors may be used as long as a distance traveled by the car can be derived.

Now, a sixth preferred embodiment of the present invention will be described hereinbelow.

FIG. 10 is also applied to the sixth preferred embodiment. The sixth preferred embodiment differs from the foregoing preferred embodiments in that the sixth preferred embodiment can perform a one-satellite position derivation as will be clear from the description hereinbelow.

An operation of the sixth preferred embodiment will be described hereinbelow with reference to a flowchart shown in FIG. 13.

In FIG. 13, step 60 reads out the GPS data received from the satellites and demodulated at the GPS receiver 1. Subsequently, step 61 determines whether to perform the normal position derivation, like step 2 in FIG. 2. When answer at step 61 is positive, the routine proceeds to step 62 where a current car position and a velocity vector of the car are derived in the known manner based on the GPS data read out at step 60, like step 3 in .FIG. 2. On the other hand, when step 61 determines that the car position can not be derived with the required accuracy based on the normal position derivation while the GPS data from equal to or more than two GPS satellites are available, the routine proceeds to step 63 which determines whether to perform the two-satellite position derivation at step 64 or to proceed to step 65. Specifically, when step 63 determines that the two-satellite position derivation can be resulted in the required accuracy, the routine proceeds to step 64 where the two-satellite position derivation is performed as in the second or third preferred embodiment. In this case, the velocity vectors as shown in FIG. 9 may be derived as in the fourth preferred embodiment and the distance L traveled by the car may also be used as in the fifth preferred embodiment so that the current car position is limited to within a more specified area. On the other hand, when step 63 determines that the two-satellite position derivation can not be resulted in the required accuracy, the routine proceeds to steps 65 through 68 where the one-satellite position derivation is performed, which will be described hereinbelow.

At first, a straight line corresponding to the straight line represented by the foregoing equation (4) is derived at step 65.

In the orthogonal coordinate system as given in the first preferred embodiment, it is assumed that an error between an estimated position of the car and its true value is given by $(\Delta x_o, \Delta y_o, 0)$, orthogonal coordinates of the GPS satellite are given by $(X_1, Y_1, Z_1)$, a distance from the car to the GPS satellite is given by $r_1$, a current GPS time at the GPS receiver is assumed correct and given by $t_k$, a time indicated by the GPS data is given by $t_1$, and a speed of light is given by c. An equation (20) is established as follows:

$$(X_1-\Delta x_0)^2+(Y_1-\Delta y_o)^2+Z_1^2=c^2(t_k-t_1)^2 \tag{20}$$

Since $\Delta x_o$ and $\Delta y_o$ are sufficiently small as compared with $r_1$, an equation (21) is approximately obtained as follows:

$$\frac{X_1}{r_1}\Delta x_0 + \frac{Y_1}{r_1}\Delta y_0 = c \cdot dt_1 \tag{21}$$

$$dt_1 = t_k - \left(t_1 + \frac{r_1}{c}\right)$$

As appreciated from the equation (21), the current car position can be limited on a straight line represented by the equation (21). However, in practice, a position of this straight line includes an error. As error factors, errors in propagation path and altitude are included as in the first preferred embodiment, and further, an error in frequency of an internal oscillator is also included.

Figure 14:
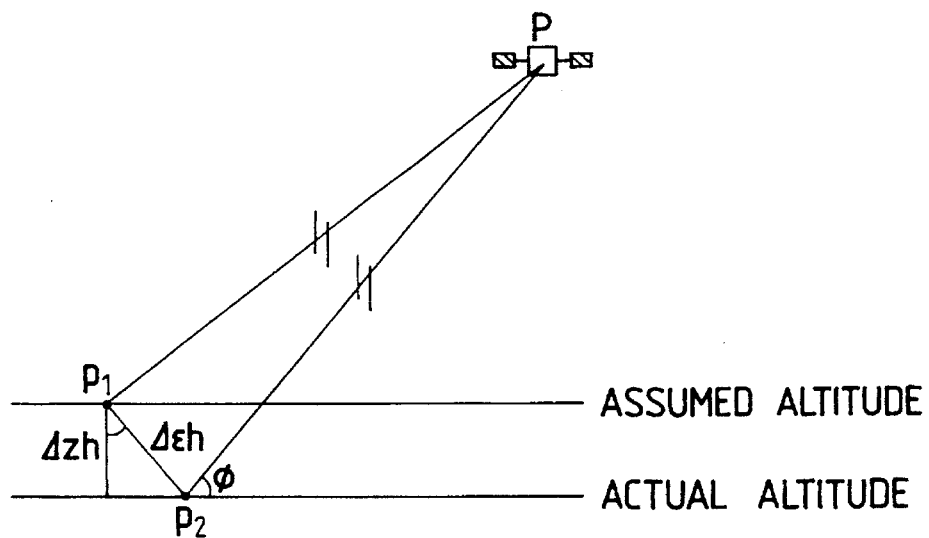
FIG. 14 is a diagram for explaining a positional variation of a straight line due to an error in altitude of a moving body.

The routine now proceeds to step 66 where a positional variation of the straight line caused by those errors is evaluated. With regard to the error in propagation path, the foregoing equation (6) is established as in the first preferred embodiment, except for n=1 due to the number of the GPS satellite being 0 (zero). A positional variation of the straight line caused by the error in altitude will be explained with reference to FIG. 14. In FIG. 14, a position of the car measured at an assumed altitude is represented by $p_1$, an actual position of the car is represented by $p_2$, and a position of the GPS satellite is represented by P. Since the straight line represented by the equation (21) is a horizontal line, the straight line displaces parallelly by a magnitude of $\Delta \epsilon_h$ so as to pass through the point $p_2$. When an error in altitude between the points $p_1$ and $p_2$ is given by $\Delta z_h$, an angle of elevation of the GPS satellite is given by $\phi$ and $r_1$ is sufficiently large as compared with $\Delta z_h$, $\Delta \epsilon_h$ is derived by an equation (22) as follows:

$$\Delta \epsilon_h = \Delta z_h \frac{1}{\cos\phi} \tag{22}$$

Further, an error $\Delta t$ in propagation time due to the error in frequency of the internal oscillator is evaluated as follows:

A time of the newest measurement of the car position based on the normal position derivation is given by tj, and a current GPS time at the GPS receiver is given by $t_k$. Further, an error in GPS time at the GPS receiver measured at the time tj is given by $\Delta tj$, and the error in frequency of the Internal oscillator is given by $\Delta fj$. When the error $\Delta fj$ increases at a constant rate $\alpha$ with lapse of time, $\Delta t$ is derived by an equation (23) as follows:

$$\Delta t = \Delta tj + \int_{tj}^{tk}\left(\Delta fj + \int_{tj}^{u}\alpha d\upsilon\right)du \tag{23}$$

Due to this time error $\Delta t$, a pseudo distance from the car to the GPS satellite is changed by $(\Delta t* c)$. When an angle of elevation of the GPS satellite is given by $\phi$, a positional variation $\Delta \epsilon_t$ of the straight line is derived by an equation (24) as follows:

$$\Delta \epsilon_t = c\Delta t \frac{1}{\cos\phi} \tag{24}$$

Accordingly, a maximum positional variation $\Delta \epsilon$, caused by the foregoing errors, of the straight line represented by the equation (22) is derived by an equation (25) as follows:

$$\Delta \epsilon = |\Delta \epsilon_t| + |\Delta \epsilon_h| + |\Delta \epsilon_t| \tag{25}$$

Accordingly, an equation (26) is derived at step 67 as follows:

$$\frac{X_1}{r_1}\Delta x_0 + \frac{Y_1}{r_1}\Delta y_0 = c \cdot dt_1 \pm \Delta \epsilon \tag{26}$$

$$dt_1 = t_k - \left(t_1 + \frac{r_1}{c}\right)$$

As appreciated, the current car position is limited to within an area defined between the two straight lines represented by the equation (26).

Subsequently, the routine proceeds to step 68 where the velocity vectors of the car are derived based on the foregoing equation (19). However, since n=1, the error $\Delta f$ of the internal oscillator remains. The error $\Delta f$ is represented by an equation (27) as follows:

$$\Delta f = \Delta fj + \int_{tj}^{tk}\alpha d\upsilon \tag{27}$$

As appreciated from the equation (27), the error $\Delta f$ increases with lapse of time from the time of measurement of the car position based on the normal position derivation.

The particular one of the GPS satellites used at steps 65 through 68 may be selected in a manner similar to the manner of selecting the two GPS satellites in the second or third preferred embodiment. As a result, the current car position can be limited to a more specified area.

Further, step 68 may derive the distance L traveled by the car as in the fifth preferred embodiment so as to define the car position area in a more specified manner.

The result of the position derivation at step 62, step 64 or steps 67, 68 is outputted to the display unit 4 for display to the user.

Still further, step 64 and/or step 68 may select one of the velocity vectors like step 57 in FIG. 11 and derive the car position like step 58 in FIG. 11.

Now, a seventh preferred embodiment of the present invention will be described hereinbelow.

Figure 15:
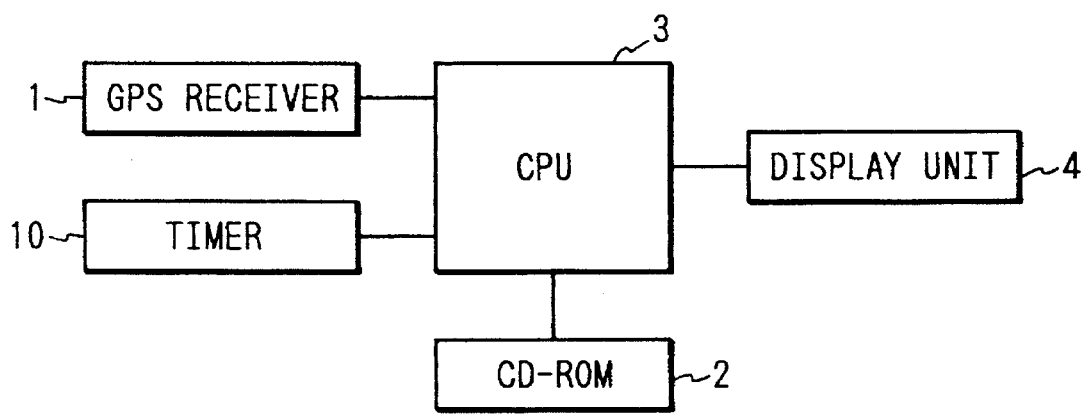
FIG. 15 is a block diagram showing a structure of a position measuring system according to a seventh preferred embodiment of the present invention.

FIG. 15 is a block diagram showing a structure of a position measuring system according to the seventh preferred embodiment. FIG. 15 is the same as FIG. 1 except that a timer 10 for measuring or counting a time is additionally illustrated. Although the timer 10 may be an internal timer of the CPU 3, FIG. 15 Illustrates same for better understanding of a feature of this preferred embodiment.

An operation of the seventh preferred embodiment will be described hereinbelow with reference to a flowchart shown in FIG. 16.

Figure 16:
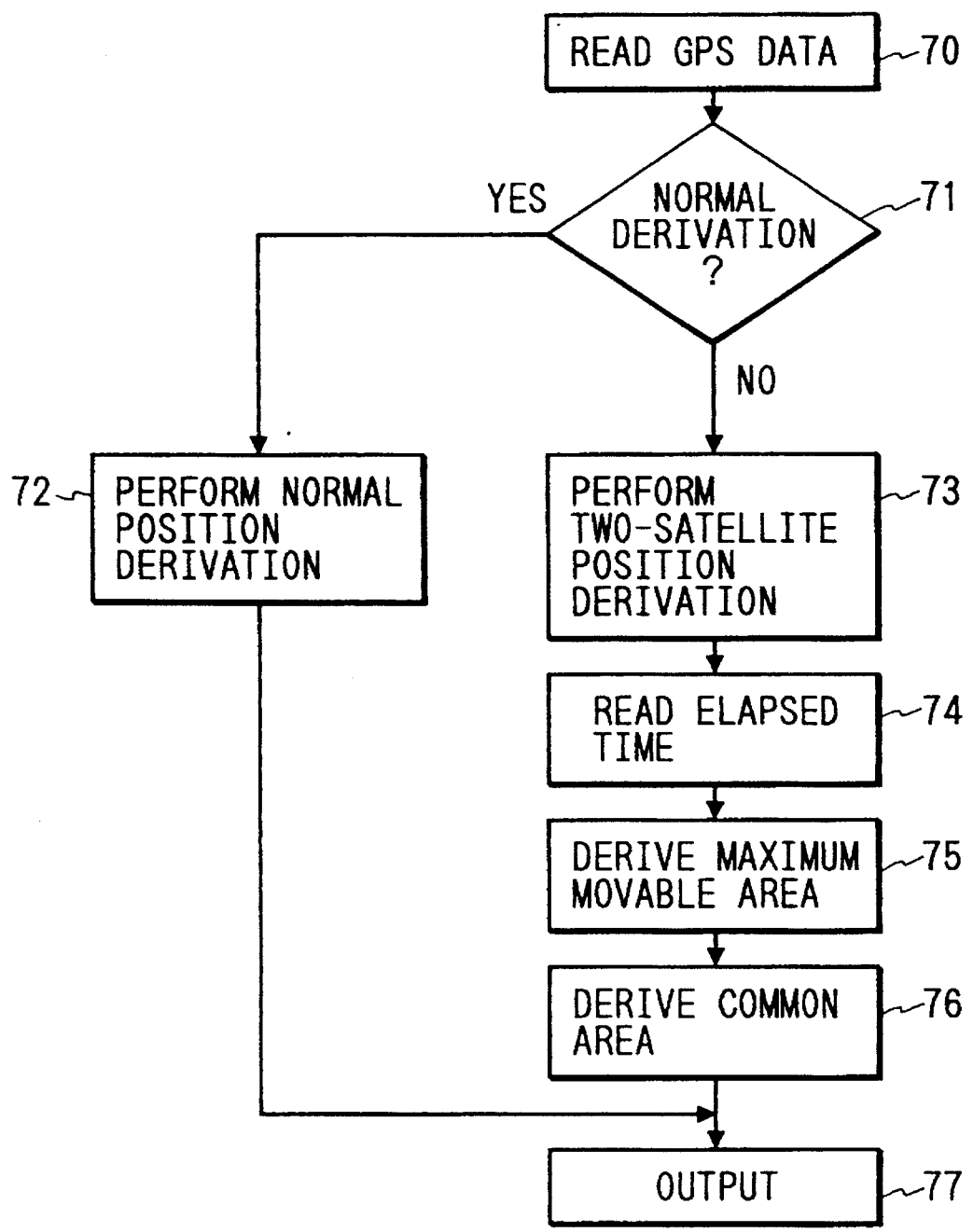
FIG. 16 is a flowchart showing a position deriving routine to be executed by the CPU according to the seventh preferred embodiment.

In FIG. 16, step 70 reads out the GPS data received from the satellites and demodulated at the GPS receiver 1. Subsequently, step 71 determines whether to perform the normal position derivation, like step 2 in FIG. 2. When answer at step 71 is positive, the routine proceeds to step 72 where a current car position and a velocity vector of the car are derived in the known manner based on the GPS data read out at Step 70, like step 3 in FIG. 2. On the other hand, when step 71 determines that the car position can not be derived with the required accuracy based on the normal position derivation while the GPS data from equal to or more than two GPS satellites are available, the routine proceeds to step 73 where the two-satellite position derivation is performed as in the second or third preferred embodiment.

Subsequently, the routine proceeds to step 74 which reads an elapsed time measured by the timer 10 from receipt of the GPS data at the GPS receiver 1 for the newest execution cycle of this routine where step 72 is executed, to receipt of the GPS data at the GPS receiver 1 for the current execution cycle of this routine. Thereafter, step 75 derives, using the car position and the velocity derived by the newest execution of step 72 as initial values, a maximum movable area of the car within the elapsed time on the assumption that the car is accelerated to a maximum speed with a maximum acceleration. Subsequently, the routine proceeds to step 76 where an area common to the areas derived at steps 73 and 75 is derived so as to limit the current car position to within this common area. The routine then proceeds to step 77 where this common area is outputted to the display unit 4.

As appreciated, in the seventh preferred embodiment, even when the GPS data are received from only two GPS satellites, the area in which the current car position exists can be defined as the foregoing common area, using the GPS data from the two GPS satellites and the foregoing elapsed time. Accordingly, the user can easily estimate the current position of the car.

Now, an eighth preferred embodiment of the present invention will be described hereinbelow.

FIG. 15 is also applied to the eighth preferred embodiment. An operation of the eighth preferred embodiment will be described hereinbelow with reference to a flowchart shown in FIG. 17.

Figure 17:
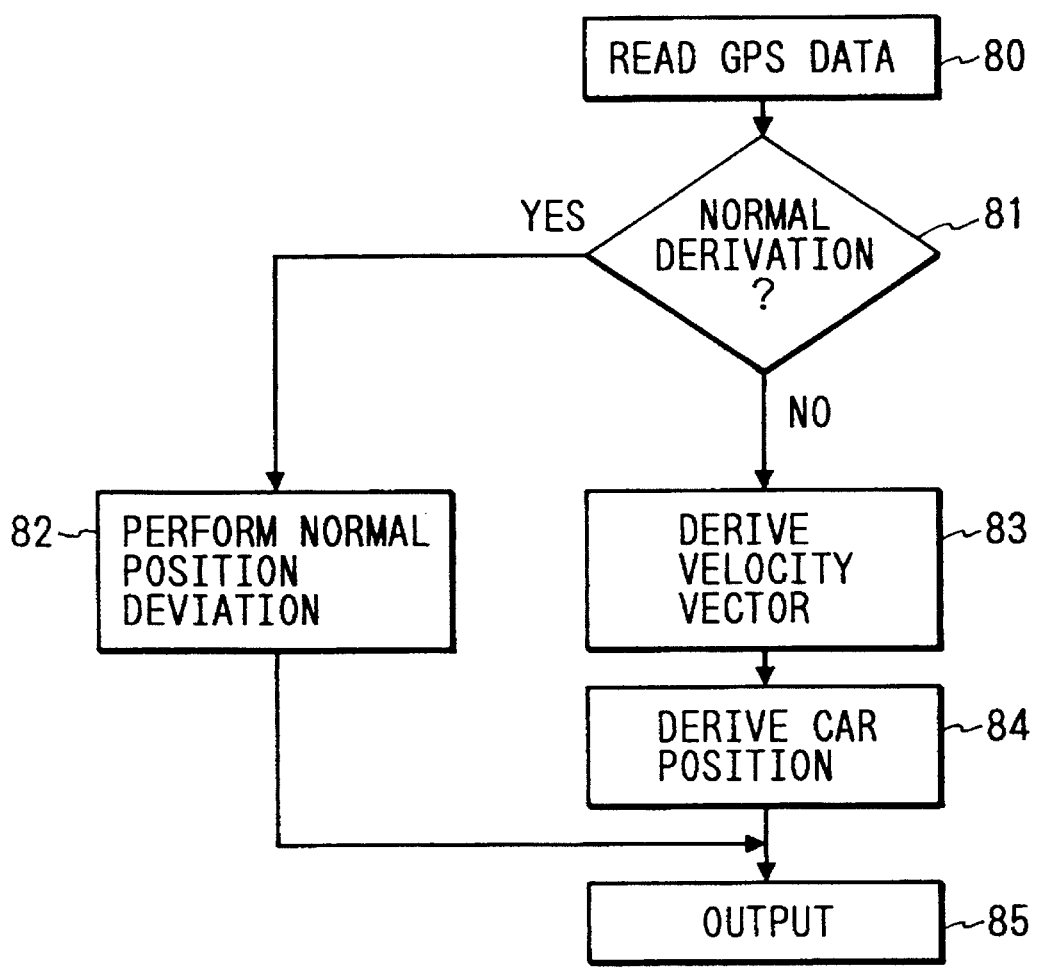

In FIG. 17, step 80 reads out the GPS data received from the satellites and demodulated at the GPS receiver 1. Subsequently, step 81 determines whether to perform the normal position derivation, like step 2 in FIG. 2. When answer at step 81 is positive, the routine proceeds to step 82 where a current car position and a velocity vector of the car are derived in the known manner based on the GPS data read out at step 80, like step 3 in FIG. 2. On the other hand, when step 81 determines that the car position can not be derived with the required accuracy based on the normal position derivation while the GPS data from equal to or more than two GPS satellites are available, the routine proceeds to step 83. Step 83 derives a straight line represented by the foregoing equation (4) or straight lines represented by the foregoing equation (13), as in the foregoing second or third preferred embodiment. Step 83 further derives, using the GPS data read out at step 80, a velocity vector of the car corresponding to a component which is horizontal and perpendicular to the derived straight line or lines.

Subsequently, the routine proceeds to step 84 where the velocity vector derived at step 83 is compared with the velocity vector derived by the newest execution of step 82. Step 84 further reads an elapsed time measured by the timer 10 as in the seventh preferred embodiment. When It is determined that both of the compared velocity vectors are equal to each other and that the measured elapsed time is sufficiently small, step 84 assumes a motion of the car within the measured elapsed time to be a uniform linear motion with the velocity vector derived at step 83 and estimates a current car position using the car position derived by the newest execution of step 82 and the velocity vector derived at step 83. The estimated car position is outputted to the display unit 4 at step 85.

As appreciated, in the eighth preferred embodiment, even when the GPS data are received from only two GPS satellites, the current car position can be estimated based on the GPS data from the two GPS satellites and the measured elapsed time.

Now, a ninth preferred embodiment of the present invention will be described hereinbelow.

FIG. 15 is also applied to the ninth preferred embodiment. An operation of the ninth preferred embodiment will be described hereinbelow with reference to a flowchart shown In FIG. 18.

Figure 18:
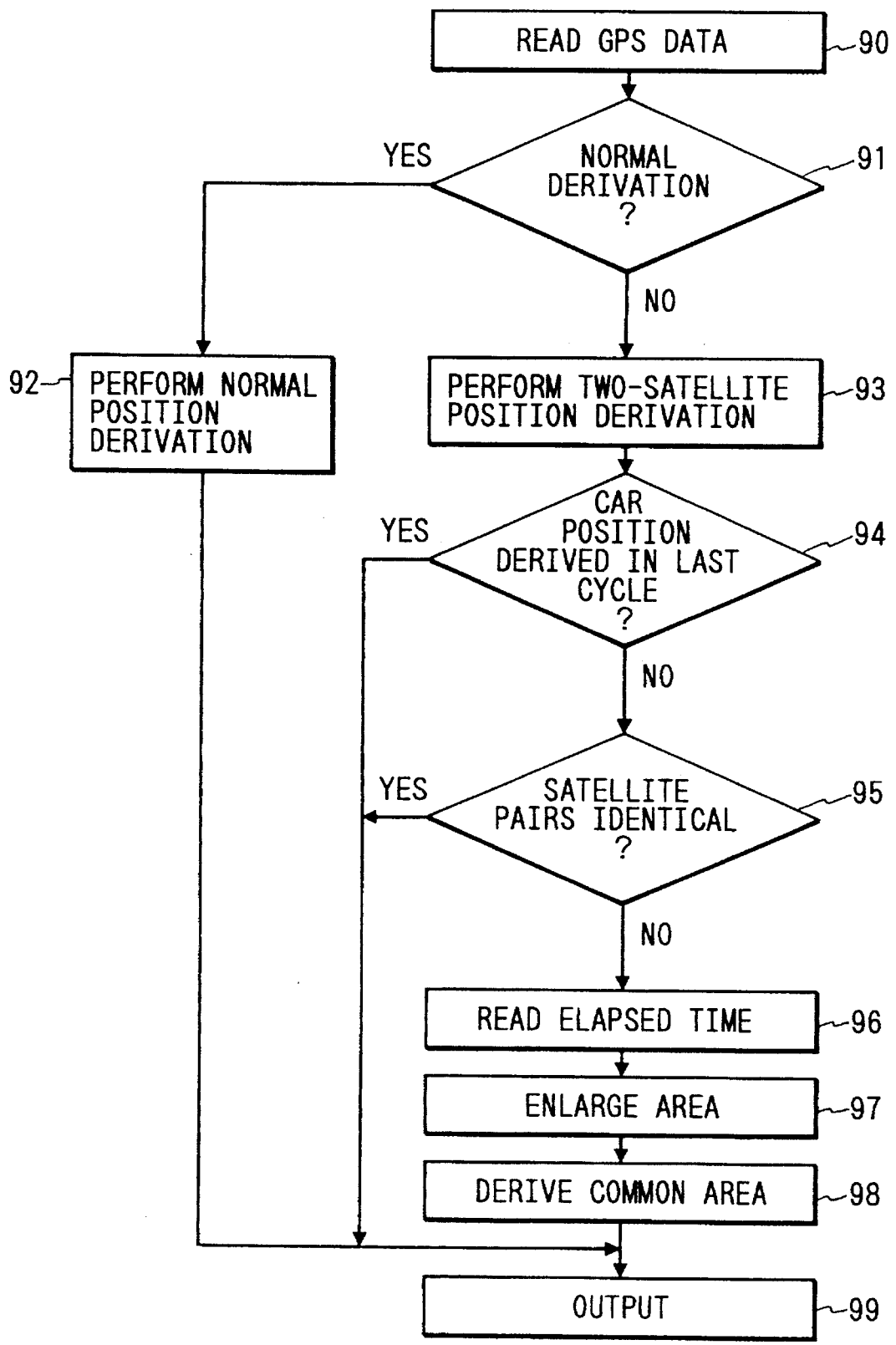
FIG. 18 is a flowchart showing a position deriving routine to be executed by the CPU according to a ninth preferred embodiment of the present invention.

In FIG. 18, step 90 reads out the GPS data received from the satellites and demodulated at the GPS receiver 1. Subsequently, step 91 determines whether to perform the normal position derivation, like step 2 in FIG. 2. When answer at step 91 is positive, the routine proceeds to step 92 where a current car position and a velocity vector of the car are derived in the known mariner based on the GPS data read out at step 90, like step 3 in FIG. 2. On the other hand, when step 91 determines that the car position can not be derived with the required accuracy based on the normal position derivation while the GPS data from equal to or more than two GPS satellites are available, the routine proceeds to step 93 where the two-satellite position derivation is performed as in the second or third preferred embodiment.

Subsequently, the routine proceeds to step 94 which determines whether the car position was derived at step 92 in the last execution cycle of this position deriving routine. If answer at step 94 is positive, the area between the two straight lines derived at step 93 is considered to be an area where the current car position exists, and outputted to the display unit 4 at step 99. On the other hand, if answer at step 94 is negative, that is, the two-satellite position derivation was executed at step 93 in the last execution cycle of this position deriving routine, step 95 determines whether numbers of the two GPS satellites used in the last execution cycle of this routine are identical to numbers of the two GPS satellites used in the current execution cycle of this routine. In other words, step 95 determines whether last and current pairs of the GPS satellites are identical to each other. If answer at step 95 is positive, the area between the two straight lines derived at step 93 is considered to be an area where the current car position exists, and outputted to the display unit 4 at step 99. On the other hand, ff answer at step 95 is negative, the routine proceeds to step 96 which reads an elapsed time measured by the timer 10 from receipt of the GPS data at the GPS receiver 1 for the last execution cycle of this routine to receipt of the GPS data for the current execution cycle of this routine. Subsequently, step 97 derives a maximum movable distance of the car based on the measured elapsed time, the maximum speed of the car and the maximum acceleration of the car. Step 97 then enlarges the area between the two straight lines derived by the last execution of step 93, Specifically, step 97 enlarges the area by displacing the two straight lines away from each other by a magnitude of the maximum movable distance for each straight line, Subsequently, the routine proceeds to step 98 which derives an area common to both of the areas derived by the current execution of steps 93 and 97. This common area represents an area where the current car position exists.

As appreciated, in the ninth preferred embodiment, the result of the two-satellite position derivation is processed in different manners according to the result of the position derivation in the last execution cycle of the position deriving routine and according to identity of the last and current pairs of the GPS satellites.

Now, a tenth preferred embodiment of the present invention will be described hereinbelow.

Figure 19:
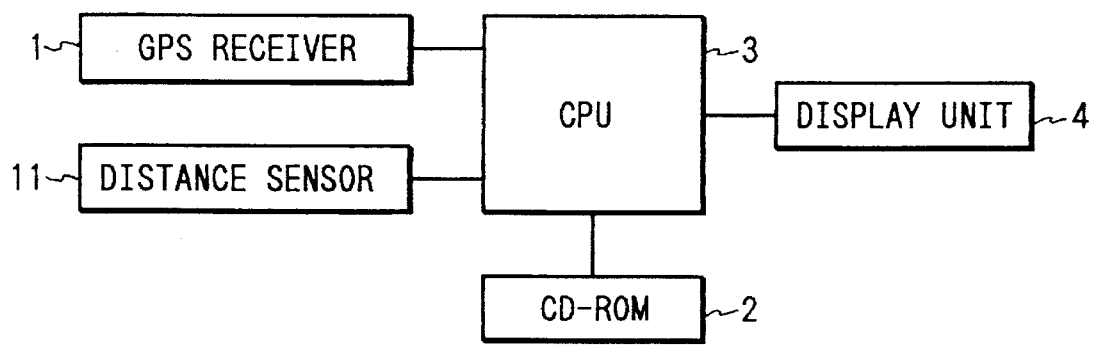

FIG. 19 is a block diagram showing a structure of a position measuring system according to the tenth preferred embodiment. FIG. 19 is the same as FIG. 15 except that the timer 10 is replaced by a distance sensor 11.

An operation of the tenth preferred embodiment will be described hereinbelow with reference to a flowchart shown in FIG. 20.

Figure 20:
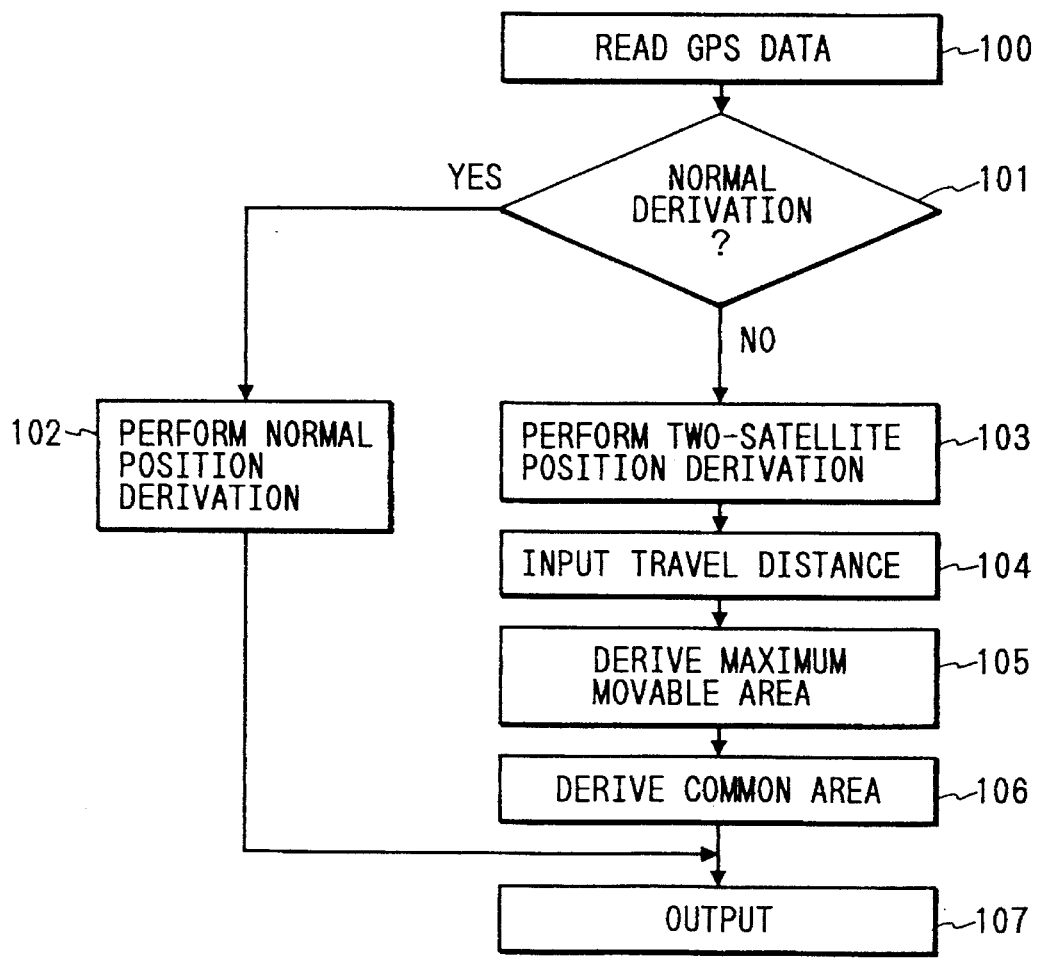
FIG. 20 is a flowchart showing a position deriving routine to be executed by the CPU according to the tenth preferred embodiment.

In FIG. 20, step 100 reads out the GPS data received from the satellites and demodulated at the GPS receiver 1. Subsequently, step 101 determines whether to perform the normal position derivation, like step 2 in FIG. 2. When answer at step 101 is positive, the routine proceeds to step 102 where a current car position and a velocity vector of the car are derived in the known manner based on the GPS data read out at step 100, like step 3 in FIG. 2. On the other hand, when step 101 determines that the car position can not be derived with the required accuracy based on the normal position derivation while the GPS data from equal to or more than two GPS satellites are available, the routine proceeds to step 103 where the two-satellite position derivation is performed as in the second or third preferred embodiment.

Subsequently, the routine proceeds to step 104 which reads a distance traveled by the car, as monitored by the distance sensor 11, from receipt of the GPS data at the GPS receiver 1 for the newest execution cycle of this routine where step 102 is executed, to receipt of the GPS data at the GPS receiver 1 for the current execution cycle of this routine. Thereafter, step 105 derives, using the distance traveled by the car, a maximum movable area of the car with respect to the car position derived by the newest execution of step 102. Subsequently, the routine proceeds to step 106 where an area common to the areas derived at steps 103 and 105 is derived so as to limit the current car position to within this common area. The routine then proceeds to step 107 where this common area is outputted to the display unit 4.

As appreciated, in the tenth preferred embodiment, even when the GPS data are received from only two GPS satellites, the area in which the current car position exists can be defined as the foregoing common area, using the GPS data from the two GPS satellites and the foregoing distance-traveled by the car. Accordingly, the user can easily estimate the current position of the car.

Now, an eleventh preferred embodiment of the present invention will be described hereinbelow.

Figure 21:
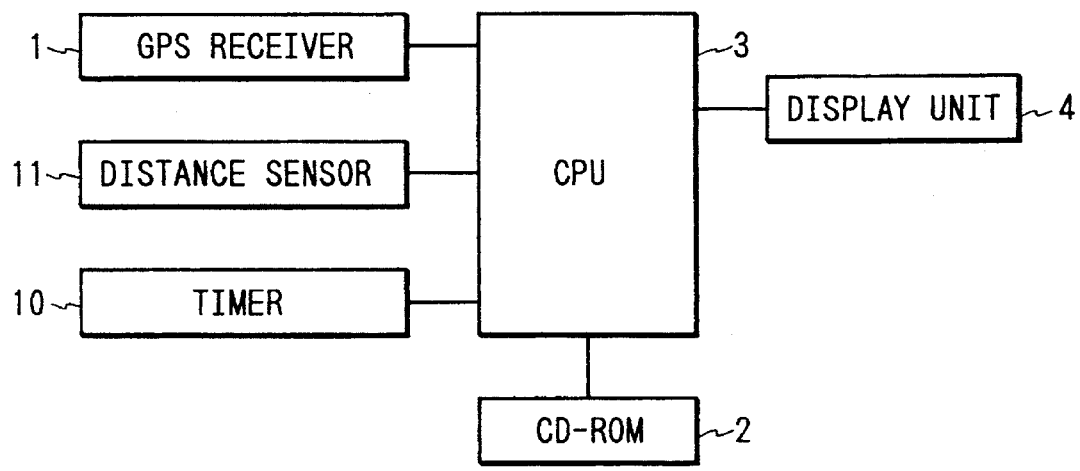
FIG. 21 is a block diagram showing a structure of a position measuring system according to an eleventh preferred embodiment of the present invention.

FIG. 21 is a block diagram showing a structure of a position measuring system according to an eleventh preferred embodiment of the present invention. FIG. 21 is the same as FIG. 19 except that the timer 10 is additionally illustrated.

An operation of the eleventh preferred embodiment will be described hereinbelow with reference to a flowchart shown in FIG. 22.

In FIG. 22, step 110 reads out the GPS data received from the satellites and demodulated at the GPS receiver 1. Subsequently, step 111 determines whether to perform the normal position derivation, like step 2 in FIG. 2. When answer at step 111 is positive, the routine proceeds to step 112 where a current car position and a velocity vector of the car are derived in the known manner based on the GPS data read out at step 110, like step 3 in FIG. 2. On the other hand, when step 111 determines that the car position can not be derived with the required accuracy based on the normal position derivation while the GPS data from equal to or more than two GPS satellites are available, the routine proceeds to step 113. Step 113 derives a straight line represented by the foregoing equation (4) or straight lines represented by the foregoing equation (13), as in the foregoing second or third preferred embodiment, Step 113 further derives, using the GPS data read out at step 110, a velocity vector of the car corresponding to a component which is horizontal and perpendicular to the derived straight line or lines.

Subsequently, step 114 reads a distance traveled by the car as monitored by the distance sensor 111 and step 115 reads a corresponding elapsed time as monitored by the timer 10 so that step 116 derives a speed of the car based on the distance at step 114 and the corresponding time at 115.

The routine now proceeds to step 117 where a moving direction of the car is derived in the following manner:

A horizontal right triangle is assumed. A first side of this triangle other than a hypotenuse is formed by the velocity vector corresponding to the component perpendicular to the straight line or lines and derived at step 113 (hereinafter referred to as "the first vector component") and drawn as approaching the straight line or lines. A second side of this triangle other than the hypotenuse is formed by a velocity vector corresponding to a component along or horizontal to the straight line or lines (hereinafter referred to as "the second vector component"). The second side is drawn from an end of the first side closer to the straight line or lines in either one of opposite directions along the straight line or lines. The hypotenuse is drawn from the other end of the first side remote from the straight line or lines and has a length corresponding to the speed derived at step 116. As appreciated, a length of the second side (a magnitude of the second vector component) and a direction of the hypotenuse are not known. As further appreciated, the moving direction of the car and its speed can be represented by a velocity vector which is a sum of the first and second vector components. Since a magnitude and a direction of the first vector component is known and a direction of the second vector component is known (one of the opposite directions along the straight line or lines is selected), if the magnitude of the second vector component is derived, the required velocity vector of the car can be derived.

Since the length of the hypotenuse and the magnitude of the first vector component are known, an angle between the hypotenuse and the first vector component is derived by an inverse cosine of a ratio of the first vector component to the hypotenuse. Further, a ratio of the second vector component to the hypotenuse is derived by a sine of the derived angle. Since the length of the hypotenuse is known, the magnitude of the second vector component can be derived based on the derived ratio. Now, the magnitudes and directions of the first and second vector components are known so that the moving direction of the car and its speed can be derived as the sum of the first and second vector component. As described above, the second vector component may have a direction opposite to that in the foregoing triangle, that is, another horizontal triangle may be assumed, which is symmetrical to the foregoing triangle with respect to the first vector component. Accordingly, another velocity vector of the car may be derived, which is symmetrical to the foregoing velocity vector With respect to the first vector component. Since the two velocity vectors are assumed, one of them should be selected. In this respect, step 11 17 uses a stored velocity vector derived by the newest execution of step 112. Specifically, step 117 selects one of the velocity vectors which is closer in direction to that of the stored velocity vector.

In practice, however, since the hypotenuse represents the velocity vector to be derived and the magnitude of the hypotenuse is known as derived at step 116, by deriving the angle between the hypotenuse and the first vector component using the inverse cosine, the foregoing two symmetrical velocity vectors are determined.

As in the foregoing manner, step 117 derives the moving direction of the car. This derived moving direction is outputted to the display unit 4 at step 118.

As appreciated, in the eleventh preferred embodiment, even when the GPS data are received from only two GPS satellites, the moving direction of the car can be derived based on the GPS data from the two GPS satellites and the speed of the car derived by the outputs of the timer and the distance sensor, so as to be displayed to the user. It may also be arranged to display the moving direction along with the magnitude of the car speed.

Now, a twelfth preferred embodiment of the present invention will be described hereinbelow.

Figure 23:
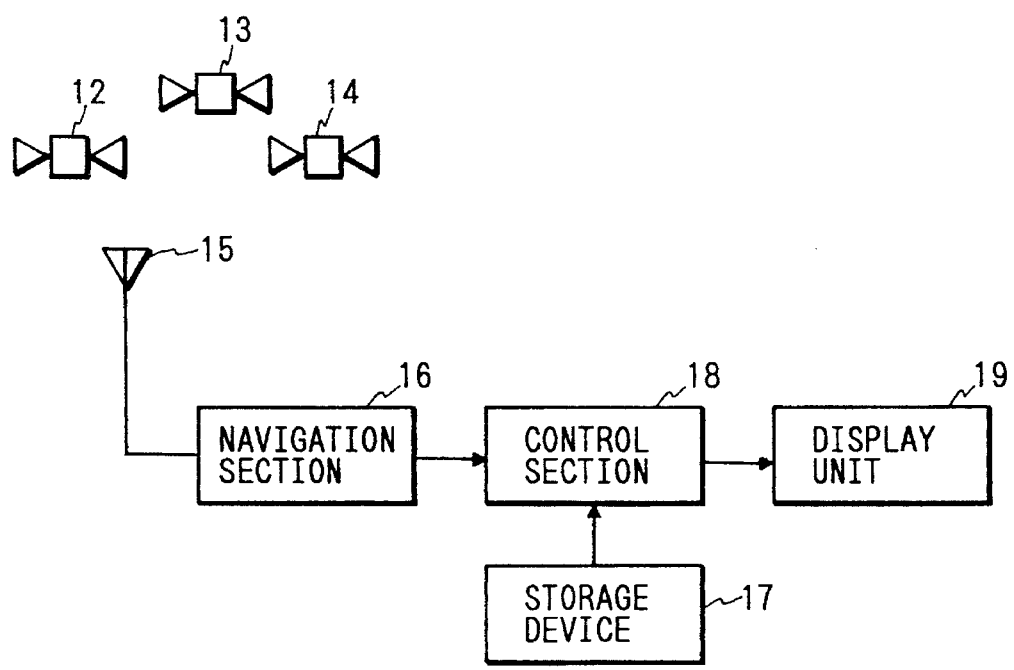
FIG. 23 is a block diagram showing a structure of a position measuring system according to a twelfth preferred embodiment of the present invention.

FIG. 23 is a block diagram showing a structure of a position measuring system according to a twelfth preferred embodiment of the present invention.

In FIG. 23, numerals 12, 13 and 14 represent the GPS satellites used in the satellite navigation system, respectively. Numeral 15 denotes an antenna for catching the radio waves from the GPS satellites, numeral 16 denotes a navigation section for deriving a current car position using the GPS data on the radio waves from the GPS satellites, numeral 17 denotes a storage device for storing road map data, numeral 18 denotes a control section for processing the positional data from the navigation section 16 for display on a display unit 19 along with corresponding road map data read out from the storage device 17.

FIGS. 24, 25, 26 and 27 show display images to be displayed on a display screen of the display unit 19, respectively, according to the twelfth preferred embodiment of the present invention. In these figures, solid lines represent road shoulders, respectively.

Figure 24:
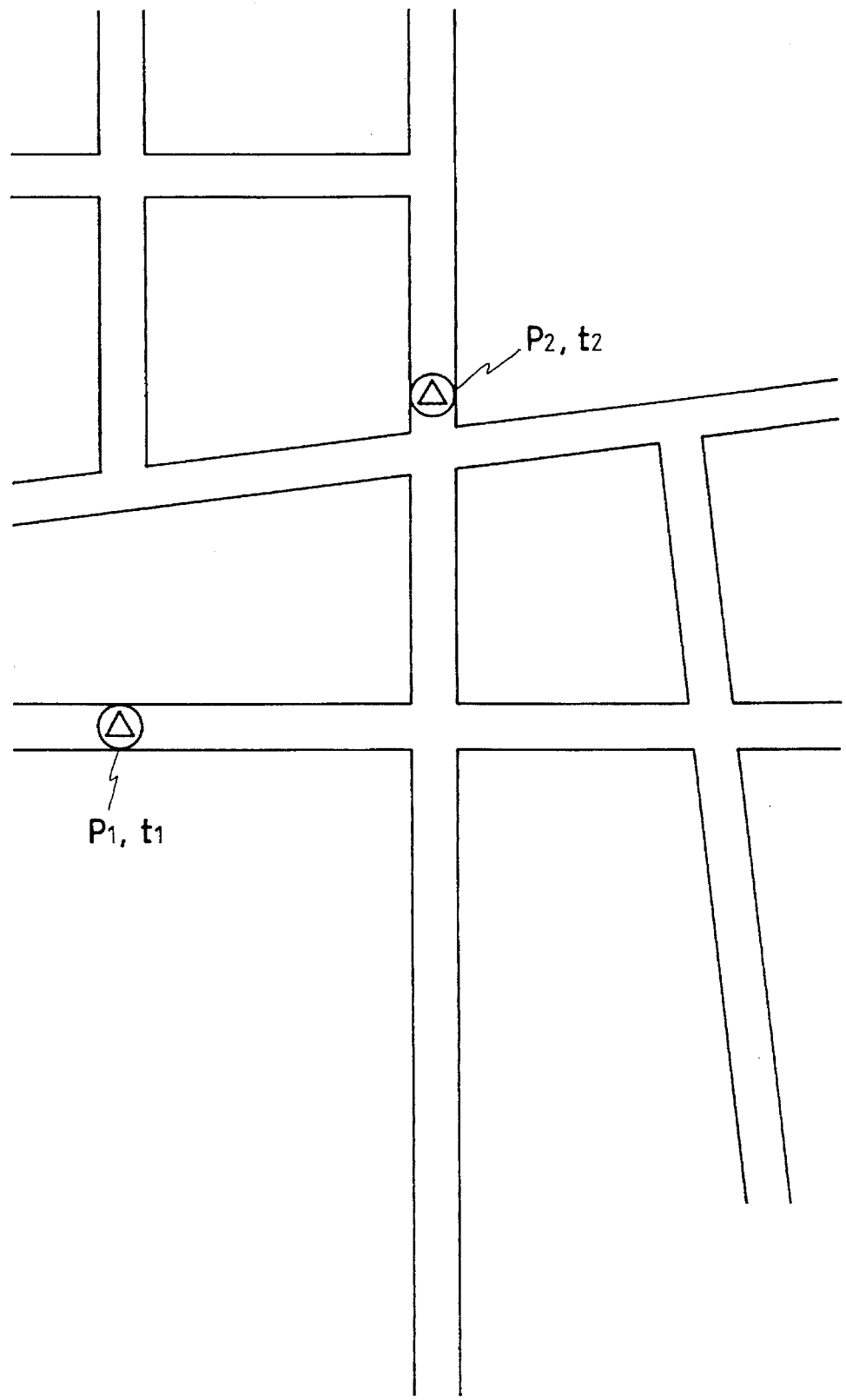
FIGS. 24, 25, 26 and 27 are diagrams, respectively, showing display images to be displayed on a display screen of a display unit according to the twelfth preferred embodiment of the present invention.
Figure 25:
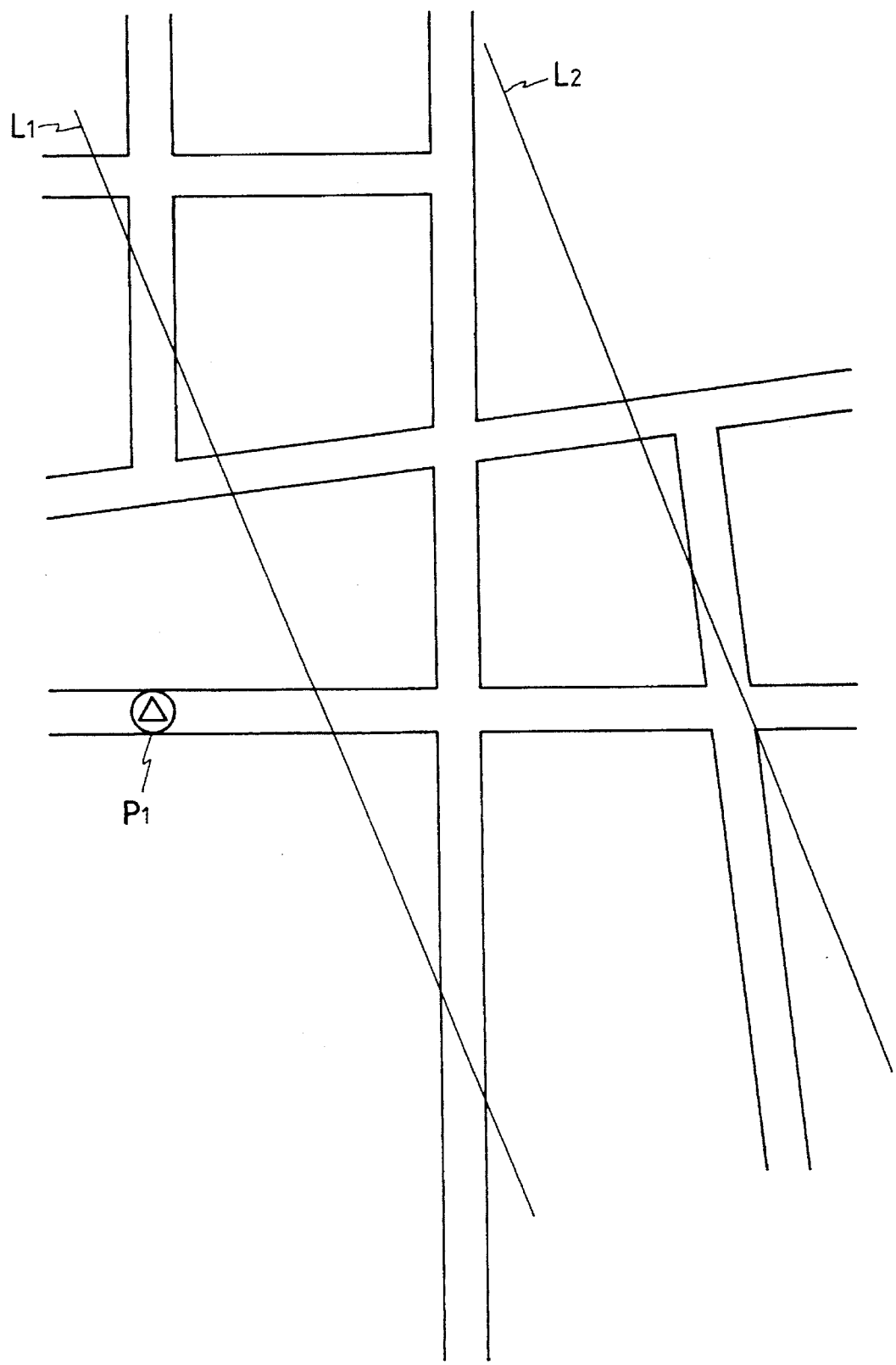
Figure 26:
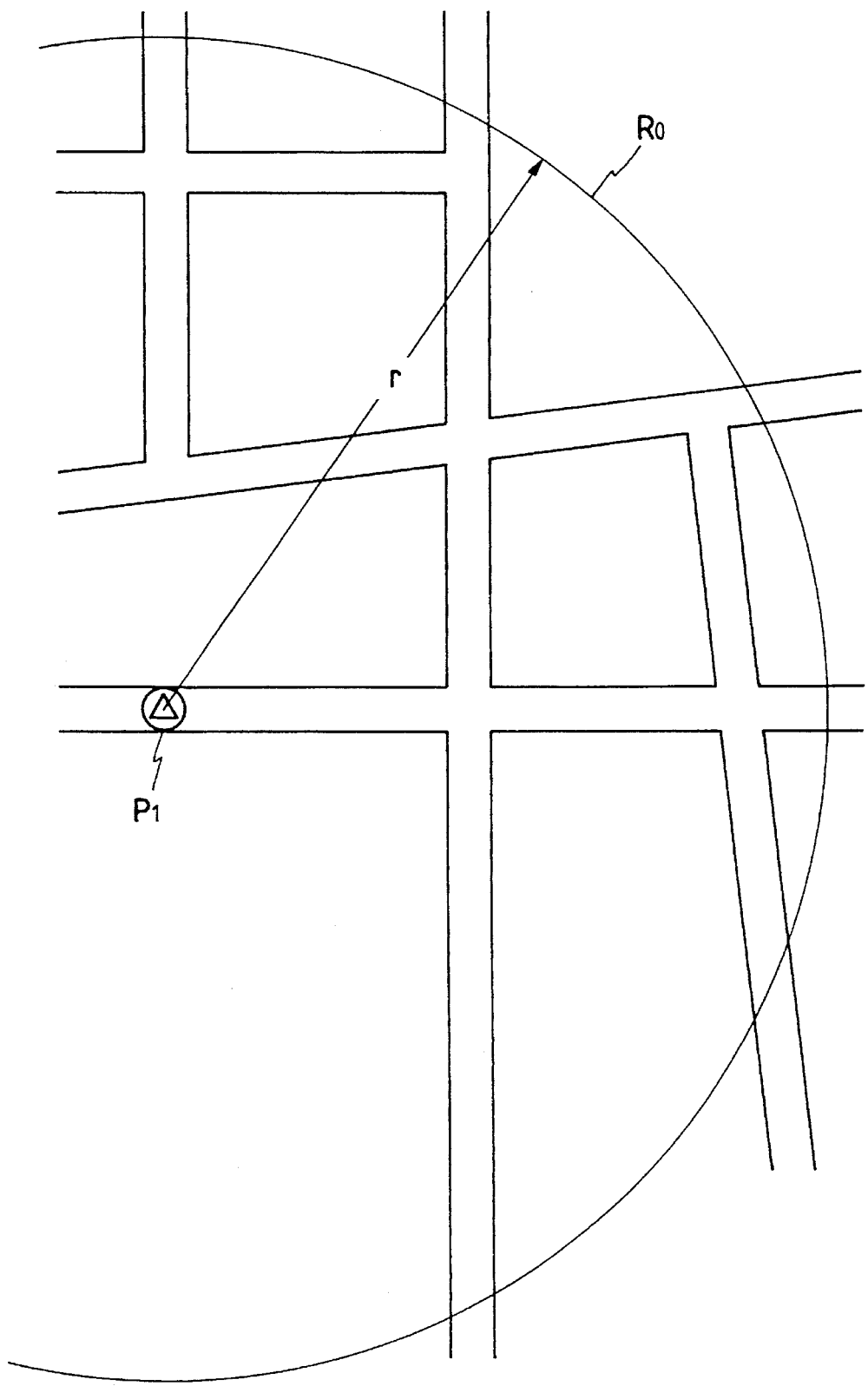
Figure 27:
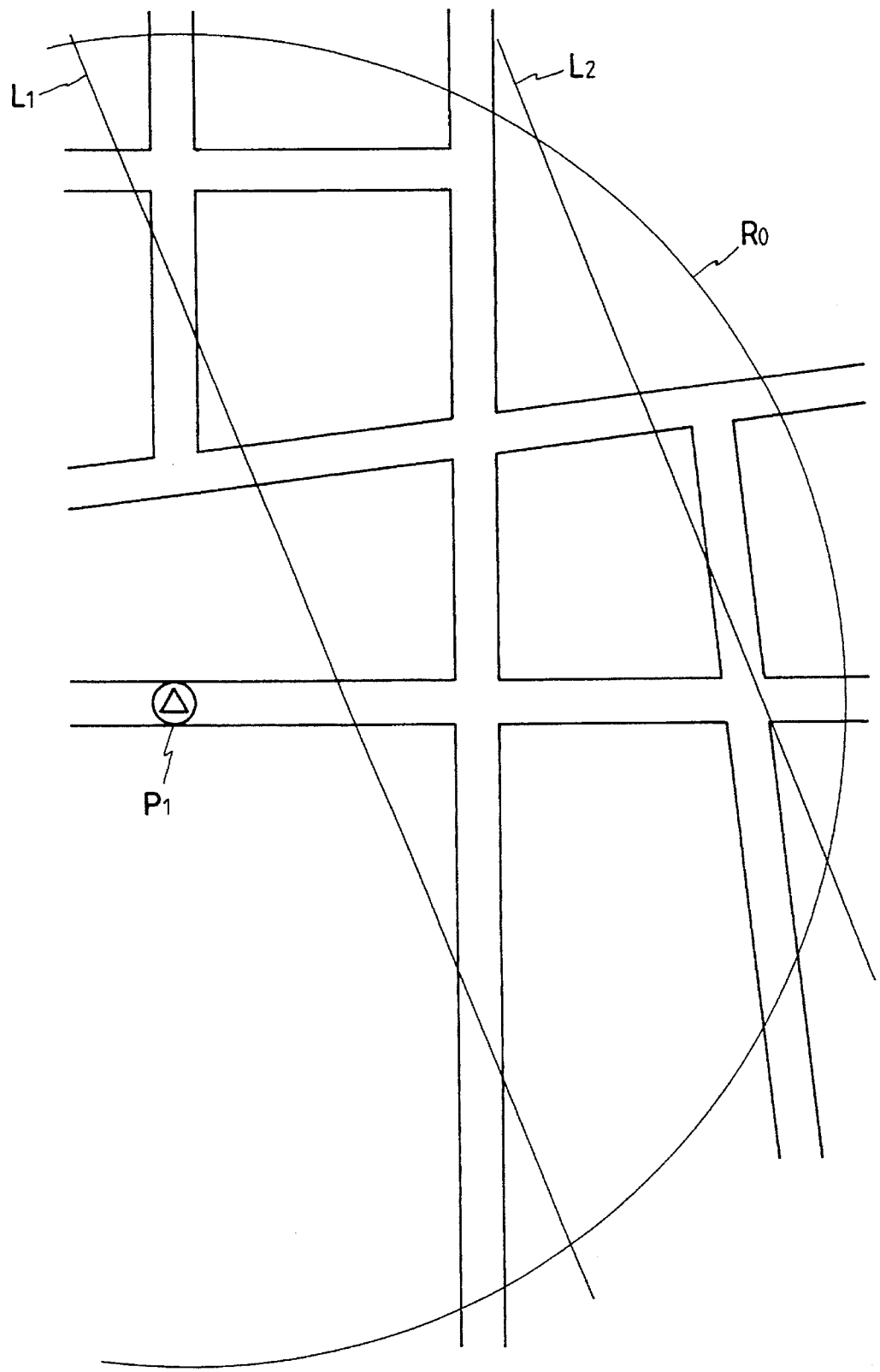

In FIG. 24, P1 represents a car position measured at time $t_1$ based on the GPS data from three or four GPS satellites, and $P_2$ represents a car position measured at time $t_2$ in the same manner. As appreciated, the car positions $P_1$ and $P_2$ are derived by performing the foregoing normal position derivation, for example, like step 72 in FIG. 16. In FIG. 25. $L_1$ and $L_2$ represent two straight lines which define therebetween an area where a current car position may exist. As appreciated, the two straight lines are derived by performing the foregoing two satellite position derivation, for example, like step 73 in FIG. 16. In FIG. 26, Ro represents a circle having a radius corresponding to a maximum distance r which can be traveled by the car from the position $P_1$. As appreciated, the circle Ro defines the maximum movable area of the car and is derived by executing, such as, step 75 in FIG. 16. In FIG. 27, the two straight lines L 1, L2 in FIG. 25 and the circle Ro in FIG. 26 are shown in a superimposed manner. As appreciated, an overlapping area therebetween corresponds to the common area derived, such as, at step 76 in FIG. 16.

Figure 28:
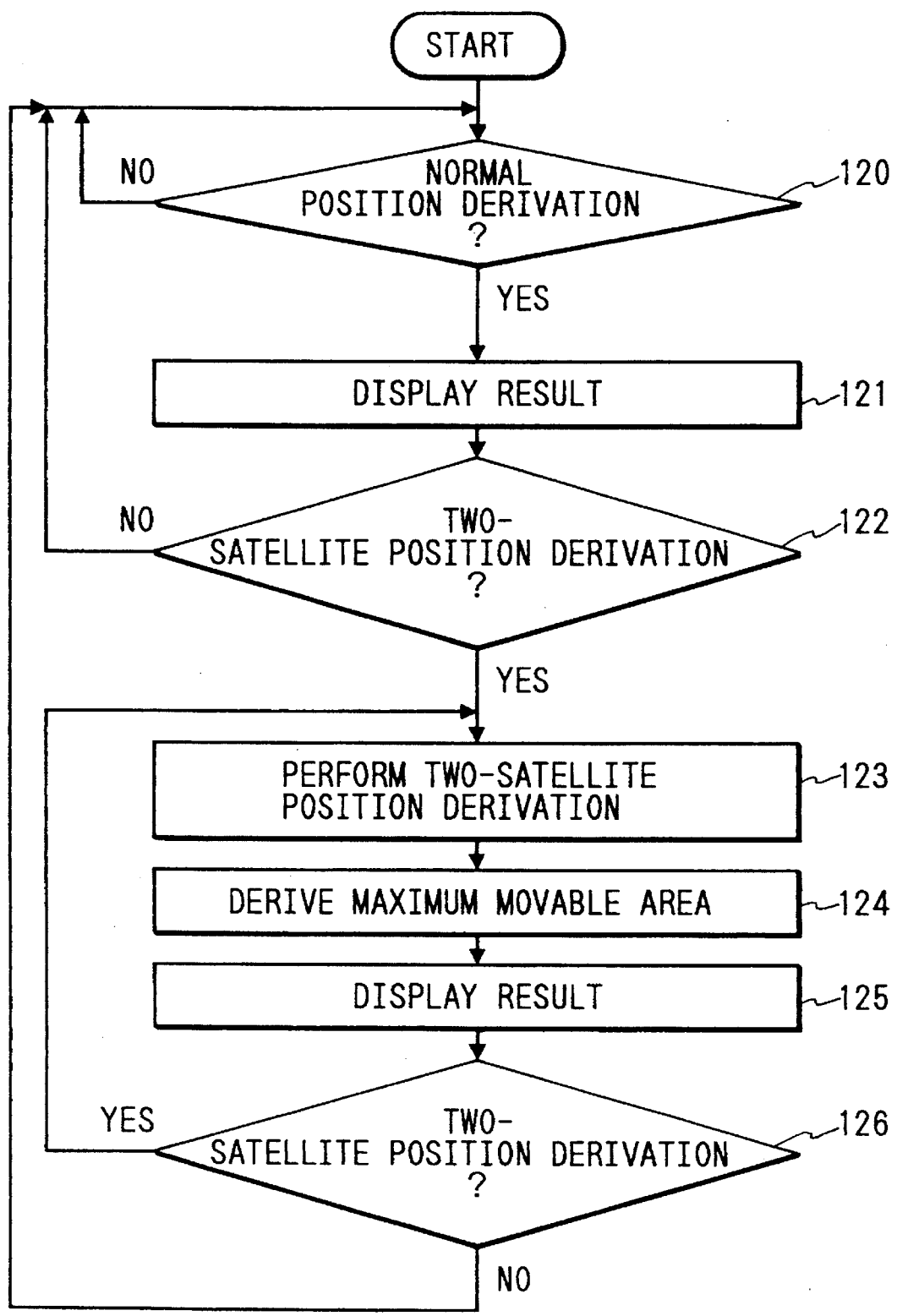
FIG. 28 is a time-domain conceptual diagram for explaining an operation of the position measuring system according to the twelfth preferred embodiment.

FIG. 28 is a time-domain conceptual diagram for explaining an operation of the position measuring system according to the twelfth preferred embodiment.

In FIG. 28, at step 120, the GPS data on the radio waves are received from the three GPS satellites 12, 13 and 14 via the antenna 15 at time tt so that the navigation section 16 derives the current position $P_1$ based on the received GPS data. Although the number of the GPS satellites Is three in this preferred embodiment, the number thereof may be four. At step 121., the derived position $P_1$ is inputted to the control section 18 so as to be displayed on the display unit 19 along with the corresponding road map data stored in the storage device 17, as shown in FIG. 24. When it is assumed at step 122 that the GPS data are received from only the two GPS satellites 12 and 13 at time $t_2$, the two-satellite position derivation is performed at step 123. Specifically, as shown in FIG. 25, the straight lines $L_1$ and $L_2$ are derived based on the GPS data from the two GPS satellites 12 and 13. At step 124, on the assumption that the car moves at a maximum speed, the maximum movable distance r of the car within an elapsed time dt between time $t_1$ and $t_2$ is derived. Accordingly, the maximum movable area of the car can be defined by the circle Ro as shown in FIG. 26. At step 125, the straight lines $L_1$ and $L_2$ derived at step 123 and the circle Ro derived at step 124 are displayed on the display unit 19 in a superimposed manner so as to limit the current car position to within the overlapping area as shown in FIG. 27. Thereafter, when the GPS data are received from only the two GPS satellites at step 126, steps 123 to 125 are .repeated. On the other hand, when the GPS data are received from the three GPS satellites at step 126, step 120 is executed. 15 In FIG. 27, the overlapping area may be highlighted by, for example, assigning a different color thereto, which helps the user to easily identify the area where the current car position exists.

As appreciated, in the twelfth preferred embodiment, even when the GPS data are received from only two GPS satellites, the area In which the current car position exists can be displayed so that the user can easily estimate the current car position.

Now, a thirteenth preferred embodiment of the present invention will be described hereinbelow.

FIGS. 23 to 26 are also applied to the thirteenth preferred embodiment.

Figure 29:
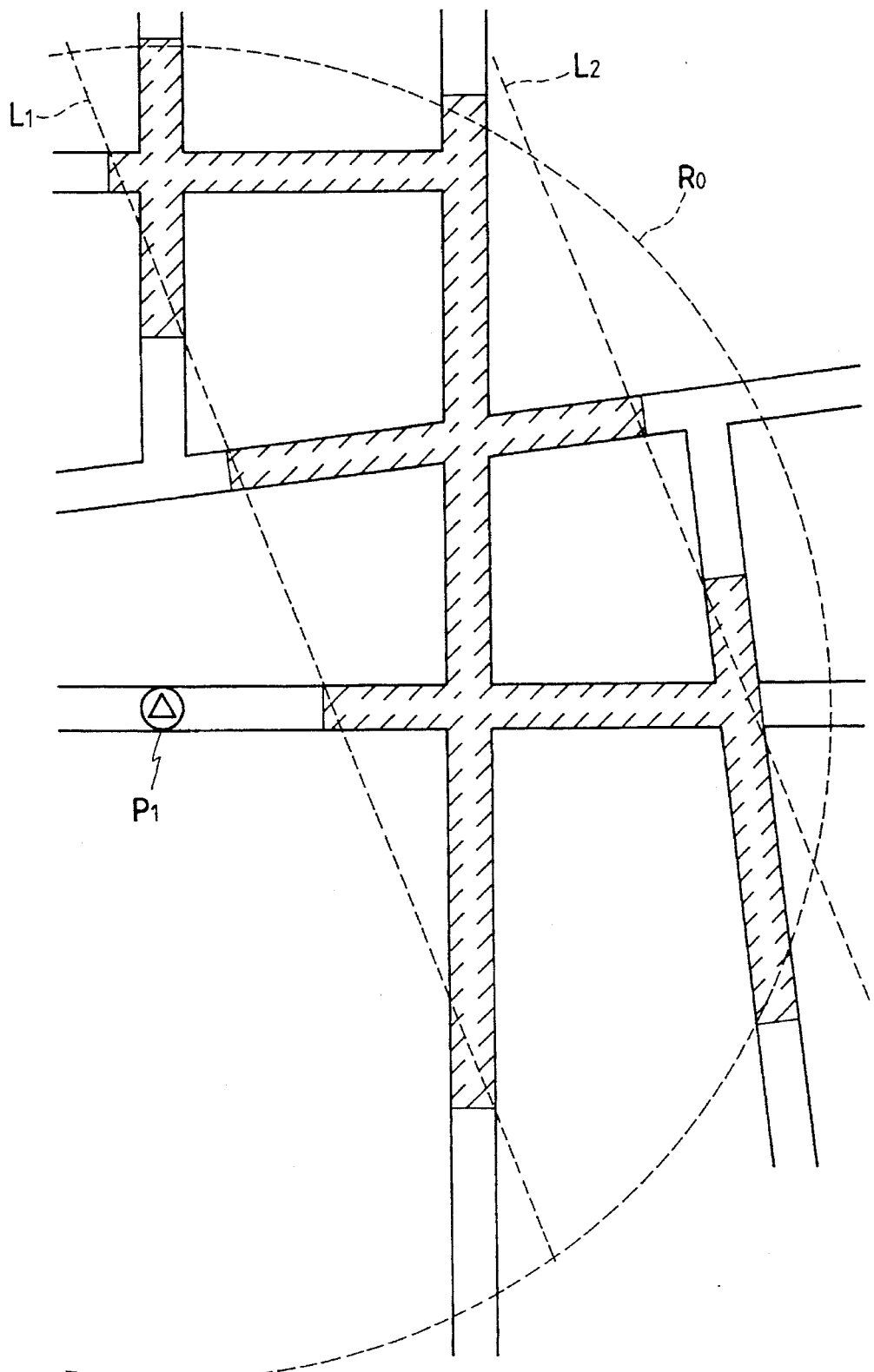
FIG. 29 is a diagram showing a display image to be displayed on a display screen of a display unit according to a thirteenth preferred embodiment of the present invention.

FIG. 29 shows a display image to be displayed on a display screen of the display unit: 19 according to the thirteenth preferred embodiment. In FIG. 29, elements represented by $P_1$, $L_1$, $L_2$ and Ro are the same as those represented by the same marks in FIGS. 24 to 26 in the twelfth preferred embodiment.

Figure 30:
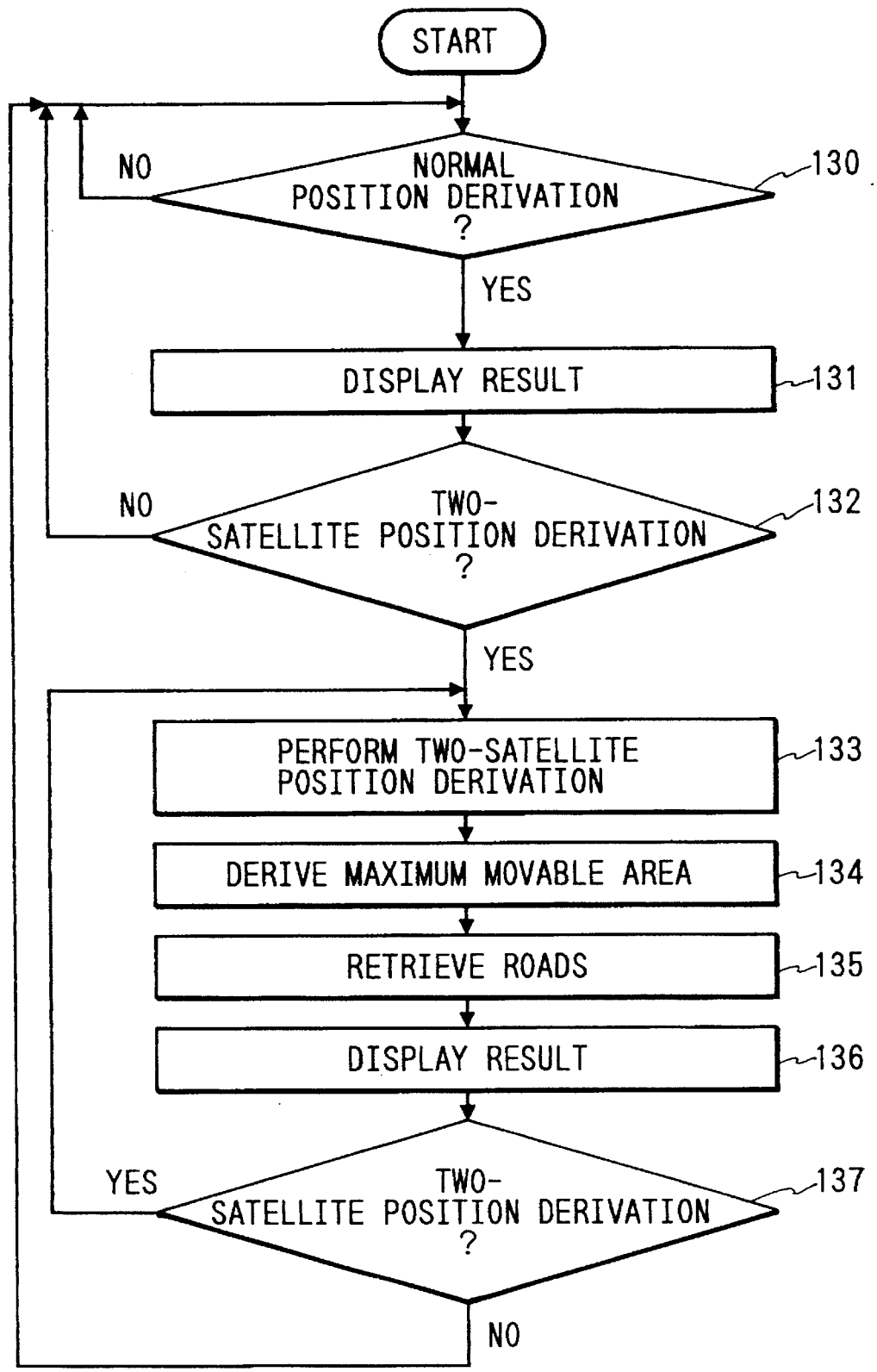
FIG. 30 is a time-domain conceptual diagram for explaining an operation of the position measuring system according to the thirteenth preferred embodiment.

FIG. 30 is a time-domain conceptual diagram for explaining an operation of the position measuring system according to the thirteenth preferred embodiment.

In FIG. 30, at step 130, the GPS data on the radio waves are received from the three GPS satellites 12, 13 and 14 via the antenna 15 at time $t_1$ so that the navigation section 16 derives the current position $P_1$ based on the received GPS data. The number of the GPS satellites may be four other than three. At step 13 1, the derived position $P_1$ is inputted to the control section 18 so as to be displayed on the display unit 19 along with the corresponding road map data stored tn the storage device 17, as shown in FIG. 24. When it is assumed at step 132 that the GPS data are received from only the two GPS satellites 12 and 14 at time $t_2$, the two-satellite position derivation is performed at step 133. Specifically, as shown in FIG. 25, the straight lines $L_1$ and $L_2$ are derived based on the GPS data from the two GPS satellites 12 and 14. At step 134, on the assumption that the car moves at a maximum speed, the maximum movable distance r of the car within an elapsed time dt between time $t_1$ and $t_2$ is derived. Accordingly, the maximum movable area of the car can be defined by the circle Ro as shown in FIG. 26. At step 135, roads existing In the overlapping area between the area identified by the circle Ro and the area identified by the two straight lines $L_1$ and $L_2$ are retrieved from the road map data stored in the storage device 17. At step 136, the results of steps 133, 134 and 135 are displayed on the display unit 19 in a superimposed manner. As shown in Pig. 29, the retrieved roads are highlighted by hatching. On the other hand, the retrieved roads may be highlighted by coloring or the like.

Thereafter, when the GPS data are received from only the two GPS satellites at step 137, steps 133 to 136 are repeated. On the other hand, when the GPS data are received from the three GPS satellites at step 137, step 130 is executed.

As appreciated, in the thirteenth preferred embodiment, even when the GPS data are received from only two GPS satellites, the area in which the current car position exists can be identified on the roads with proper highlighting on the display screen so that the user can easily estimate the current car position.

Now, a fourteenth preferred embodiment of the present invention will be described hereinbelow.

FIGS. 23 to 26 are also applied to the fourteenth preferred embodiment.

Figure 31:
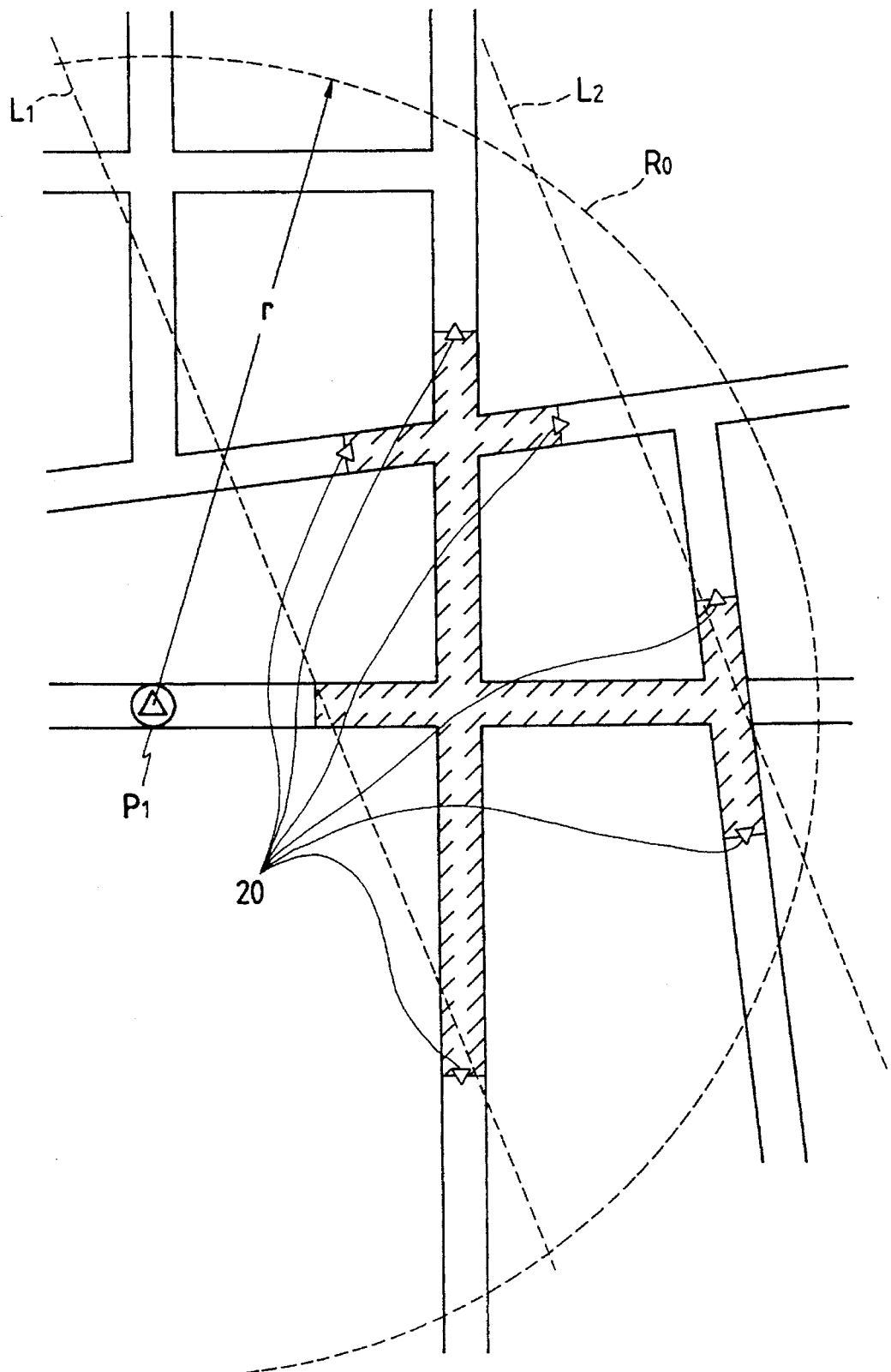
FIG. 31 shows a display image to be displayed on a display screen of a display unit according to a fourteenth preferred embodiment of the present invention.

FIG. 31 shows a display image to be displayed on a display screen of the display unit 19 according to the fourteenth preferred embodiment. In FIG. 31, elements represented by $P_1$, $L_1$, $L_2$, r and Ro are the same as those represented by the same marks in FIGS. 24 to 26 in the twelfth preferred embodiment. In FIG. 3 1, numeral 20 denotes a symbol representing each of points which are located at a distance of r from the position $P_1$ on or along the corresponding roads, FIG. 32 is a time-domain conceptual diagram for explaining an operation of the position measuring system according to the fourteenth preferred embodiment.

Figure 32:
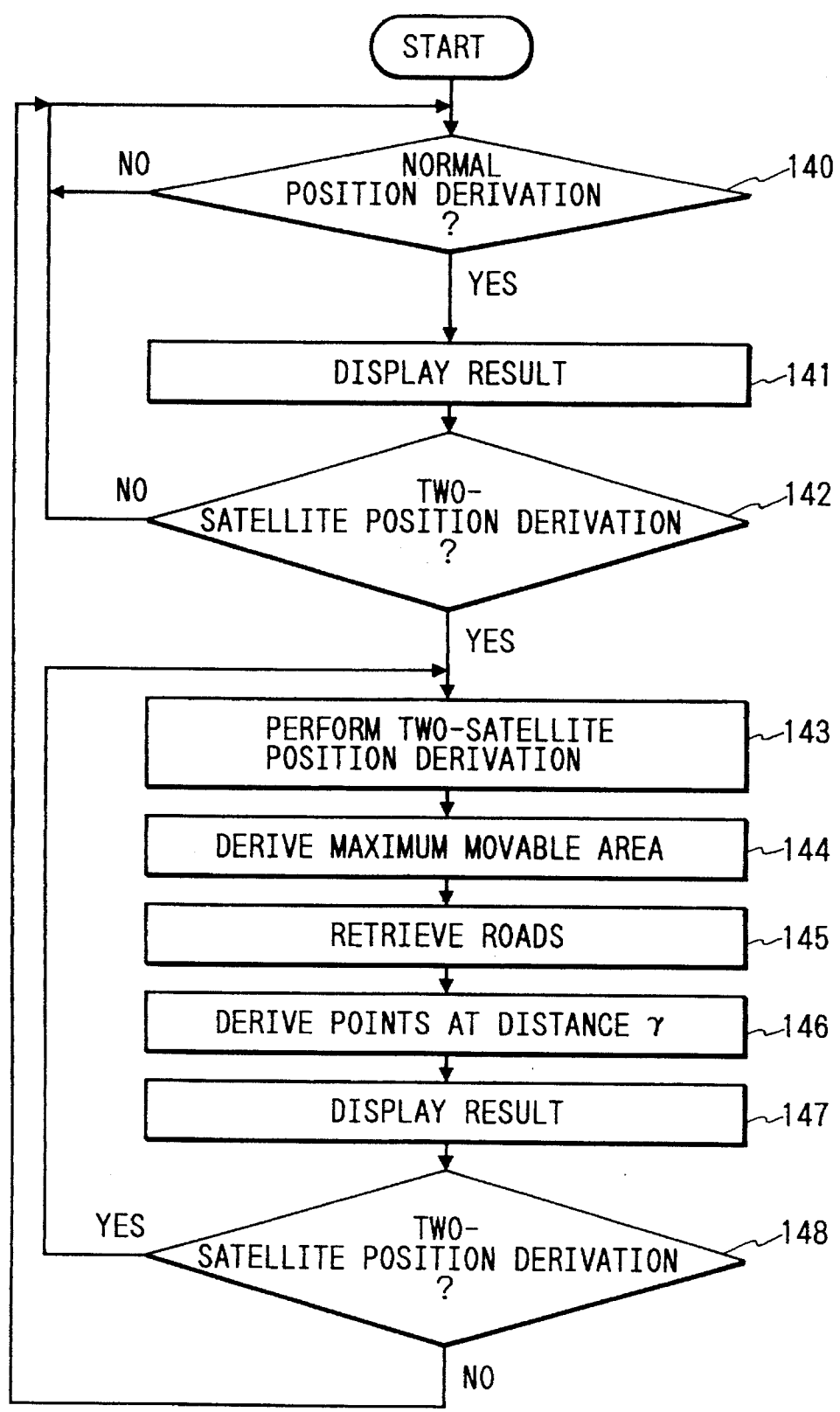
FIG. 32 is a time-domain conceptual diagram for explaining an operation of the position measuring system according to the fourteenth preferred embodiment.

In FIG. 32, at step 140, the GPS data on the radio waves are received from the three GPS satellites 12, 13 and 14 via the antenna 15 at time $t_1$ so that the navigation section 16 derives the current position $P_1$ based on the received GPS data, The number the GPS satellites may be-four other than three. At step 141, the derived position $P_1$ is inputted to the control section 18 so as to be displayed on the display unit 19 along with the corresponding road map data stored in the storage device 17, as shown in FIG. 24. When it is assumed at step 142 that the GPS data are received from only the two GPS satellites 12 and 13 at time $t_2$, the two-satellite position derivation is performed at step 143. Specifically, as shown in FIG. 25 the straight lines $L_1$ and $L_2$ are derived based on the GPS data from the two GPS satellites 12 and 13. At step 144, on the assumption that the car moves at a maximum speed, the maximum movable distance r of the car within an elapsed time dt between time $t_1$ and $t_2$ is derived. Accordingly, the maximum movable area of the car can be defined by the circle Ro as shown In FIG. 26. At step 145, roads existing in the overlapping area between the area identified by the circle Ro and the area identified by the two straight lines $L_1$ and $L_2$ are retrieved from the road map data stored in the storage device 17. At step 146, based on the retrieved road data, those points that are located at a distance of r from the point $P_1$ on or along the corresponding roads are derived. At step 147, the results of steps 143, 144, 145 and 146 are displayed on the display unit 19 in a superimposed manner. As shown in FIG. 31, the retrieved roads within a road distance of r from the point $P_1$ are highlighted by hatching. On the other hand, the retrieved roads may be highlighted by coloring or the like.

Thereafter, when the GPS data are received from only the two GPS satellites at step 148, steps 143 to 147 are repeated. On the other hand, when the GPS data are received from the three GPS satellites at step 148, step 140 is executed.

As appreciated, in the fourteenth preferred embodiment, even when the GPS data are received from only two GPS satellites, the area in which the current car position exists can be identified on the roads with proper highlighting on the display screen so that the user can easily estimate the current car position. Particularly, in this preferred embodiment, the highlighted area is limited to a range which is within a given distance as measured along the road.

Now, a fifteenth preferred embodiment of the present invention will be described hereinbelow.

FIGS. 24 to 26 are also applied to the fifteenth preferred embodiment.

Figure 33:
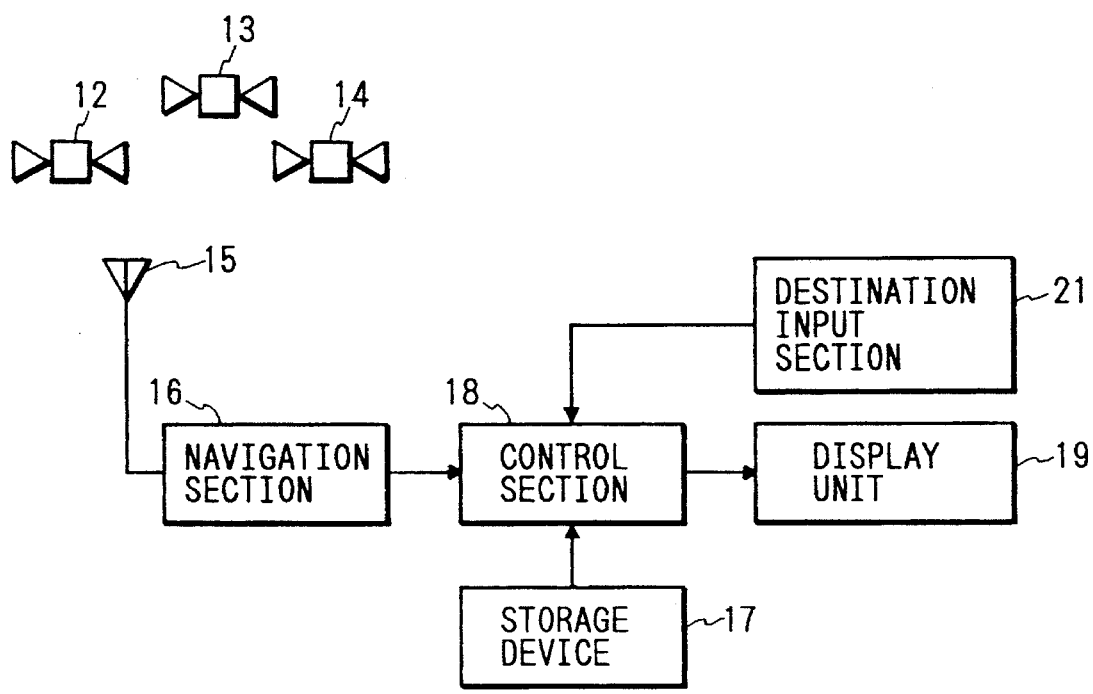
FIG. 33 is a block diagram showing a structure of a position measuring system according to a fifteenth preferred embodiment of the present invention.

FIG. 33 is a block diagram showing a structure of a position measuring system according to a fifteenth preferred embodiment of the present invention. FIG. 33 is the same as FIG. 23 except that a destination input section 21 is added for Inputting a destination into the system.

Figure 34:
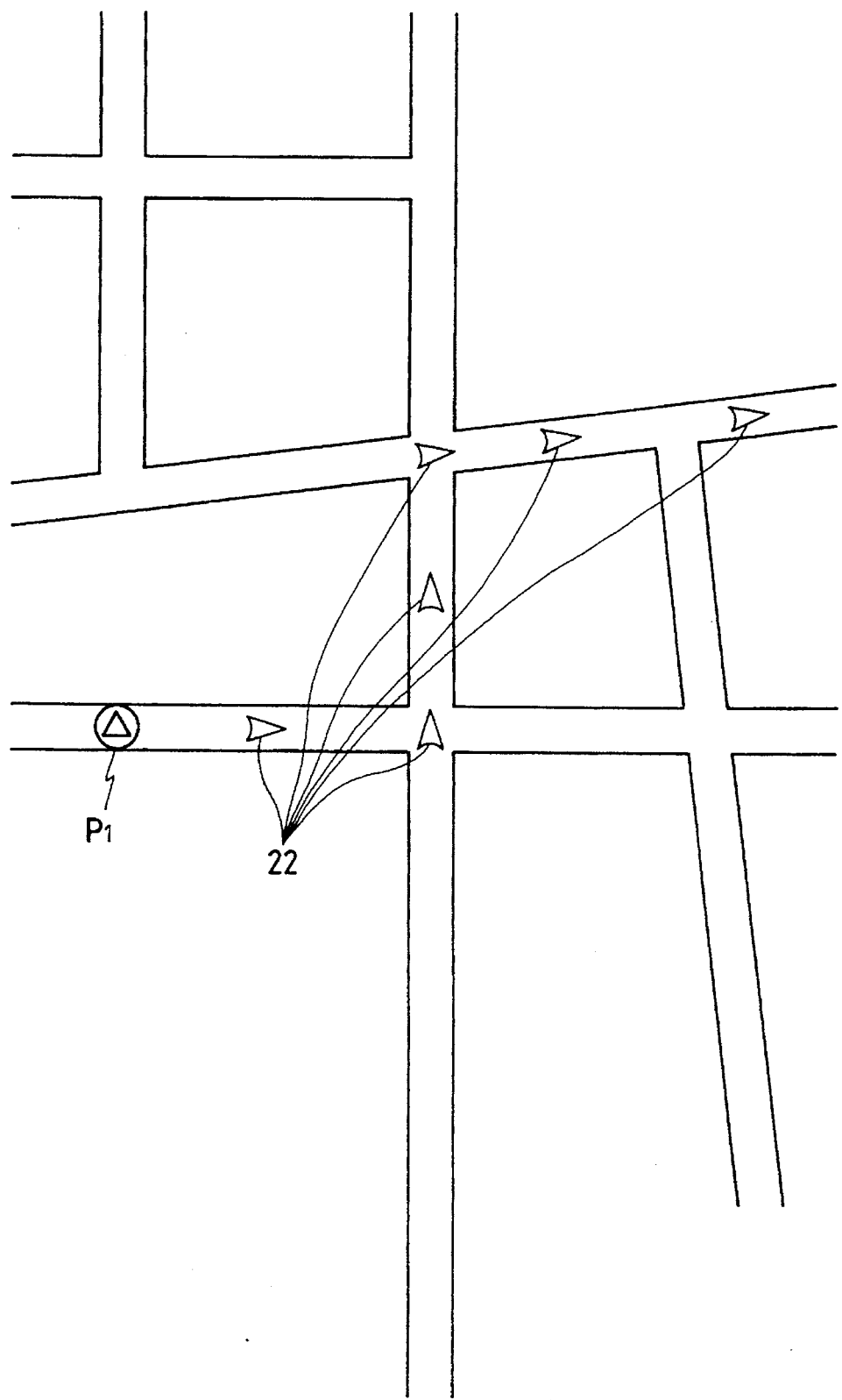
FIGS. 34 and 35 are diagrams, respectively, showing display images to be displayed on a display screen of a display unit according to the fifteenth preferred embodiment.
Figure 35:
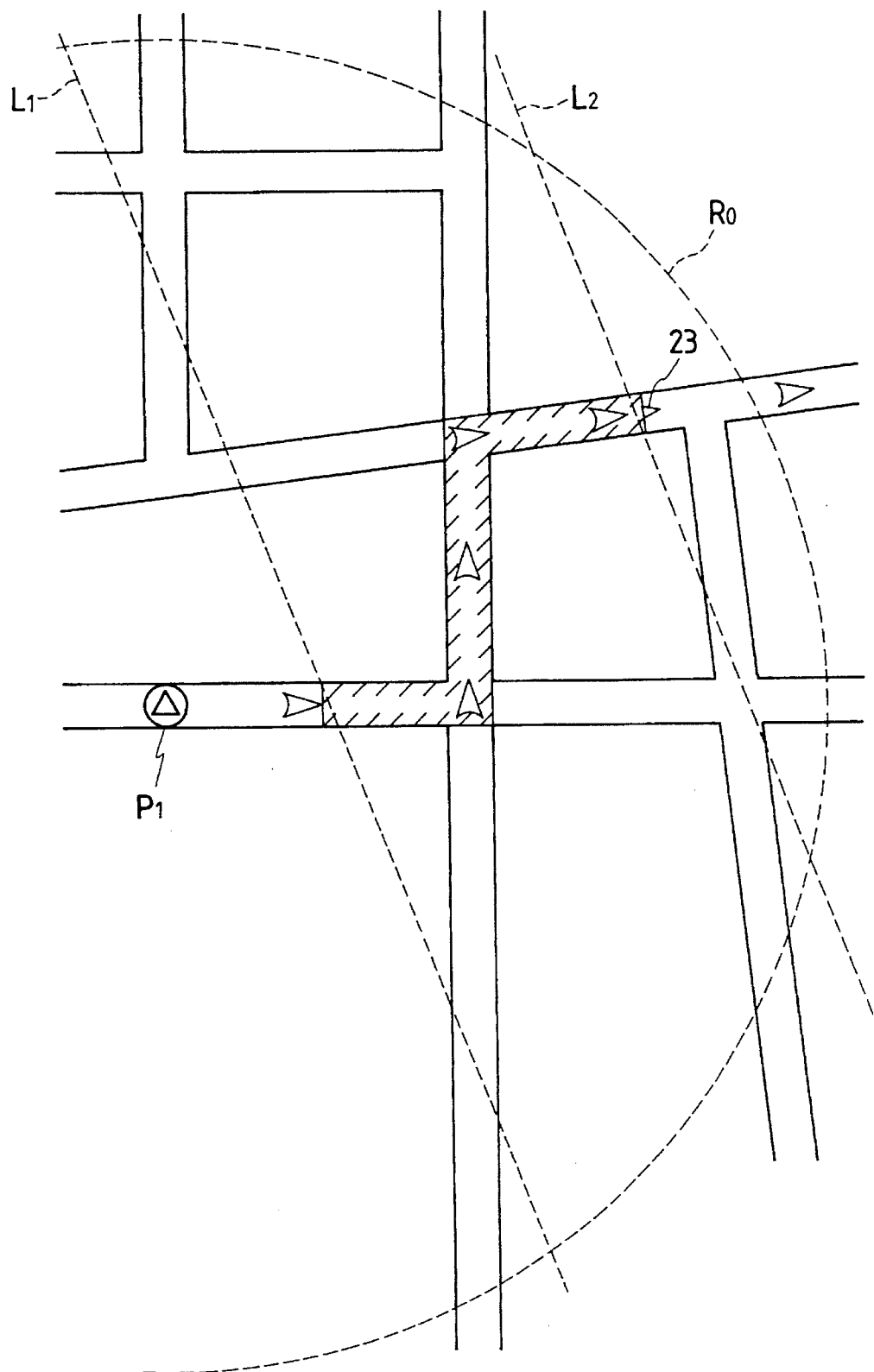

FIGS. 34 and 35 show display images to be displayed on a display screen of the display unit 19, respectively, according to the fifteenth preferred embodiment. In FIG. 34, an element represented by $P_1$ is the same as that represented by the same mark in FIGS. 24 to 26 in the twelfth preferred embodiment. In FIG. 34, numeral 22 denotes each of symbols which identify a travel route to a destination inputted in advance via the destination input section 21. In FIG. 35, elements represented by $P_1$, $L_1$, $L_2$, and Ro are the same as those represented by the same marks in FIGS. 24 to 26 in the twelfth, preferred embodiment. In FIG. 35, numeral 23 denotes a symbol representing a point which is located at a distance of r from the point $P_1$ along the travel route.

Figure 36:
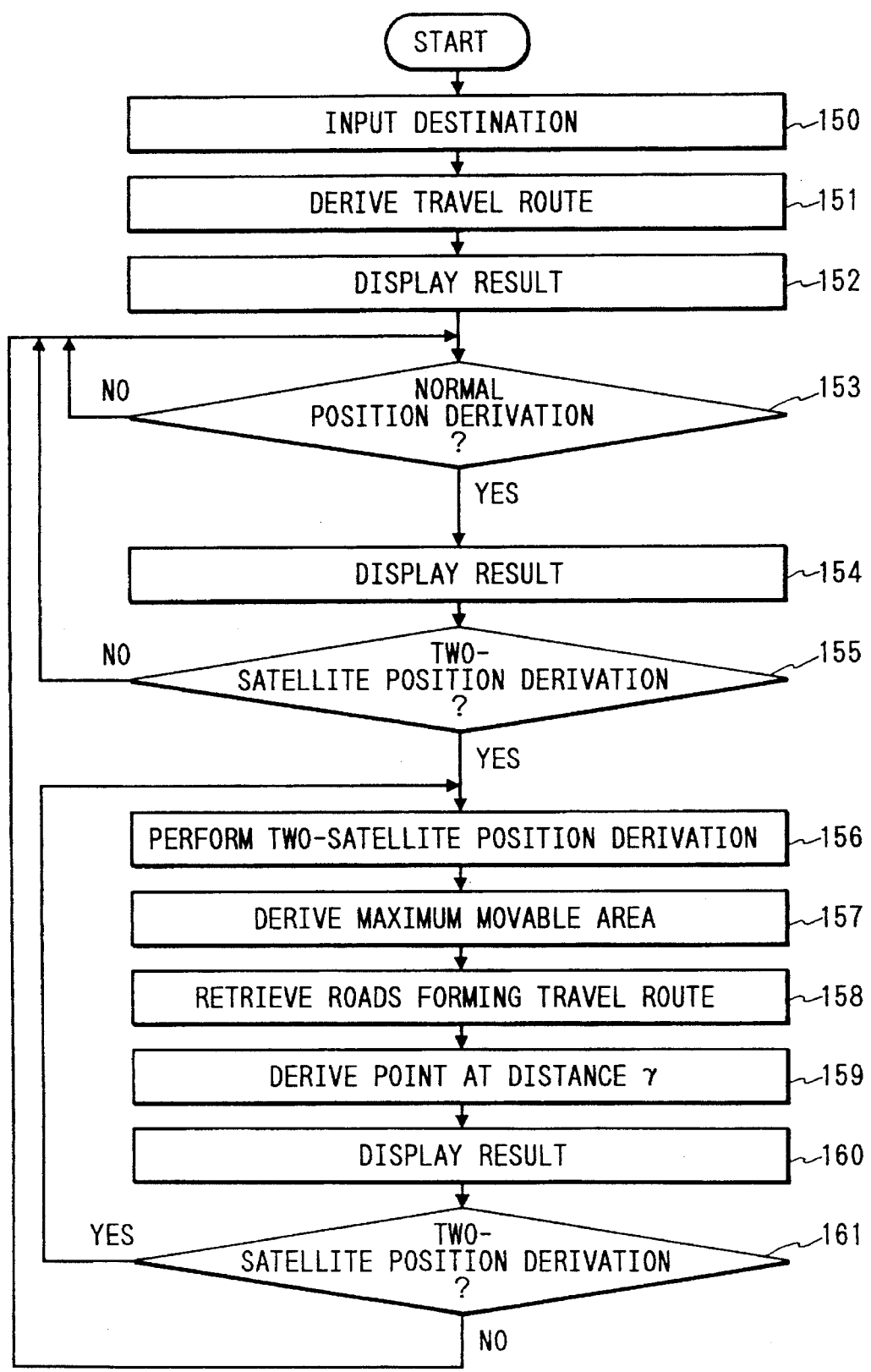
FIG. 36 is a time-domain conceptual diagram for explaining an operation of the position measuring system according to the fifteenth preferred embodiment.

FIG. 36 is a time-domain conceptual diagram for explaining an operation of the position measuring system according to the fifteenth preferred embodiment.

In FIG. 36, at step 150, a destination is inputted via the destination input section 21, At step 151, a travel route is derived based on the inputted destination in a known manner. At step 152, the derived travel route is displayed using the symbols 22 as shown in FIG. 34, At step 153, the GPS data on the radio waves are received from the three GPS satellites 12, 13 and 14 via the antenna 15 at time $t_1$ so that the navigation section 16 derives the current position $P_1$ based on the received GPS data, The number of the GPS satellites may be four other than three. At step 154, the derived position $P_1$ is inputted to the control section 18 so as to be displayed on the display unit 19 along with the corresponding road map data stored in the storage device 17, as shown in FIG. 24. When it is assumed at step 155 that the GPS data are received from only the two GPS satellites 12 and 14 at time $t_2$, the two-satellite position derivation is performed at step 156. Specifically, as shown in FIG. 25, the straight lines $L_1$ and $L_2$ are derived based on the GPS data from the two GPS satellites 12 and 14. At step 157, on the assumption that the car moves at a maximum speed, the maximum movable distance r of the car within an elapsed time dt between time $t_1$ and $t_2$ is derived. Accordingly, the maximum movable area of the car can be defined by the circle Ro as shown in FIG. 26. At step 158, roads existing in the overlapping area between the area identified by the circle Ro and the area identified by the two straight lines $L_1$ and $L_2$ and forming a part of the travel route are retrieved from the road map data stored in the storage device 17. At step 159, based on the retrieved road data, a point which is located at a distance of r from the point P 1 along the travel route is derived. At step 160, the results of steps 156, 157, 158 and 159 are displayed on the display: unit 19 in a superimposed manner. As shown in FIG. 35, the retrieved roads within a road distance of r from the point $P_1$ along the travel route are highlighted by hatching. On the other hand, the retrieved roads may be highlighted by coloring or the like.

Thereafter, when the GPS data are received from only the two GPS satellites at step 161, steps 156 to 160 are repeated. On the other hand, when the GPS data are received from the three GPS satellites at step 161, step 153 is executed.

As appreciated, in the fifteenth preferred embodiment, even when the GPS data are received from only two GPS satellites, the area in which the current car position exists can be identified on the roads with proper highlighting on the display screen so that the user can easily estimate the current car position. Particularly, in this preferred embodiment, the highlighted area is limited to a range which is within a given distance as measured along the travel route.

Now, a sixteenth preferred embodiment of the present invention will be described hereinbelow.

Figure 37:
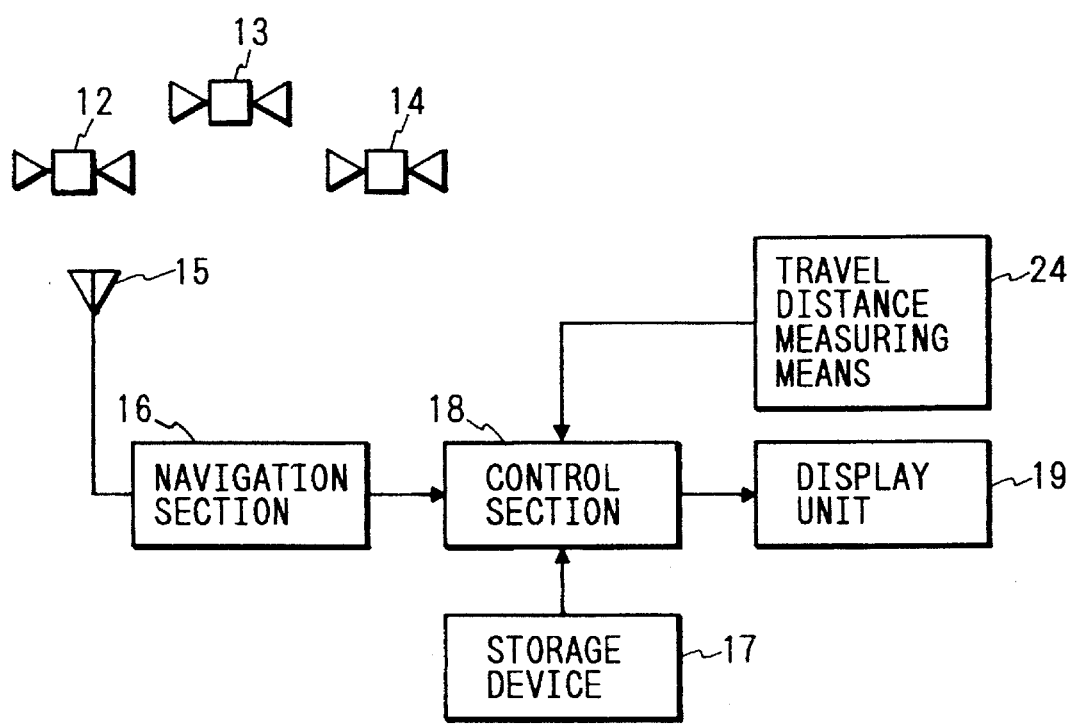
FIG. 37 is a block diagram showing a structure of a position measuring system according to a sixteenth preferred embodiment of the present invention.

FIG. 37 is a block diagram showing a structure of a position measuring system according to a sixteenth preferred embodiment of the present invention. FIG. 37 is the same as FIG. 23 except that a travel distance measuring means 24 is added for measuring a travel distance of the car.

Figure 38:
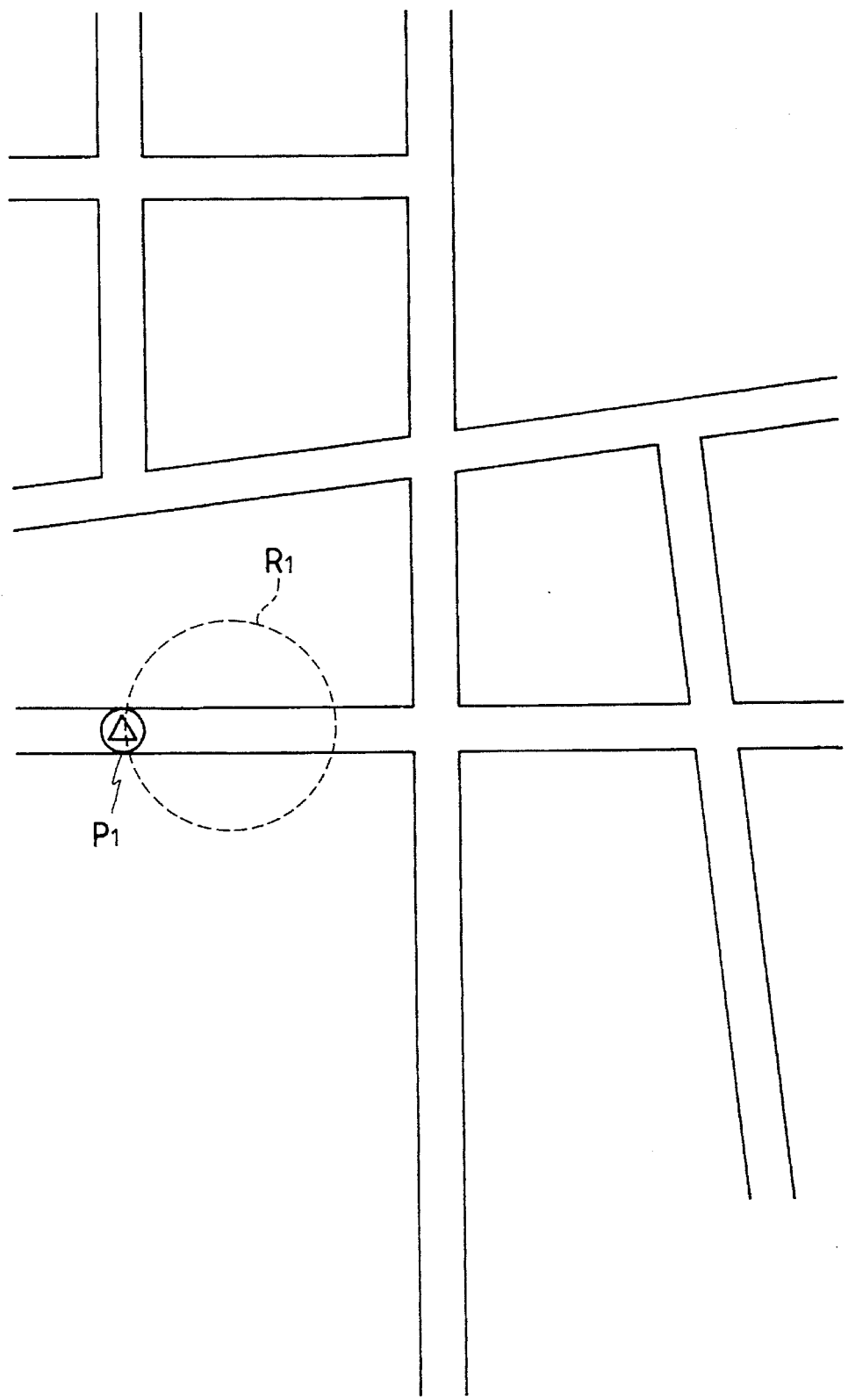
FIG. 38 is a diagram showing a display image to be displayed on a display screen of a display unit according to the sixteenth preferred embodiment.

FIG. 38 shows a display image to be displayed on a display screen of the display unit 19 according to the sixteenth preferred embodiment. In FIG. 38, an element represented by $P_1$ is the same as that represented by the same mark in FIGS. 24 to 26 in the twelfth preferred embodiment. In FIG. 38, $R_1$ represents a circle having a radius corresponding to a travel distance of the car as measured from the point $P_1$ by the travel distance measuring means 24. The circle $R_1$ defines an area where a current car position exists.

Figure 39:
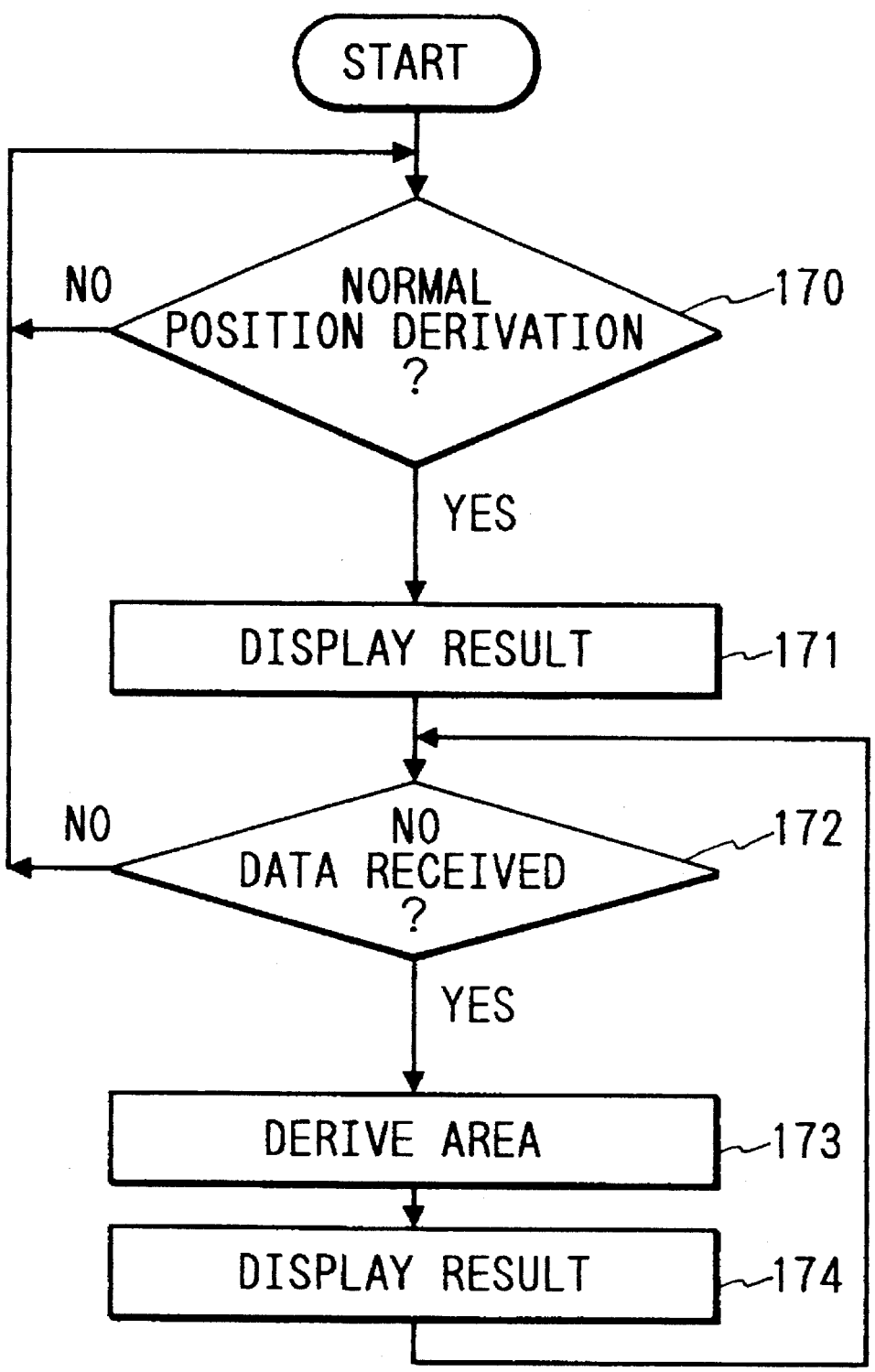
FIG. 39 is a time-domain conceptual diagram for explaining an operation of the position measuring system according to the sixteenth preferred embodiment.

FIG. 39 is a time-domain conceptual diagram for explaining an operation of the position measuring system according to the sixteenth preferred embodiment.

In FIG. 39, at step 170, the GPS data on the radio waves are received from the three GPS satellites 12, 13 and 14 via the antenna 15 at time $t_1$ so that the navigation section 16 derives the current position $P_1$ and a velocity vector $V_1$ based on the received GPS data. The number of the GPS satellites may be four other than three. At step 171, the derived position $P_1$ is inputted to the control section 18 so as to be displayed on the display unit 19 along with the corresponding road map data stored in the storage device 17, as shown in FIG. 38. When it is assumed at step 172 that the GPS data are not received from any of the GPS satellites at time $t_2$, a distance traveled by the car from the point $P_1$ is derived based on the travel distance measuring means and a moving direction is assumed to be the same as the derived velocity vector $V_1$. As a result, the circle $R_1$ is derived having the radius corresponding to the derived travel distance as shown in FIG. 38. At step 174, the derived circle $R_1$ is displayed on the display unit 19 in a superimposed manner.

The area defined by the circle $R_1$ may be highlighted by coloring, so that the user easily identify the area where the current car position exists.

As appreciated, in the sixteenth preferred embodiment, even when the GPS data are not received from any of the GPS satellites, the area in which the current car position exists can be displayed based on the measured travel distance by the car so that the user can easily estimate the current car position.

Now, a seventeenth preferred embodiment of the present invention will be described hereinbelow.

FIG. 1 is also applied to the seventeenth preferred embodiment. An operation of the seventeenth preferred embodiment will be described hereinbelow with reference to a flowchart shown in FIG. 40.

Figure 40:
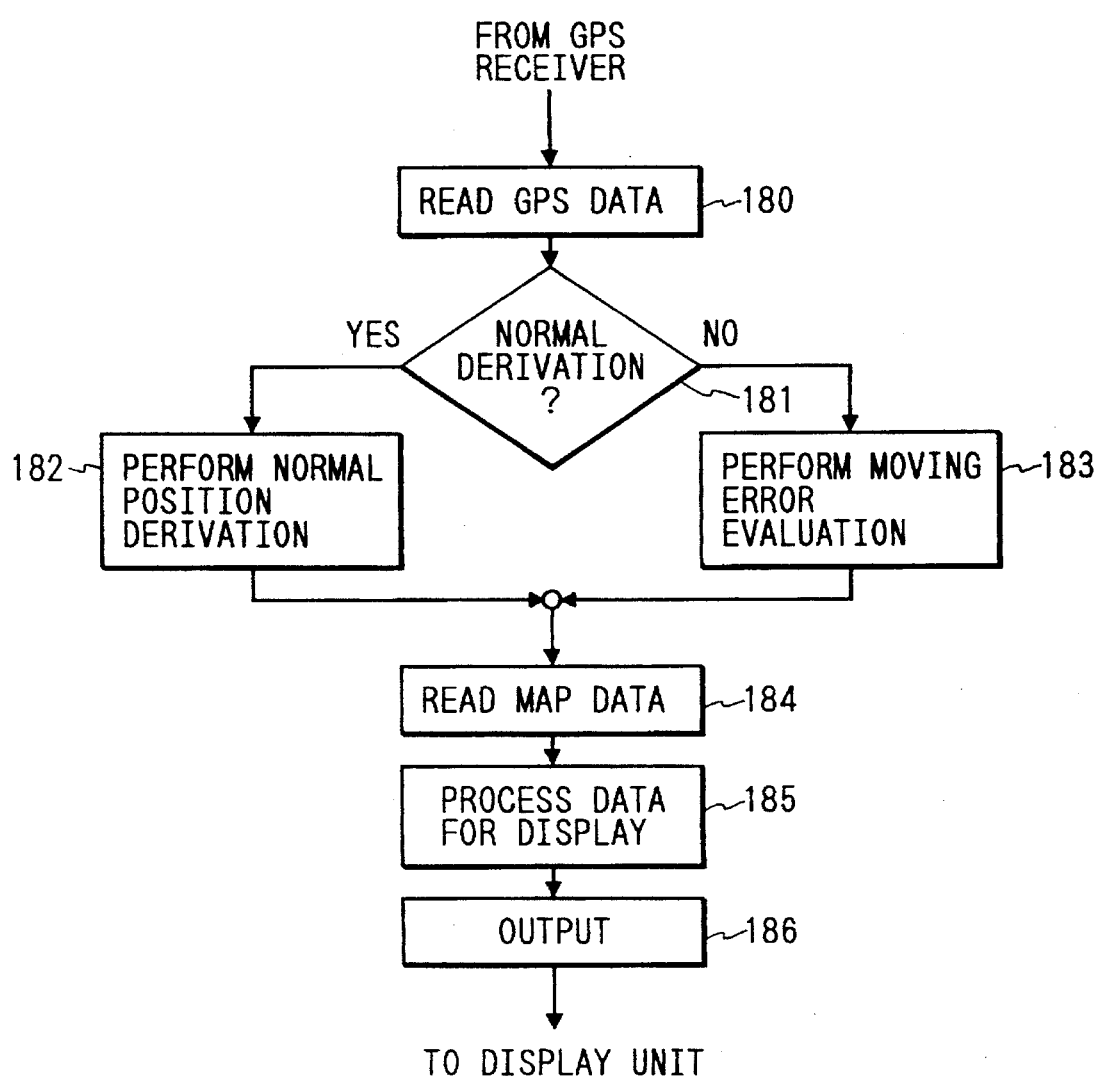
FIG. 40 is a flowchart showing a position deriving routine to be executed by the CPU according to a seventeenth preferred embodiment of the present invention.

In FIG. 40, step 180 reads out the GPS data received from the satellites and demodulated at the GPS receiver 1. Subsequently, step 181 determines whether to perform the normal position derivation, like step 2 in FIG. 2. When answer at step 181 is positive, the routine proceeds to step 182 where a current car position is derived and a measurement error is evaluated in the known manner based on the GPS data read out at step 180. On the other hand, when step 181 determines that the car position can not be derived with the required accuracy based on the normal position derivation, the routine proceeds to step 183 where a moving error evaluation is performed to evaluate an increase of error after disablement of measuring the car position so as to change the measurement error of the car position evaluated at step 182. After execution of step 182 or 183, the routine proceeds to step 184 which reads out the corresponding map data from the CD-ROM 2. Subsequently, step 185 processes the derived data so as to be outputted at step 186 to the display unit 4 where the car position and a range or an area identifying a possible deviation of the car position due to the measurement error are displayed on the map data in a superimposed manner.

At step 182, a maximum possible error is evaluated for the GPS data from each of the GPS satellites. As is known in the art, the measured car position deviated due to various errors may fall substantially on a line segment between two points which are deviated by maximum positive and negative deviations of the measured GPS data. In this case, in general, a range of possible deviation of the measured car position becomes octagonal. However, the error evaluation of an octagonal shape is inconvenient in a practical handling. Accordingly, the error evaluation is defined or represented by long and short sides of a rectangle including therein such an octagonal shape and directions of those sides and outputted for display along with the corresponding map data.

Figure 41:
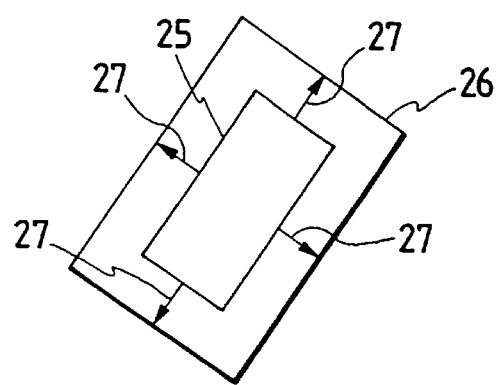
FIG. 41 is a diagram for explaining a measurement error evaluation according to the seventeenth preferred embodiment.

On the other hand, at step 183, each of measurement error evaluation values represented by long and short sides of the last measurement error or rectangle as represented by numeral 25 in FIG. 4,1 is added with a maximum value, as indicated by numeral 27, of a movable distance of the car within a measurement cycle or period T so as to derive a rectangle as represented by numeral 26. As seen from FIG. 41, the maximum value is added to each side or each error evaluation value in both opposite directions. The rectangle 26 is displayed on the display unit 4 with directions of the error evaluation values and the measured car position unchanged, which is also clearly seen in FIG. 41. The movable distance of the car within the measurement cycle T is evaluated Using a maximum speed V of the car and given by VT'.

In the seventeenth preferred embodiment, the current car position falls within the rectangle derived at step 183 and representing the measurement error, with high reliability. Specifically, in the seventeenth preferred embodiment, when the car position can not be measured, the error evaluation of the car position is changed depending on an elapsed time so that the area including the current car position can be displayed with high reliability.

Now, an eighteenth preferred embodiment of the present invention will be described hereinbelow.

FIGS. 1 and 40 are also applied to the eighteenth preferred embodiment. The eighteenth preferred embodiment differs from the seventeenth preferred embodiment only in steps 182 and 183.

Figure 42:
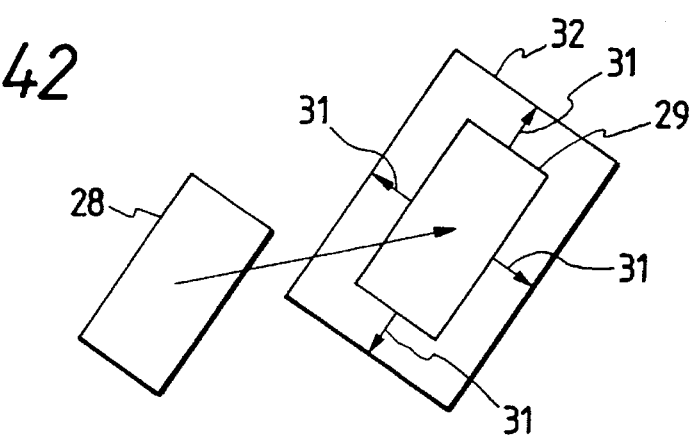
FIG. 42 is a diagram for explaining a measurement error evaluation according to an eighteenth preferred embodiment of the present invention.

Specifically, in this preferred embodiment, step 182 derives a moving speed and a moving direction of the car at a receiving point of the GPS data from the GPS satellites, in addition to the current car position and the measurement error evaluation. On the other hand, at step 183, a rectangle represented by numeral 28 in FIG. 42 and determined by the newest car position derived at step 182 and the corresponding measurement error evaluation values is displaced to a position 29 on the assumption that the rectangle 28 moves at the foregoing moving speed and in the foregoing moving direction (both derived at step 182) constantly from a time point of receipt of the GPS data for the newest execution cycle of this routine where step 182 is executed to a time point of receipt of the GPS data for the current execution cycle of this routine. Further, at step 183, a maximum movable distance a, $t^2/2$ (wherein a represents a predetermined maximum acceleration of the car and t represents an elapsed time from a time point of receipt of the GPS data for the newest execution cycle of this routine where step 182 is executed, to a time point of receipt of the GPS data for the current execution cycle of this routine) represented by numeral 31 is derived. This maximum movable distance is added to each of the long and short sides of the rectangle 28 at the position 29 so as to derive a rectangle 32 as shown in FIG. 42. As seen in FIG. 42, directions of the error evaluation values remain unchanged.

In the eighteenth preferred embodiment, the current car position fails within the rectangle derived at step 183 and representing the measurement error, with high reliability. Specifically, in the eighteenth preferred embodiment, when the car position can not be measured, the error evaluation of the car position is changed using the newest car position, moving speed and moving direction and further in consideration of the limit of the accelerated motion of the car so that the area including the current car position can be displayed with high reliability.

Now, an nineteenth preferred embodiment of the present invention will be described hereinbelow.

FIGS. 1 and 40 are also applied to the nineteenth preferred embodiment. The nineteenth preferred embodiment differs from the eighteenth preferred embodiment only in step 183.

Figure 43:
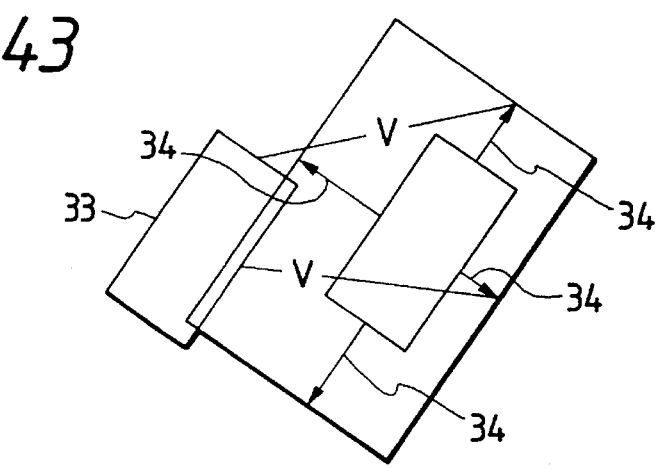
FIG. 43 is a diagram for explaining a measurement error evaluation according to a nineteenth preferred embodiment of the present invention.

In this preferred embodiment, the maximum acceleration a of the car is defined as in the eighteenth preferred embodiment, and further, a maximum speed V of the car is also defined. Accordingly, when an absolute value of a vector sum of an increasing velocity (as represented by numeral 34 in FIG. 43) of each of the long and short sides due to the maximum acceleration a of the car and a moving velocity (defined by the foregoing moving speed and direction of the car derived at step 182 in the eighteenth preferred embodiment) of the center of the rectangle 33 (corresponding to the rectangle 28 In FIG. 42) exceeds the predetermined maximum speed V, the increase of the error evaluation value in that direction is limited to the maximum speed V. Accordingly, when the speed in a particular direction increases to the maximum speed V, the center of the newly derived rectangle is changed in consideration of the increase in the opposite direction, the error evaluation values can be easily handled.

In the nineteenth preferred embodiment, the error evaluation value can be prevented from increasing unnecessarily in the moving direction of the car, particularly when the car position can not be measured under the high-speed driving.

Now, a twentieth preferred embodiment of the present invention will be described hereinbelow.

FIG. 19 is also applied to the twentieth preferred embodiment. FIG. 19 includes the distance sensor 11 for measuring a travel distance of the car.

An operation of the twentieth preferred embodiment will be described hereinbelow with reference to a flowchart shown in FIG. 44.

In FIG. 44, step 190 reads out the GPS data received from the satellites and demodulated at the GPS receiver 1. Subsequently, step 191 determines whether to perform the normal position derivation, like step 2 in FIG. 2. When answer at step 191 is positive, the routine proceeds to step 192 where a current car position is derived and a measurement error is evaluated in the known manner based on the GPS data read out at step 190. On the other hand, when step 191 determines that the car position can not be derived with the required accuracy based on the normal position derivation, the routine proceeds to step 193 where a moving error evaluation is performed to evaluate an increase of error after disablement of measuring the car position so as to change the measurement error of the car position evaluated at step 192.

The foregoing description about the flowchart of FIG. 44 is the same as that in the seventeenth preferred embodiment. The twentieth preferred embodiment differs from the seventeenth preferred embodiment in that step 193 performs the moving error evaluation using a travel distance L as measured by the distance sensor 11 and inputted at step 194 in FIG. 44. Specifically, the distance L traveled by the car within the measurement cycle T is used, in place of the maximum movable distance used in the seventeenth preferred embodiment, so as to be added to each of measurement error evaluation values represented by long and short sides of the last measurement error or rectangle in the same manner as in the seventeenth preferred embodiment. Directions of the error evaluation values and the measured car position remain unchanged as also in the seventeenth preferred embodiment.

After execution of step 192 or steps 193, 194, the routine proceeds to step 195 which reads out the corresponding map data from the CD-ROM 2. Subsequently, step 196 processes the derived data so as to be outputted at step 197 to the display unit 4 where the car position and a range or an area identifying a possible deviation of the car position due to the measurement error are displayed on the map data in a superimposed manner.

In the twentieth preferred embodiment, the rectangle derived at step 193 can be made very small as compared with that in the seventeenth preferred embodiment.

Now, a twenty-first preferred embodiment of the present invention will be described hereinbelow.

FIGS. 19 and 44 are also applied to the twenty-first preferred embodiment. The twenty-first preferred embodiment differs from the twentieth preferred embodiment only in steps 192 and 193.

Figure 45A:
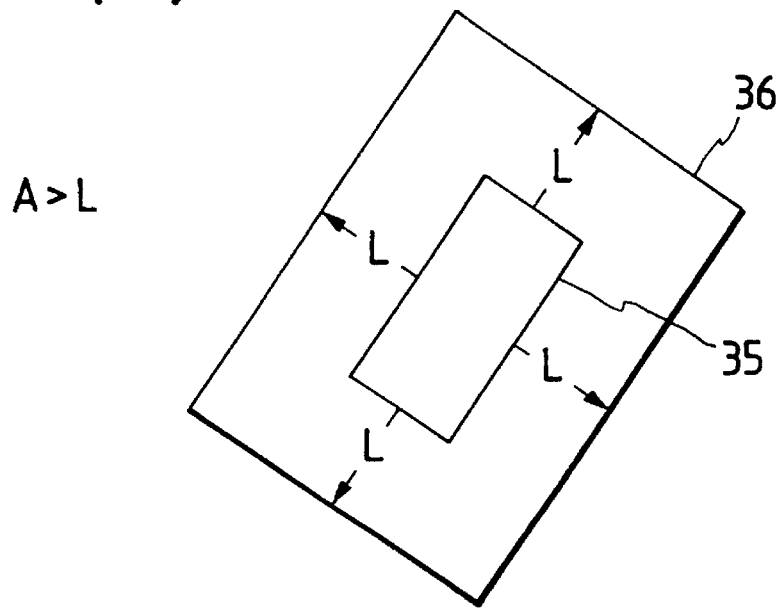
FIGS. 45(A) and 45(B) are diagrams, respectively, for explaining measurement error evaluations according to a twenty-first preferred embodiment of the present invention.
Figure 45B:
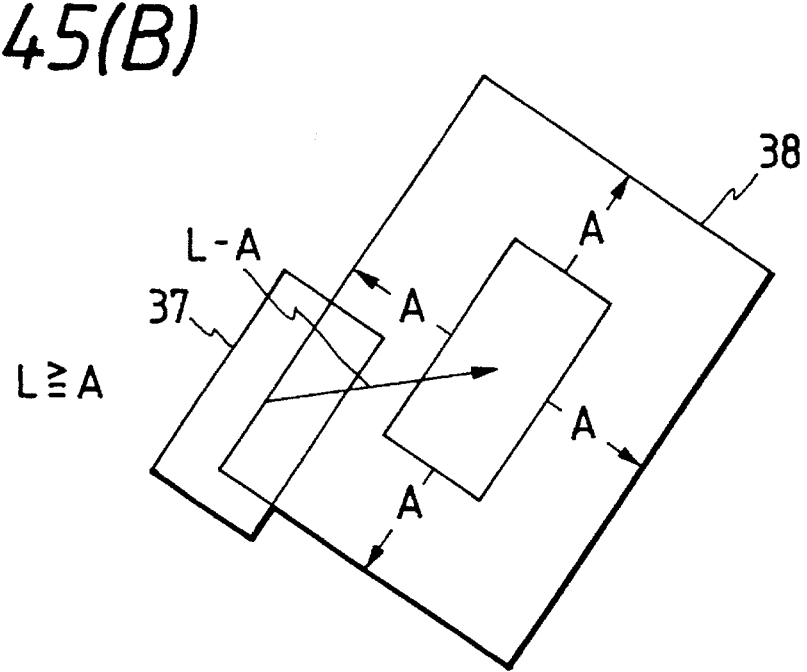

Specifically, in this preferred embodiment, step 192 derives a moving speed and a moving direction of the car at a receiving point of the GPS data from the GPS satellites, in addition to the current car position and the measurement error evaluation. On the other hand, at step 193, a maximum movable distance $a.t^2/2$ (wherein, a represents a predetermined maximum acceleration of the car and t represents an elapsed time from a time point of receipt of the GPS data for the newest execution cycle of this routine where step 192 is executed, to a time point of receipt of the GPS data for the current execution cycle of this routine) is derived and given by A. Thereafter, the distance A Is compared with the distance L derived at step 194. As shown in FIG. 45(A), when A is greater than L, L is added to each of the long and short sides of a rectangle 35 derived at step 192 and located at its original position so as to derive a rectangle 36. On the other hand, as shown in FIG. 45(B), when A is equal to or smaller than L, a rectangle 37 derived at step 192 is displaced from its original position in the foregoing moving direction by a difference L-A, and A is added to each of the long and short sides of the displaced rectangle 37 so as to derive a rectangle 38.

In the twenty-first preferred embodiment, one of the two error evaluation manners is selected depending on the result of comparison between the distances A and L so that the reliable area can be displayed to the user according to the driving condition.

Now, a twenty-second preferred embodiment of the present invention will be described hereinbelow.

FIGS. 19 is also applied to the twenty-second preferred embodiment.

An operation of the twenty-second preferred embodiment will be described heretobelow with reference to a flowchart shown in FIG. 46.

Figure 46:
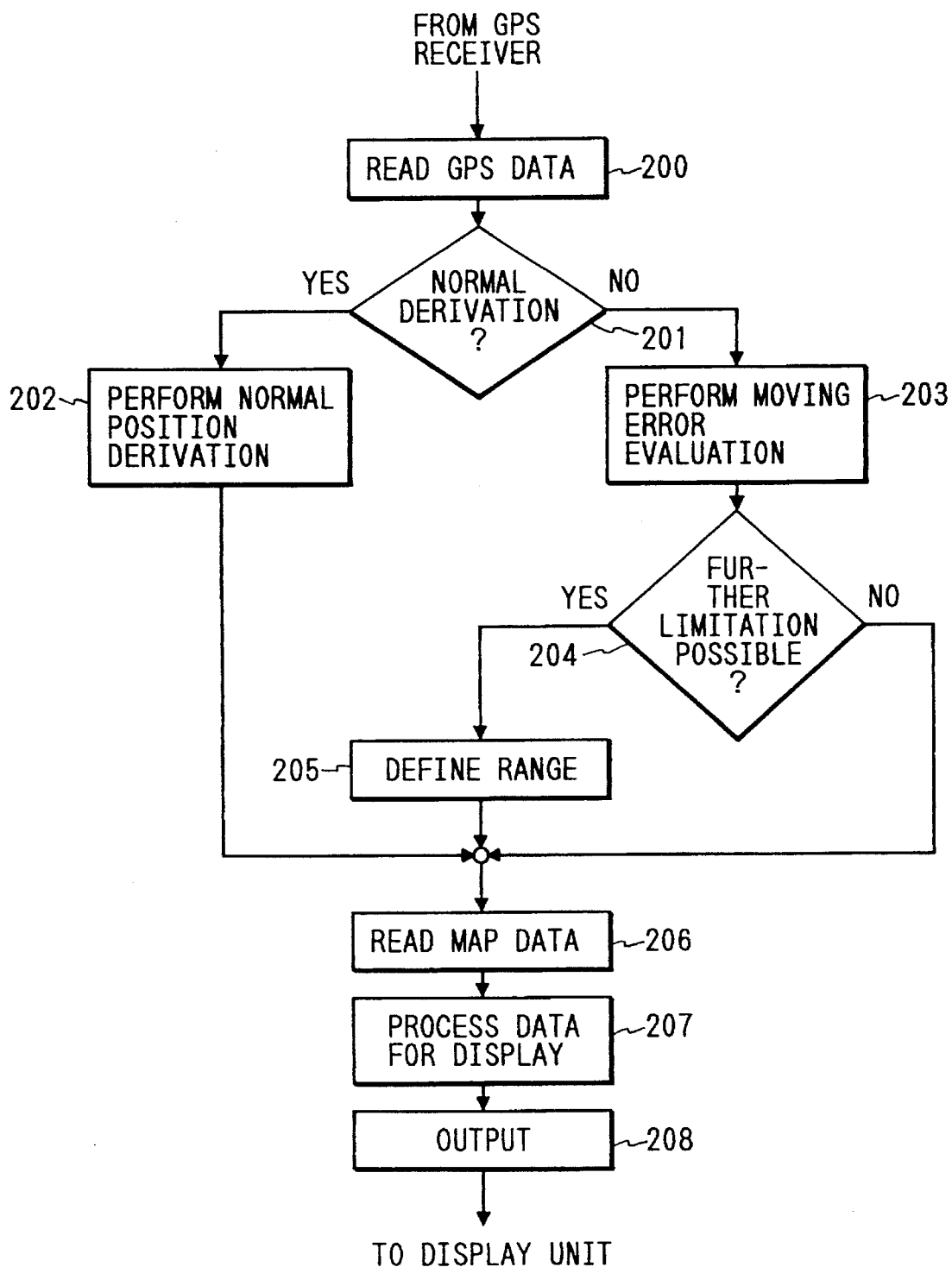
FIG. 46 is a flowchart showing a position deriving routine to be executed by the CPU according to a twenty-second preferred embodiment of the present invention.

In FIG. 46, step 200 reads out the GPS data received from the satellites and demodulated at the GPS receiver 1. Subsequently, step 201 determines whether to perform the normal position derivation, like step 2 in FIG. 2. When answer at step 201 is positive, the routine proceeds to step 202 where a current car position and its measurement error evaluation are derived, and further, a moving speed and a moving direction of the car are derived, in the known manner based on the GPS data read out at step 200. On the other hand, when step 201 determines that the car position can not be derived with the required accuracy based on the normal position derivation, the routine proceeds to step 203 where the moving error evaluation is performed to change the error evaluation and the current car position as in one of the foregoing seventeenth to twenty-first preferred embodiments.

Subsequently, the routine proceeds to step 204 which determines, whether the area derived at step 203 can be further specified. A positive condition of step 203 is matched when the foregoing two-satellite position derivation can be performed to derive the two parallel straight lines and when a distance between these two lines is short enough to further define the area derived at step 203. When answer at step 204 is positive, the routine proceeds to step 205 where the current car position is further limited.

Figure 47A:
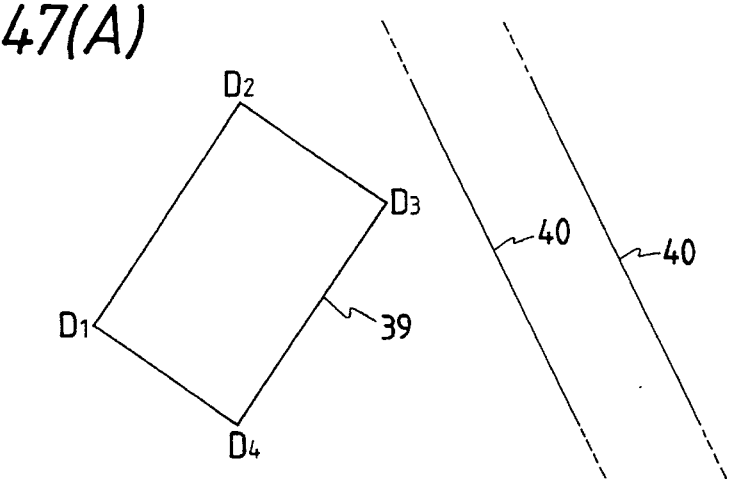
FIGS. 47(A), 47(B), 47(C), 47(D), 47(E) and 47(F) are diagrams, respectively, for explaining measurement error evaluations according to the twenty-second preferred embodiment.

Through FIGS. 47(A) to 47(F), numeral 39 denotes a rectangle derived at step 203 and having four vertexes Dn (n=1, 2, 3, 4). When all the Vertexes are located at one side of the two straight lines 40, 40 as shown in FIG. 47(A), it is determined that the rectangle derived at step 203 or the two straight lines is wrong. In this case, it may be arranged to output one of them.

Figure 47B:
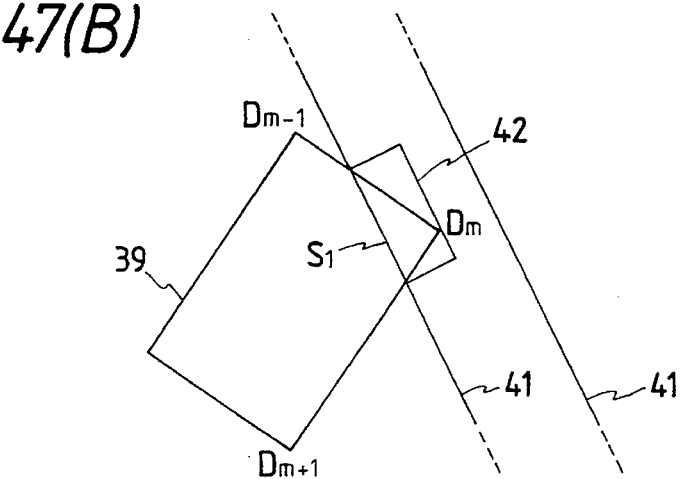

On the other hand, when three vertexes are located at one side of the two straight lines 41, 41 and one vertex is located between the two straight lines 41.41 as shown in FIG. 47(B), assuming that the vertex between the two lines is given by Dm, a line segment S1 is formed by line segments Dm−1, Dm and Dm, Dm+1 each crossing one of the two lines. Accordingly, a rectangle 42 is derived having one side being the line segment $S_1$ and its opposite side including the vertex Dm. Another rectangle may be derived having one diagonal being the line segment $S_1$ and one vertex being the vertex Dm. The derived rectangle 42 is determined to be error evaluation values and its center is determined to be the current car position.

Figure 47C:
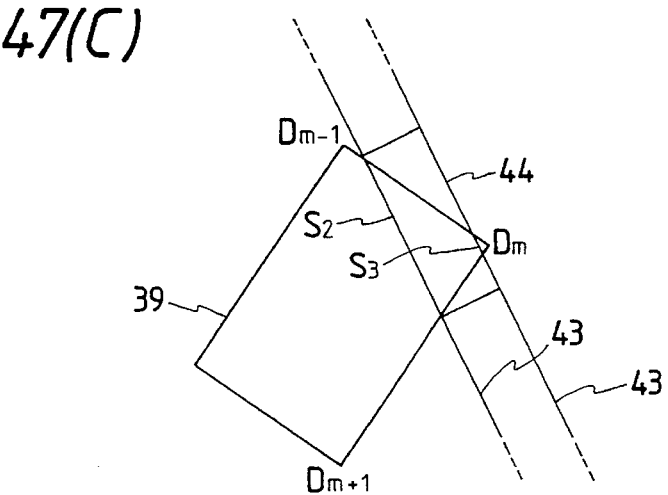

On the other hand, when three vertexes are located at one side of the two lines 43, 43 and one vertex is located at the other side thereof as shown in FIG. 47(C), assuming that the vertex at the other side is-given by Dm, line segments S2 and S3 are derived by line segments Dm−1, Dm and Dm, Dm+1 each crossing the two lines 43, 43. A rectangle 44 is derived having one side being the line segment $_2$ and its opposite side including the line segment $S_3$. The derived rectangle 44 is determined to be error evaluation values and its center is determined to be the current car position.

Figure 47D:
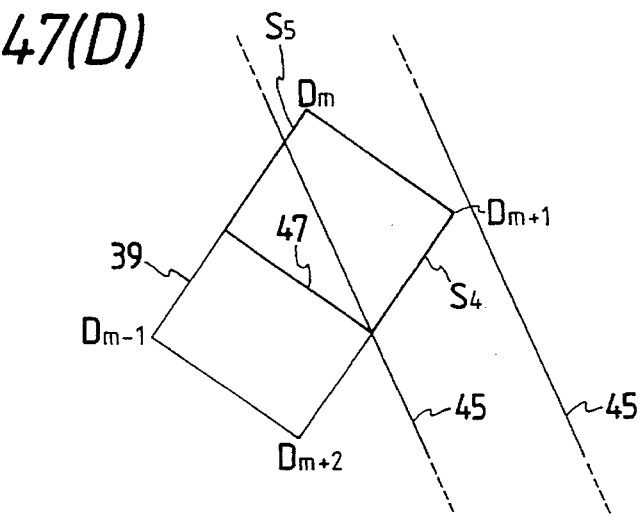

On other hand, when two vertexes are located at one side of the two lines 45, 45 and the other two vertexes are located between the two lines 45, 45 as shown in FIG. 47(D), assuming that the vertexes between the two lines 45, 45 are given by Dm and Dm+1, respectively, two line segments 54 and 55 are formed by line segments Dm−1, Dm and Dm+1, Dm+2 each crossing one of the two lines 45, 45. A rectangle 47 is derived having one side being the line segment $S_4$ and its adjacent side being the line segment Dm, Dm+1. The derived rectangle 47 is determined to be error evaluation values and its center is determined to be the current car position.

Figure 47E:
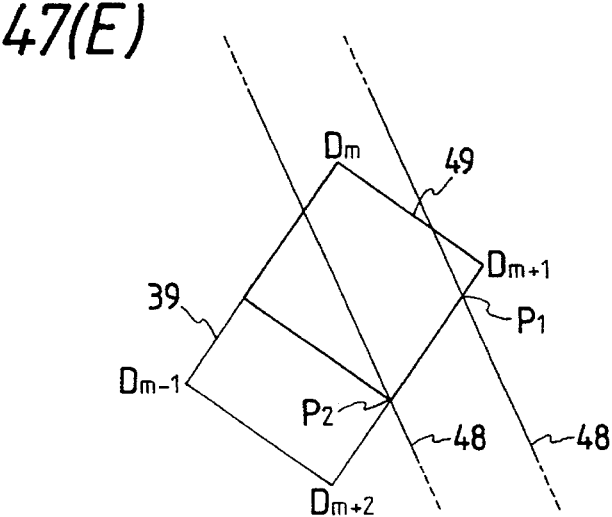

On the other hand, when two vertexes are located at one side of the two lines 48, 48, one vertex is located at the other side thereof, and the remaining vertex is located between the two lines 48, 48 as shown in FIG. 47(E), assuming that the vertex between the two lines is given by Dm and the-vertex at the other side is given by Dm+1, two intersection points $P_1$ and $P_2$ are derived by the line segment Dm+1. Dm+2 crossing the two lines 48, 48. A rectangle 49 is derived having three vertexes Dm. Dm+1 and $P_2$ which is closer to Dm+2 than $P_1$ is the derived rectangle, 49 is determined to be error evaluation values and its center is determined to be the current car position.

Figure 47F:
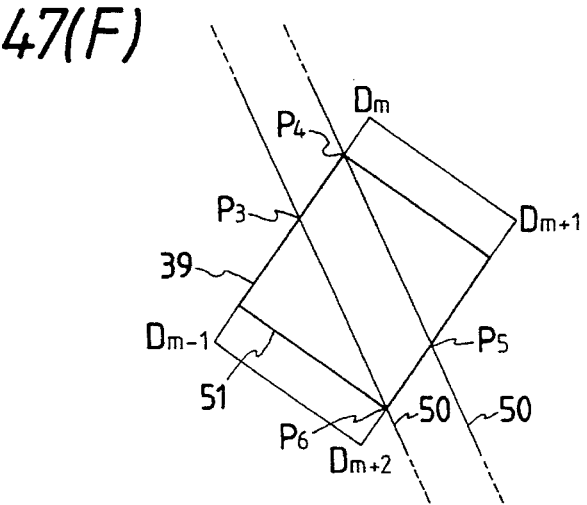

On the other hand, when two vertexes are located at one side of the two lines 50, 50 and the other two vertexes are located at the other side of the two lines 50, 50, assuming that the vertexes are given by Dm−1, Dm, Dm+1 and Dm+2 as shown in FIG. 47(F), four intersection points P3, P4, P5 and P6 are formed by the rectangle 39 and the two lines 50, 50. Two trapezoids are formed, one having vertexes $P_3$, Dm. Dm+1 and P6 and the other having vertexes Dm−1, $P_4$, $P_5$ and Dm+2. Further, two rectangles are formed, one having a diagonal Dm, $P_6$ and the other having a diagonal $P_4$, Dm+2. Accordingly, a rectangle 51 is finally :derived as an overlapping portion the two rectangles. The derived rectangle 51 is determined to be error evaluation values and its center is determined to be the current car position, As appreciated, in the twenty-second preferred embodiment, the area derived at step 203 can be further limited using the two straight lines which are derived based on the GPS data. Further, even when the current car position can not be measured for a long time, an area which may include the car position can be defined using these two lines. Further, when a direction of these lines changes, the current car position can be specified.

Although a rectangle is used in the preferred embodiments for representing error evaluation values, other shapes, such as an ellipse may used therefor. Further, a size thereof may be increased or reduced at a constant rate.

Further, the GPS receiver may be replaced by other receivers, such as, those used in the Navy. Navigational Satellite System.

Now, a twenty-third preferred embodiment will be described hereinbelow.

Figure 48:
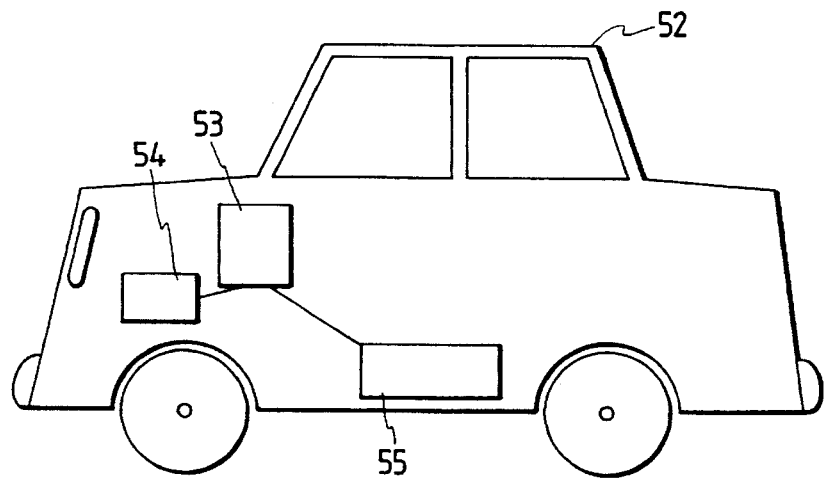
FIG. 48 is a diagram showing a schematic structure of a position measuring system according to a twenty-third preferred embodiment of the present invention.

FIG. 48 is a diagram showing a schematic structure of a position measuring system according to this preferred embodiment, wherein the position measuring system is installed in a car 52.

Figure 50:
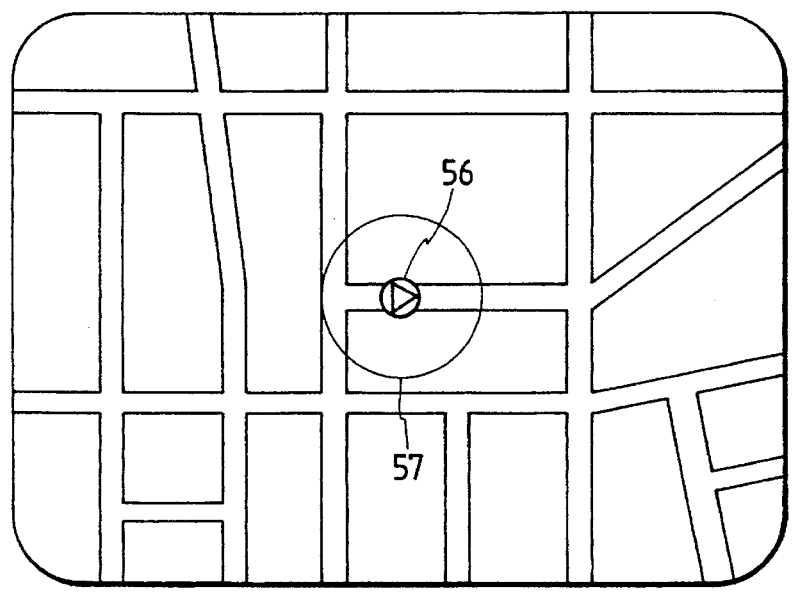
FIG. 50 is a diagram showing a display image to be displayed on a display screen of a display section according to the twenty-third preferred embodiment.

In FIG. 48, numeral 53 denotes a navigation body including a display section, such as, a CRT or a liquid-crystal display, as shown in FIG. 50. Numeral 54 denotes a storage device, such as a CD-ROM for storing road map data, and numeral 55 denotes a position sensor, such as, a speed sensor, an acceleration sensor or a gyro sensor.

Figure 49:
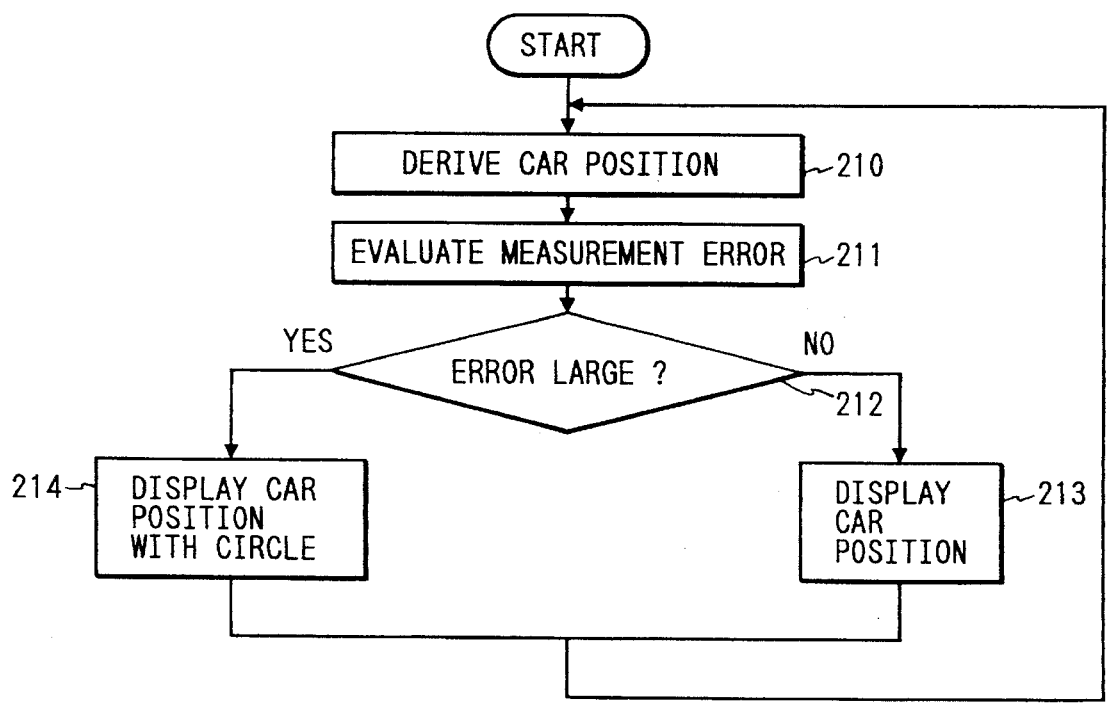
FIG. 49 is a flowchart showing a position displaying routine to be executed by a navigation body according to the twenty-third preferred embodiment.

FIG. 49 shows a flowchart of a position displaying routine to be executed by the navigation body 53 according to this preferred embodiment. FIG. 50 is a diagram showing a display image to be displayed on a display screen of the display section. In FIG. 50, numeral 56 denotes a symbol representing a current position of the car 52, and numeral 57 denotes a circle defining a area which includes the current car position with high possibility.

Now, an operation of this preferred embodiment will be described with reference to FIGS. 49 and 50.

In FIG. 49, step 210 derives the current car position based on data from the position sensor 55. Subsequently, step 211 evaluates a measuring error of the derived car position based on the road data in the storage device 54 and the positional data from the position sensor 55. Subsequently, step 212 determines whether the evaluated error is greater than a given level.

The evaluation of the measurement error can be performed in the known manner. Specifically, the road data in the storage device 54 and the positional data from the position sensor 55 are compared to derive a difference therebetween, and this difference can determined to be the required measurement error. In other words, the measurement error is evaluated based on how the actual positional data from the position sensor 55 differs from the road data stored in the storage device 54. Since this error evaluation technique is known in the art, no further description will be made therefor.

When step 212 determines that the evaluated error is equal to or smaller than the given level, the routine proceeds to step 213 where only the symbol 56 representing the car position is displayed on the display screen without the circle 57 in FIG. 50. On the other hand, when step 212 determines that the evaluated error is greater than the given level, the routine proceeds to step 214 where the symbol 56 is displayed along with the circle 57 as encircling the symbol 56.

In this preferred embodiment, the circle is used to define the area where the car position exists. On the other hand, a rectangle, a rhombus or the like may be used therefor.

As appreciated, in this preferred embodiment, when the evaluated error is greater than the given level, this evaluation result is also displayed along with the derived car position. Accordingly, the user can easily see reliability of the displayed information.

Now, a twenty-four preferred embodiment of the present invention will be described hereinbelow.

FIG. 48 is also applied to this preferred embodiment. An operation of this preferred embodiment will be described with reference to a flowchart shown in FIG. 51.

Figure 51:
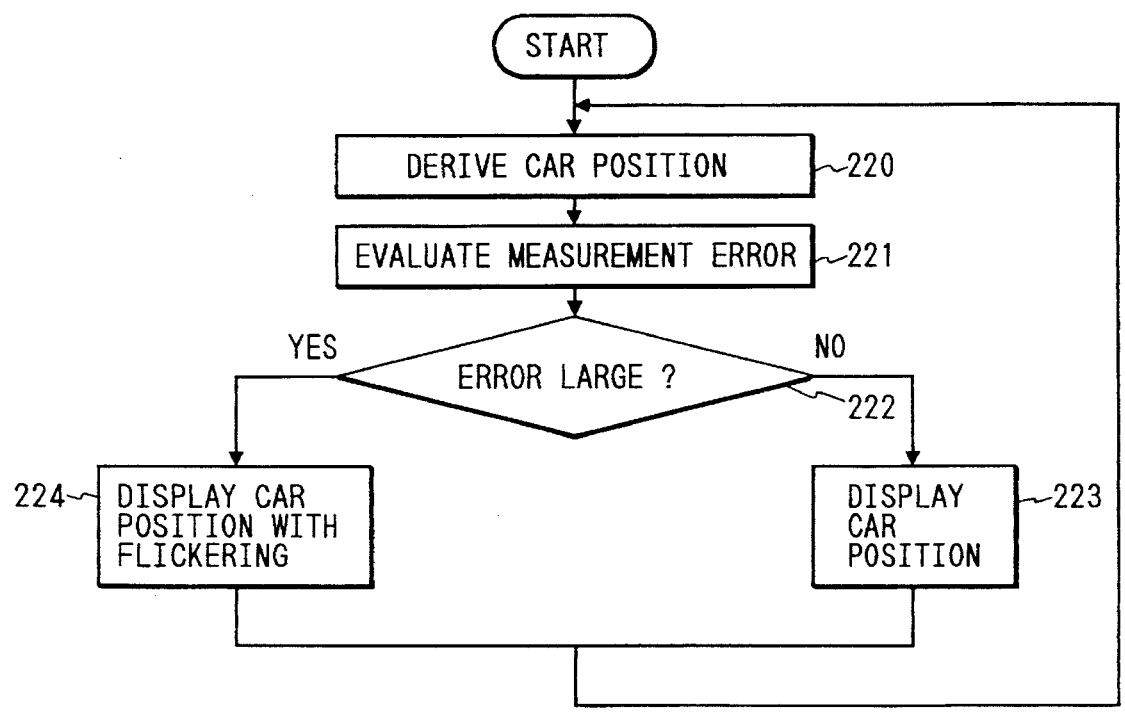
FIG. 51 is a flowchart showing a position displaying routine to be executed by the navigation body according to a twenty-fourth preferred embodiment of the present invention.

In FIG. 51, step 220 derives the current car position based on data from the position sensor 55. Subsequently, step 221 evaluates a measuring error of the derived car position based on the road data in the storage device 54 and the positional data from the position sensor 55. Subsequently, step 222 determines whether the evaluated error is greater than a given level.

When step 222 determines that the evaluated error is equal to or smaller than the given level, the routine proceeds to step 223 where only the symbol 56 is displayed on the display screen without the circle 57 in FIG. 50. On the other hand, when step 222 determines that the evaluated error is greater than the given level, the routine proceeds to step 224 where only the symbol 56 is displayed with flickering.

It may be arranged that, at step 224, the circle 57 may also be displayed with flickering, or a color of the symbol 56 may be changed.

As appreciated, in this preferred embodiment, when the evaluated error is greater than the given level, this evaluation result is informed to the user as in the twenty-third preferred embodiment.

Now, a twenty-fifth preferred embodiment of the present invention will be described hereinbelow.

FIG. 48 is also applied to this preferred embodiment. An operation of this preferred embodiment will be described with reference to a flowchart shown in FIG. 52.

Figure 52:
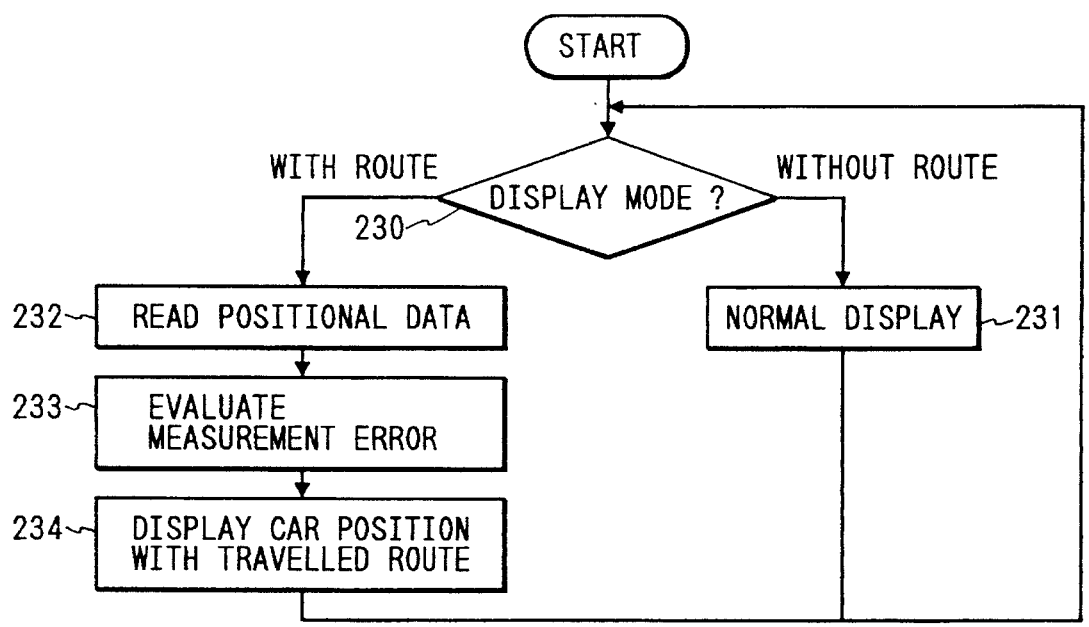
FIG. 52 is a flowchart showing a position displaying routine to be executed by the navigation body according to a twenty-fifth preferred embodiment of the present invention.
Figure 53:
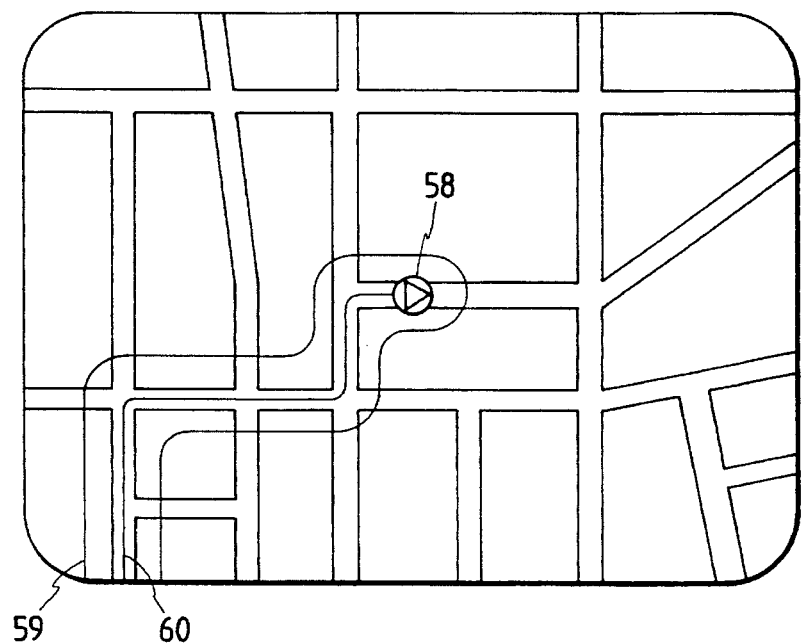
FIG. 53 is a diagram showing a display image to be displayed on a display screen of the display section according to the twenty-fifth preferred embodiment.
Figure 54:
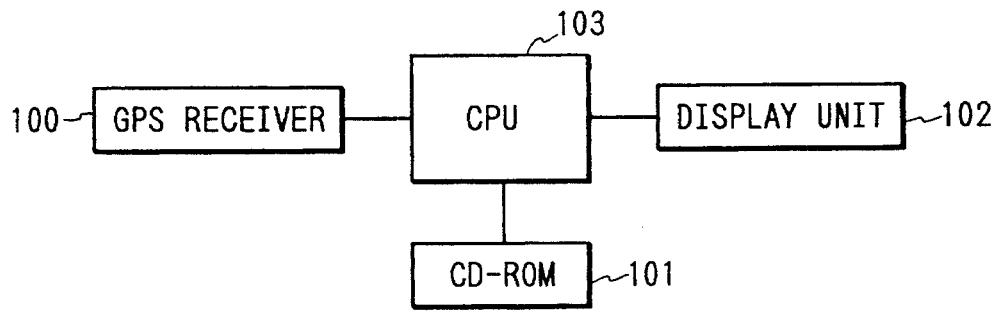
FIG. 54 is a block diagram showing a structure of a position measuring system according to the prior art.
Figure 55:
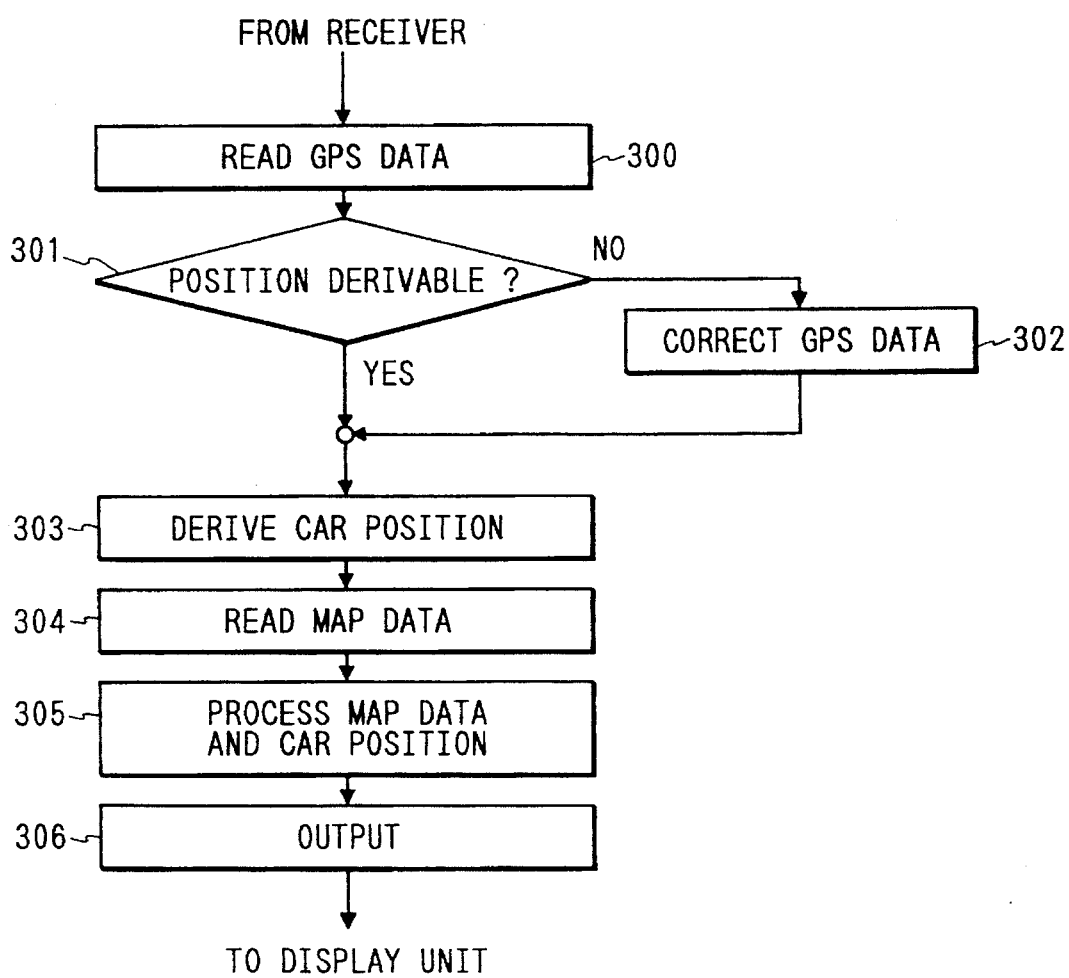
FIG. 55 is a flowchart showing a position deriving routine according to the prior art.

In FIG. 52, step 230 determines whether the user has selected a display mode with a traveled route or a display mode without a traveled route. When the display mode without the traveled route is selected, the routine proceeds to step 231 where a normal display is performed to only display a symbol 58 in FIG. 53. The symbol 58 represents a current car position derived by a known routine (not shown). On the other hand, when the display mode with the traveled route is selected, the routine proceeds to step 232 which reads positional data from the position sensor 55 so as to evaluate an measurement error at step 233 in the known manner, Thereafter, the routine proceeds to step 234 where, as shown in FIG. 53, the symbol 58 Is displayed along with a traveled route 59. The traveled route is derived by, for example, an envelope of the circles 57 in FIG. 50 which are sequentially derived and represent the measurement error as described before. Further, at step 234 traveled roads 60 are derived based on the traveled route 59 and the road map data and displayed along with the symbol 58 and the traveled route 59.

As appreciated, in the twenty-fifth preferred embodiment, the past traveled data are selectively displayed to the user in the form of the evaluated errors. Accordingly, the user may use these past traveled data for, such as returning to the correct road when the user lost his or her way.

It is to be understood that this invention is not to be limited to the preferred embodiments and modifications described above, and that various changes and modifications may be made without departing from the spirit and scope of the invention as defined in the appended claims.

What is claimed is:

1. A position measuring system comprising:

a receiver for receiving and demodulating signals from satellites;

position deriving means for deriving a current position of a moving body based on said demodulated signals;

first straight line deriving means, responsive to said demodulated signals being insufficient to enable said position deriving means from only deriving said current position, for deriving a first straight line based on said demodulated signals from two of said satellites, said first straight line deriving means deriving said first straight line as a horizontal line by assuming that an altitude of said moving body is constant;

error evaluating means for evaluating an error which causes a positional deviation of said first straight line;

second straight line deriving means for deriving a pair of second straight lines based on said first straight line, said second straight lines spacing from each other to define therebetween an area which corresponds to said evaluated error; and output means for outputting at least one of said current position derived by said position deriving means and said area defined between said second straight lines.

2. The position measuring system as set forth in claim 1, wherein said second straight lines are parallel with each other.

3. The position measuring system as set forth in claim 1, further comprising means for selecting a pair of the satellites when said signals are received from more than two of said satellites, said pair of the satellites providing said second straight lines which have a smallest magnitude of said area defined therebetween.

4. The position measuring system as set forth in claim 2, further comprising means for selecting a pair of the satellites when said signals are received from more than two of said satellites, said pair of the satellites providing said second straight lines which have a smallest distance therebetween.

5. A position measuring system comprising:

a receiver for receiving and demodulating signals from satellites;

position deriving means for deriving a current position of a moving body based on said demodulated signals;

area deriving means, responsive to said demodulated signals being insufficient to enable said position deriving means from deriving said current position, for limiting said current position to within an area defined between two straight lines;

timer means for measuring an elapsed time from a time point of receipt of said signals from the satellites for a newest position derivation by said position deriving means to a time point of receipt of said signals from the satellites for a current area derivation by said area deriving means;

maximum movable area deriving means for deriving a maximum movable area from a position derived by said newest position derivation, based on said elapsed time, a predetermined maximum speed of the moving body and a predetermined maximum acceleration of the moving body;

area limiting means for deriving an area common to both of said area derived by said area deriving means and said maximum movable area derived by said maximum movable area deriving means; and output means for outputting one of said current position derived by said position deriving means and said common area derived by said area limiting means.

6. A position measuring system comprising:

a receiver for receiving and demodulating signals from satellites;

position deriving means for deriving a current position and a velocity vector of a moving body based on said demodulated signals;

velocity vector deriving means, responsive to said demodulated signals being insufficient to enable said position deriving means from deriving said current position, for deriving a velocity vector of the moving body corresponding to a component perpendicular to a straight line which defines a possible area for said current position, said velocity vector deriving means deriving said velocity vector based on said demodulated signals;

timer means for measuring an elapsed time from a time point of receipt of said signals from the satellites for a newest position derivation by said position deriving means to a time point of receipt of said signals from the satellites for a velocity vector derivation by said velocity vector deriving means; and position estimating means for comparing said velocity vector derived by said position deriving means with said velocity vector derived by said velocity vector deriving means, for determining, when said compared velocity vectors are substantially equal to each other and said measured elapsed time is small, a motion of said moving body to be a uniform linear motion with said velocity vector derived by one of said position deriving means and said velocity vector deriving means, and for estimating said current position based on said current position derived by said position deriving means and said velocity vector; and output means for outputting one of said current positions derived by said position deriving means and said position estimating means.

7. A position measuring system comprising:

a receiver for receiving and demodulating signals from satellites;

position deriving means for deriving a current position of a moving body based on said demodulated signals;

area deriving means, responsive to said demodulated signals being insufficient to enable said position deriving means from deriving said current position, for limiting said current position to within an area defined between two straight lines;

timer means for measuring an elapsed time from a time point of receipt of said signals from the satellites for a last area derivation by said area deriving means to a time point of receipt of said signals from the satellites for a current area derivation by said area deriving means;

area estimating means for deriving a maximum movable area of the moving body based on said elapsed time, a predetermined maximum speed of the moving body and a predetermined maximum acceleration of the moving body when a pair of the satellites used in the last area derivation differs from a pair of the satellites used in the current area derivation;

area limiting means for deriving an area common to both of said area derived by said area deriving means and said maximum movable area derived by said area estimating means; and output means for outputting one of said current position derived by said position deriving means and said common area derived by said area limiting means.

8. A position measuring system comprising:

a receiver for receiving and demodulating signals from satellites;

a distance sensor for measuring a distance traveled by moving body;

position deriving means for deriving a current position of the moving body based on said demodulated signals;

area deriving means, responsive to said demodulated signals being insufficient to enable said position deriving means from deriving said current position for limiting said current position to within an area defined between two straight lines;

maximum movable area deriving means for deriving, based on said travel distance measured by said distance sensor, a maximum movable area from said current position derived by said position deriving means;

area limiting means for deriving an area common to both of said area derived by said area deriving means and said maximum movable area derived by said maximum movable area deriving means; and output means for outputting one of said current position derived by said position deriving means and said common area derived by said area limiting means.

9. A position measuring system comprising:

a receiver for receiving and demodulating signals from satellites;

a distance sensor for measuring a distance traveled by a moving body;

a timer for measuring a time;

position deriving means for deriving a current position of the moving body based on said demodulated signals;

velocity vector deriving means, responsive to said demodulated signals being insufficient to enable said position deriving means from deriving said current position, for deriving a velocity vector of the moving body corresponding to a component perpendicular to straight lines being parallel with each other and defining therebetween a possible area for said current position, said velocity vector deriving means deriving said velocity vector based on said demodulated signals;

moving speed deriving means for deriving a moving speed of the moving body based on said measured distance and said measured time;

moving direction deriving means for deriving a moving direction of the moving body based on an inverse cosine of a triangle having a hypotenuse formed by said moving speed and one of the other sides formed by said velocity vector; and output means for outputting one of said current position derived by said position deriving means and said moving direction derived by said moving direction deriving means.

10. A position measuring system comprising:

a receiver for receiving and demodulating signals from satellites;

position deriving means for deriving a current position of a moving body based on said demodulated signals;

area deriving means, responsive to said demodulated signals being insufficient to enable said position deriving means from deriving said current position, for limiting said current position to within an area defined between two straight lines;

timer means for measuring an elapsed time from a time point of receipt of said signals from the satellites for a newest position derivation by said position deriving means to a time point of receipt of said signals from the satellites for a current area derivation by said area deriving means;

maximum movable area deriving means for deriving a maximum movable area from a position derived by said newest position derivation, based on said elapsed time and a predetermined maximum speed of the moving body;

area limiting means for deriving an area common to both of said area derived by said area deriving means and said maximum movable area derived by said maximum movable area deriving means;

storing means for storing road map data;

output means for outputting at least one of said current position derived by said position deriving means and said common area derived by said area limiting means, said output means further outputting corresponding road map data from said storing means; and display means, responsive to said output means, for displaying said at least one of the current position and the common area along with the corresponding road map data.

11. The position measuring system as set forth In claim 10, further comprising means for retrieving road data within said common area and means for limiting said current position to within said retrieved road data.

12. The position measuring system as set forth in claim 10, further comprising means for retrieving road data which is within a maximum distance, along a road, from said position derived by said newest position derivation, said maximum distance derived based on said elapsed time and said predetermined maximum speed of the moving body, and means for limiting said current position to within said retrieved road data.

13. The position measuring system as set forth in claim 10, further comprising means for inputting a destination, means for forming a travel route on the road map data stored in said storing means, means for retrieving road data which is within a maximum distance, along the travel route, from said position derived by said newest position derivation, said maximum distance derived based on said elapsed time and said predetermined maximum speed of the moving body, and means for limiting said current position to within said retrieved road data.

14. A position measuring system comprising:

a receiver for receiving and demodulating signals from satellites;

position deriving means for deriving a current position and a velocity vector of a moving body based on said demodulated signals;

a distance sensor for measuring a distance traveled by the moving body;

area deriving means, responsive to no receipt of said signals from any of said satellites, for limiting said current position to within an area derived based on said current position, said velocity vector and said measured distance; and output means for outputting at least one of said current position derived by said position deriving means and said area derived by said area deriving means.

15. A position measuring method, wherein a current position of a moving body and measurement error evaluation values therefor are derived when data from satellites is sufficient for deriving said current position, and wherein when said data is insufficient for deriving said current position, a maximum movable distance is derived based on an elapsed time from the last measurement and a predetermined maximum speed of the moving body, and said maximum movable distance is added to said measurement error evaluation values in given directions so as to change the measurement error evaluation values representing an error range of said current position.

16. The position measuring method as set forth in clam 15, wherein when said data is sufficient for deriving said current position, a moving speed and a moving direction of the moving body are also derived, wherein when said data is insufficient for deriving said current position, a position of the moving body is derived assuming that the moving body constantly moves in said moving direction at said moving speed, and wherein an increase of error in the current position is evaluated based on a maximum acceleration of the moving body and said elapsed time so as to be added to the last measurement error evaluation values.

17. The position measuring method as set forth in claim 15, wherein a maximum moving speed of the moving body is defined, and wherein a vector sum of an increasing velocity of the measurement error evaluation value at a portion away from a center of the error range and a moving velocity of the center of the error range is controlled to be equal to or less than said maximum moving speed.

18. The position measuring method as set forth in claim 15, wherein a distance traveled by the moving body from the last measurement and measured by a distance sensor is added to the last measurement error evaluation values in given directions.

19. The position measuring method as set forth in claim 18, wherein said distance is compared with a moving magnitude based on a predetermined maximum acceleration of the moving body, wherein when said distance is smaller than said moving magnitude, the center of the error range remains unchanged and only magnitudes of the error evaluation values are changed depending on said distance, wherein when said distance is equal to or greater than said moving magnitude, the center of the error range is displaced depending on a difference between said distance and said moving magnitude, and wherein the error evaluation values are changed depending on said moving magnitude.

20. The position measuring method as set forth in claim 15, wherein the error range defined by said measuring error evaluation values is combined with another area derived for limiting the current position, and wherein magnitudes of said measuring error evaluation values are limited and the error range is corrected based on said another area.

21. The position measuring method as set forth in claim 20, wherein when the error range is overlapped with said another area, a rectangle having a shorter long side is selected among rectangles including the overlapped area so that said selected rectangle is determined to be the error range of the current position.

* * * * *